US011177905B2

(12) United States Patent
Lyu et al.

(10) Patent No.: US 11,177,905 B2
(45) Date of Patent: Nov. 16, 2021

(54) CHANNEL QUALITY FEEDBACK METHOD AND APPARATUS

(71) Applicant: Huawei Technologies Co., Ltd., Shenzhen (CN)

(72) Inventors: Yongxia Lyu, Ottawa (CA); Jingnan Wang, Beijing (CN); Ruixiang Ma, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 47 days.

(21) Appl. No.: 16/712,671

(22) Filed: Dec. 12, 2019

(65) Prior Publication Data
US 2020/0119836 A1 Apr. 16, 2020

Related U.S. Application Data

(63) Continuation of application No. PCT/CN2018/091681, filed on Jun. 15, 2018.

(30) Foreign Application Priority Data

Jun. 16, 2017 (CN) .......................... 201710459701.5
Aug. 11, 2017 (CN) .......................... 201710687964.1

(51) Int. Cl.
*H04L 1/00* (2006.01)
*H04L 1/20* (2006.01)
*H04L 27/36* (2006.01)

(52) U.S. Cl.
CPC .......... *H04L 1/0026* (2013.01); *H04L 1/0003* (2013.01); *H04L 1/0073* (2013.01); *H04L 1/203* (2013.01); *H04L 27/36* (2013.01)

(58) Field of Classification Search
CPC ... H04L 1/0026; H04L 1/0003; H04L 1/0073; H04L 1/203; H04L 27/36
See application file for complete search history.

(56) References Cited

U.S. PATENT DOCUMENTS 9,955,387 B1\* 4/2018 Shah ................. H04W 36/0058
10,097,331 B2\* 10/2018 Chen ..................... H04L 5/0057
(Continued)

FOREIGN PATENT DOCUMENTS

CN 1784923 A 6/2006
CN 101645763 A 2/2010
(Continued)

OTHER PUBLICATIONS

Huawei, HiSilicon, TBS determination for short TTI. 3GPP TSG RAN WG1 Meeting #89, R1-1707000, Hangzhou, China, May 15-19, 2017, 4 pages.
(Continued)

*Primary Examiner* — Freshteh N Aghdam
(74) *Attorney, Agent, or Firm* — Slater Matsil, LLP

(57) ABSTRACT

This application discloses a channel quality feedback method and apparatus, and the channel quality feedback method includes the following steps: determining, by a network device, a channel quality indicator set of a terminal device, where the channel quality indicator set includes at least one channel quality indicator value, and the channel quality indicator value is used to indicate channel quality; and sending, by the network device, the channel quality indicator set to the terminal device.

10 Claims, 21 Drawing Sheets

(56) References Cited

U.S. PATENT DOCUMENTS

| | | | |
|---|---|---|---|
| 10,938,504 B2* | 3/2021 | Rico Alvarino | H04W 72/042 |
| 2011/0190026 A1* | 8/2011 | Nishikawa | H04W 52/225 |
| | | | 455/522 |
| 2011/0249584 A1 | 10/2011 | Barbieri et al. | |
| 2011/0280183 A1 | 11/2011 | Sampath | |
| 2013/0016694 A1* | 1/2013 | Nimbalker | H04L 1/0025 |
| | | | 370/330 |
| 2015/0124901 A1* | 5/2015 | Xu | H04L 1/0009 |
| | | | 375/267 |
| 2016/0094310 A1 | 3/2016 | Xia | |
| 2016/0337150 A1* | 11/2016 | Larsson | H04L 1/0026 |
| 2017/0012735 A1* | 1/2017 | Yang | H04L 1/0016 |
| 2017/0054518 A1* | 2/2017 | Cho | H04B 17/336 |
| 2020/0077414 A1* | 3/2020 | Ye | H04L 1/0016 |

FOREIGN PATENT DOCUMENTS

| | | |
|---|---|---|
| CN | 102845010 A | 12/2012 |
| CN | 104184556 A | 12/2014 |
| CN | 104468025 A | 3/2015 |
| CN | 104468027 A | 3/2015 |
| KR | 20160135021 A | 11/2016 |
| WO | 2015099172 A1 | 7/2015 |
| WO | 2017050273 A1 | 3/2017 |
| WO | 2018169797 A1 | 9/2018 |

OTHER PUBLICATIONS

Huawei et al: "Discussion on CQI definition test for eMTC", 3GPP Draft; R4-1703786, Apr. 3, 2017 (Apr. 3, 2017), 3 pages.

3GPP TS 36.213 V14.2.0 (Mar. 2017), 3rd Generation Partnership Project; Technical Specification Group Radio Access Network; Evolved Universal Terrestrial Radio Access (E-UTRA); Physical layer procedures (Release 14), 454 pages.

3GPP TS 38.212 V0.0.0 (May 2017), 3rd Generation Partnership Project; Technical Specification Group Radio Access Network; NR;Multiplexing and channel coding (Release 15), 10 pages.

MEDIATEK Inc; "CSI definition for Rel-13 MTC",3GPP Draft; R1-157386, Nov. 7, 2015 (Nov. 7, 2015), 4 pages.

Zte et al.: "WF on CQI Table for eMTC", 3GPP Draft; R1-157845, Nov. 24, 2015 (Nov. 24, 2015), 4 pages.

* cited by examiner

| CQI index | Modulation | Code rate×1024 | Efficiency |
|---|---|---|---|
| 0 | Out of range | | |
| 1 | QPSK | 78 | 0.1523 |
| 2 | QPSK | 120 | 0.2344 |
| 3 | QPSK | 193 | 0.3770 |
| 4 | QPSK | 308 | 0.6016 |
| 5 | QPSK | 449 | 0.8770 |
| 6 | QPSK | 602 | 1.1758 |
| 7 | 16QAM | 378 | 1.4766 |
| 8 | 16QAM | 490 | 1.9141 |
| 9 | 16QAM | 616 | 2.4063 |
| 10 | 64QAM | 466 | 2.7305 |
| 11 | 64QAM | 567 | 3.3223 |
| 12 | 64QAM | 666 | 3.9023 |
| 13 | 64QAM | 772 | 4.5234 |
| 14 | 64QAM | 873 | 5.1152 |
| 15 | 64QAM | 948 | 5.5547 |

FIG. 2

| CQI feedback information | Offset |
|---|---|
| 0 | 0 |
| 1 | 1 |
| 2 | $\geq 2$ |
| 3 | $\leq -1$ |

FIG. 3

| CQI index | Modulation | Code rate×1024 | Efficiency |
|---|---|---|---|
| 0 | Out of range | | |
| 1 | BPSK | 4 | 0.0039 |
| 2 | BPSK | 8 | 0.0078 |
| 3 | BPSK | 16 | 0.0156 |
| 4 | BPSK | 32 | 0.0312 |
| 5 | QPSK | 32 | 0.0624 |
| 6 | QPSK | 78 | 0.1523 |
| 7 | QPSK | 120 | 0.2344 |
| 8 | QPSK | 193 | 0.3770 |
| 9 | QPSK | 308 | 0.6016 |
| 10 | QPSK | 449 | 0.8770 |
| 11 | QPSK | 602 | 1.1758 |
| 12 | 16QAM | 378 | 1.4766 |
| 13 | 16QAM | 490 | 1.9141 |
| 14 | 16QAM | 616 | 2.4063 |
| 15 | 64QAM | 466 | 2.7305 |
| 16 | 64QAM | 567 | 3.3223 |
| 17 | 64QAM | 666 | 3.9023 |
| 18 | 64QAM | 772 | 4.5234 |
| 19 | 64QAM | 873 | 5.1152 |
| 20 | 64QAM | 948 | 5.5547 |
| 21 | 256QAM | 711 | 5.5547 |
| 22 | 256QAM | 797 | 6.2266 |
| 23 | 256QAM | 885 | 6.9141 |
| 24 | 256QAM | 948 | 7.4063 |
| 25 | 1024QAM | 758 | 7.4023 |
| 26 | 1024QAM | 788 | 7.6953 |
| 27 | 1024QAM | 819 | 7.998 |
| 28 | 1024QAM | 850 | 8.3007 |
| 29 | 1024QAM | 881 | 8.6035 |
| 30 | 1024QAM | 922 | 9.0039 |
| 31 | 1024QAM | 983 | 9.5596 |

FIG. 9

| MCS index $I_{MCS}$ | Modulation order $Q'_m$ | Redundancy version rvidx | TB size index |
|---|---|---|---|
| 0 | 1 | 0 | 0 |
| 1 | 1 | 0 | 1 |
| 2 | 1 | 0 | 2 |
| 3 | 1 | 0 | 3 |
| 4 | 1 | 0 | 4 |
| 5 | 1 | 0 | 5 |
| 6 | 1 | 0 | 6 |
| 7 | 1 | 0 | 7 |
| 8 | 2 | 0 | 8 |
| 9 | 2 | 0 | 9 |
| 10 | 2 | 0 | 10 |
| 11 | 2 | 0 | 11 |
| 12 | 2 | 0 | 12 |
| 13 | 2 | 0 | 13 |
| 14 | 2 | 0 | 14 |
| 15 | 2 | 0 | 15 |
| 16 | 2 | 0 | 16 |
| 17 | 2 | 0 | 17 |
| 18 | 2 | 0 | 18 |
| 19 | 2 | 0 | 19 |
| 20 | 4 | 0 | 20 |
| 21 | 4 | 0 | 21 |
| 22 | 4 | 0 | 22 |
| 23 | 4 | 0 | 23 |
| 24 | 4 | 0 | 24 |
| 25 | 4 | 0 | 25 |
| 26 | 6 | 0 | 26 |
| 27 | 6 | 0 | 27 |
| 28 | 6 | 0 | 28 |
| 29 | 6 | 0 | 29 |
| 30 | 6 | 0 | 30 |
| 31 | 6 | 0 | 31 |
| 32 | 6 | 0 | 32 |

CONT. FROM FIG. 11A  CONT. FROM FIG. 11A

| | | | |
|---|---|---|---|
| 33 | 6 | 0 | 33 |
| 34 | 6 | 0 | 34 |
| 35 | 6 | 0 | 35 |
| 36 | 6 | 0 | 36 |
| 37 | 6 | 0 | 37 |
| 38 | 6 | 0 | 38 |
| 39 | 6 | 0 | 39 |
| 40 | 8 | 0 | 40 |
| 41 | 8 | 0 | 41 |
| 42 | 8 | 0 | 42 |
| 43 | 8 | 0 | 43 |
| 44 | 8 | 0 | 44 |
| 45 | 8 | 0 | 45 |
| 46 | 10 | 0 | 46 |
| 47 | 10 | 0 | 47 |
| 48 | 10 | 0 | 48 |
| 49 | 10 | 0 | 49 |
| 50 | 10 | 0 | 50 |
| 51 | 10 | 0 | 51 |
| 52 | 10 | 0 | 52 |
| 53 | 10 | 0 | 53 |
| 54 | 10 | 0 | 54 |
| 55 | 10 | 0 | 55 |
| 56 | 10 | 0 | 56 |
| 57 | 10 | 0 | 57 |
| 58 | Reserved | 1 | 0 |
| 59 | | 2 | 1 |
| 60 | | 4 | 2 |
| 61 | | 6 | 3 |
| 62 | | 8 | 4 |
| 63 | | 10 | 5 |

FIG. 11B

CHANNEL QUALITY FEEDBACK METHOD AND APPARATUS

CROSS-REFERENCE TO RELATED APPLICATIONS

This application is continuation application of International Application No. PCT/CN2018/091681, filed on Jun. 15, 2018, which claims priority to Chinese Patent Application No. 201710459701.5, filed on Jun. 16, 2017 and claims priority to Chinese Patent Application No. 201710687964.1, filed on Aug. 11, 2017. The disclosures of the aforementioned applications are hereby incorporated by reference in their entireties.

TECHNICAL FIELD

This application relates to the field of communications technologies, and in particular, to a channel quality feedback method and apparatus.

BACKGROUND

Compared with a 4G communications system, a 5G communications system supports an ultra-reliable and low latency communications (URLLC) service. The URLLC service needs to meet a strict reliability requirement in a harsh transmission latency condition. However, robust reduction of a modulation and coding level only leads to low system transmission efficiency. Therefore, a channel quality information feedback needs to be enhanced to enable a network device to perform transmission by using a modulation and coding scheme that is most suitable for current channel quality, so that not only transmission reliability can be ensured, but also scheduling with excessively low transmission efficiency can be avoided.

For example, a channel quality indicator (CQI) is a typical feedback technology of channel quality information. In an LTE system, each CQI index corresponds to one modulation and coding policy of specific channel quality. After learning of a CQI index corresponding to current channel quality, the network device can perform transmission by using a modulation and coding policy corresponding to the CQI index. Currently, there are two manners of feeding back a CQI index in the industry: an absolute indicator value feedback and a differential indicator value feedback. In the absolute indicator value feedback, after obtaining the current channel quality through measurement, a terminal device feeds back one type of feedback information, and the feedback information corresponds to the CQI index corresponding to the current channel quality. In other words, one type of feedback information corresponds to one type of CQI index. For example, if 16 types of CQI indexes are included, four-bit feedback information needs to be used for a feedback. Usually, limited types of CQI indexes are set to reduce overheads, and only typical channel quality states can be reflected, but channel quality cannot be accurately reflected for a deep fading channel.

In the differential indicator value feedback, a CQI reference index value is first determined, and an offset is calculated for each remaining CQI index by using the reference index value as a reference. Therefore, the terminal device only needs to feed back feedback information corresponding to the offset. To reduce overheads of feedback information, several optional offsets are determined to form a CQI differential indicator value set, and one type of feedback information corresponds to one offset. For example, a CQI differential indicator value set is $\{-1, 0, 1, 2\}$. The terminal device may feed back the four offsets by using two-bit feedback information. Currently, the CQI differential indicator value set is specified for all cases in the industry. For example, when an offset is 2, feedback information fed back by the terminal device is 2, and when an offset is 5, the feedback information fed back by the terminal device is still 11. Therefore, the terminal device cannot accurately indicate current channel quality of a channel.

It may be learned from the foregoing description that in the current system, channel quality of each terminal cannot be accurately indicated regardless of whether an absolute indicator value or a differential indicator value is used.

SUMMARY

Embodiments of this application provide a channel quality feedback method and apparatus, to determine a channel quality indicator set exclusive to a terminal device, so that not only overheads are reduced, but also accuracy of a channel quality feedback can be maximized.

According to a first aspect, an embodiment of this application provides a channel quality feedback method, including: determining, by a network device, a channel quality indicator set of a terminal device. The channel quality indicator set includes a channel quality indicator value, and the channel quality indicator value is used to indicate channel quality. Optionally, the channel quality indicator set may include at least one channel quality indicator value.

The network device sends the determined channel quality indicator set to the terminal device. Optionally, the network device may indicate the channel quality indicator set by using a higher layer signaling configuration, or the network device may indicate the channel quality indicator set by using MAC CE signaling. Further, the channel quality indicator set may be alternatively indicated by using user-specific signaling.

In a possible design, the network device sends, to the terminal device, an indication message that is used to indicate the channel quality indicator set, where the indication message includes the at least one channel quality indicator value.

In a possible design, the channel quality indicator value may include a channel quality differential indicator value, and the channel quality differential indicator value is used to indicate an offset between a channel quality measurement value and a channel quality reference value. For example, the channel quality measurement value is a CQI index obtained through measurement, and the channel quality reference value is a CQI reference index value. It should be noted that the channel quality herein includes but is not limited to a CQI, an MCS, and a BLER.

In a possible design, the channel quality reference value includes a channel quality value that is aperiodically fed back at a time closest to a reference time corresponding to the measurement value; or a channel quality value that is periodically fed back at a time closest to a reference time corresponding to the measurement value; or a channel quality value that is fed back at a time closest to a reference time corresponding to the measurement value and that is in a specific channel quality reporting set, where the reference time corresponding to the measurement value includes a reference measurement time corresponding to the measurement value or a measurement reporting time corresponding to the measurement value, the measurement reporting time corresponding to the measurement value is a time for sending feedback information of the measurement value by the terminal device, the feedback information is channel quality information fed back by the terminal device for the channel quality indicator set, and the reference measurement time is a preset time period before the measurement reporting time.

In a possible design, the network device determines a first channel quality indicator set and a second channel quality indicator set for the terminal device, where the first channel quality indicator set corresponds to an interval of a first time period, and the second channel quality indicator set corresponds to an interval of a second time period. The interval of the first time period and the interval of the second time period may be intervals of any two time periods of intervals that are of a plurality of time periods and that are determined by the network device for the terminal device, and the intervals of the plurality of time periods do not overlap. The network device sends, to the terminal device, a plurality of channel quality indicator sets corresponding to the determined intervals of the plurality of time periods.

In a possible design, the network device receives the feedback information sent by the terminal device, where the feedback information is used to indicate a target differential indicator value in a first target channel quality indicator set, the first target channel quality indicator set is a channel quality indicator set corresponding to a time difference between the reference time corresponding to the measurement value and a reference time corresponding to the reference value, the target differential indicator value is used to indicate an offset between a current channel quality measurement value and a channel quality reference value, and the first target channel quality indicator set is the first channel quality indicator set or the second channel quality indicator set.

In a possible design, the network device determines a third channel quality indicator set and a fourth channel quality indicator set for the terminal device, where the third channel quality indicator set corresponds to an interval of a third block error rate difference, and the fourth channel quality indicator set corresponds to an interval of a fourth block error rate difference. The interval of the third block error rate difference and the interval of the fourth block error rate difference may be intervals of any two block error rate differences of intervals that are of a plurality of block error rate differences and that are determined by the network device for the terminal device, and the intervals of the plurality of block error rate differences do not overlap. The network device sends, to the terminal device, a plurality of channel quality indicator sets corresponding to the determined intervals of the plurality of block error rate differences.

In a possible design, the network device receives feedback information sent by the terminal device, where the feedback information is used to indicate a target differential indicator value in a second target channel quality indicator set, the second target channel quality indicator set is a channel quality indicator set corresponding to a difference between a block error rate corresponding to the measurement value and a block error rate corresponding to the reference value, the target differential indicator value is used to indicate an offset between a current channel quality measurement value and a channel quality reference value, and the second target channel quality indicator set is the third channel quality indicator set or the fourth channel quality indicator set.

In a possible design, the channel quality indicator value in the channel quality indicator set includes a channel quality absolute indicator value, and the absolute indicator value is used to indicate a channel quality measurement value. For example, the absolute indicator value is a CQI index.

Optionally, the channel quality indicator set determined by the network device for the terminal device is a preset set or a subset of the preset set. The preset set may be a set specified in a protocol, namely, a set preset in the network device and the terminal device. A quantity of absolute indicator values included in the preset set is greater than or equal to a quantity of absolute indicator values included in the channel quality indicator set determined by the network device for the terminal device. The quantity of absolute indicator values included in the channel quality indicator set determined by the network device for the terminal device determines a quantity of bits required by the terminal device to send the feedback information to the network device. For example, if the quantity of absolute indicator values included in the channel quality indicator set determined by the network device for the terminal device is 16, the quantity of bits required for the feedback information is 4. In this way, absolute indicator values included in the channel quality indicator set exclusive to the terminal device can be fed back by using a limited quantity of bits for the feedback information, so that a feedback is more accurate. Quantities of absolute indicator values included in channel quality indicator sets determined by the network device for different terminal devices may be different, and therefore quantities of bits required by the terminal devices to send feedback information to the network device may also be different.

Optionally, absolute indicator values included in the channel quality indicator set determined by the network device for the terminal device may be consecutively selected or may be nonconsecutively selected from the preset set. If the absolute indicator values included in the channel quality indicator set are consecutively selected or the absolute indicator values included in the channel quality indicator set are selected at equal intervals, when indicating the channel quality indicator set to the terminal device, the network device may indicate only a starting element of the channel quality indicator set and a quantity of elements included in the channel quality indicator set, or the network device indicates only a starting element, and a quantity of elements included in the channel quality indicator set is a value specified in the protocol. It should be noted that consecutive selection herein may be successive selection based on a sequence number of the absolute indicator values.

Optionally, if the absolute indicator values included in the channel quality indicator set are nonconsecutively selected and there is no value selection rule, the network device may indicate the channel quality indicator set to the terminal device by using a bitmap, or the network device separately indicates indices corresponding to absolute indicator values in the preset set.

Optionally, absolute indicator values included in the channel quality indicator set determined by the network device for the terminal device may be some or all of channel quality indicator values in at least one of a plurality of preset sets. Optionally, at least two of the plurality of preset sets include different quantities of absolute indicator values. It should be noted that the preset set may be a set preset in the network device and the terminal device.

According to a second aspect, an embodiment of this application provides a network device, and the network device has a function of implementing behavior of the network device in the method in the first aspect. The function may be implemented by hardware, or may be implemented by hardware executing corresponding software. The hardware or the software includes one or more modules corresponding to the function.

In a possible implementation, the network device includes a processing unit and a transceiver unit. The processing unit is configured to determine a channel quality indicator set of a terminal device, where the channel quality indicator set includes at least one channel quality indicator value, and the channel quality indicator value is used to indicate channel quality. The transceiver unit is configured to send the channel quality indicator set to the terminal device.

In a possible implementation, the network device includes a processor and a transceiver. The processor is configured to determine a channel quality indicator set of a terminal device, where the channel quality indicator set includes at least one channel quality indicator value, and the channel quality indicator value is used to indicate channel quality. The transceiver is configured to send the channel quality indicator set to the terminal device.

Based on a same inventive concept, for a problem-resolving principle and beneficial effects of the network device, refer to the method in the first aspect and beneficial effects brought by the method. For implementation of the network device, refer to implementation of the method on the network device side in the first aspect. Details are not described again.

According to a third aspect, an embodiment of this application provides a channel quality feedback method, including: obtaining, by a terminal device, a channel quality indicator set determined by a network device for the terminal device, where the channel quality indicator set includes at least one channel quality indicator value, and the channel quality indicator value is used to indicate channel quality; and sending, by the terminal device, feedback information to the network device, where the feedback information is used to indicate a target channel quality indicator value, the target channel quality indicator value is a channel quality indicator value in the channel quality indicator set, and the target channel quality indicator value is used to determine current channel quality of a channel.

In a possible design, the channel quality indicator value includes a channel quality differential indicator value, and the differential indicator value is used to indicate an offset between a channel quality measurement value and a channel quality reference value.

In a possible design, the channel quality reference value includes: a channel quality value that is aperiodically fed back at a time closest to a measurement time corresponding to the measurement value; or a channel quality value that is periodically fed back at a time closest to a measurement time corresponding to the measurement value; or a channel quality value that is fed back at a time closest to a measurement time corresponding to the measurement value and that is in a specific channel quality reporting set.

In a possible design, the obtaining, by a terminal device, a channel quality indicator set determined by a network device for the terminal device includes: obtaining, by the terminal device, a first channel quality indicator set and a second channel quality indicator set, where the first channel quality indicator set corresponds to an interval of a first time period, the second channel quality indicator set corresponds to an interval of a second time period, the first time period or the second time period is a time difference between a reference time corresponding to the measurement value and a reference time corresponding to the reference value, and the interval of the first time period is different from the interval of the second time period; and the sending, by the terminal device, feedback information to the network device includes: determining, by the terminal device, a first target differential set, where the first target differential set is a channel quality indicator set corresponding to a time difference between the measurement time corresponding to the channel quality measurement value and a feedback time corresponding to the channel quality reference value, and the first target differential set is the first channel quality indicator set or the second channel quality indicator set; and sending, by the terminal device to the network device, feedback information used to indicate a target differential indicator value in the first target differential set.

In a possible design, the obtaining, by a terminal device, a channel quality indicator set determined by a network device for the terminal device includes: obtaining, by the terminal device, a third channel quality indicator set and a fourth channel quality indicator set, where the third channel quality indicator set corresponds to an interval of a third block error rate difference, the fourth channel quality indicator set corresponds to an interval of a fourth block error rate difference, the third block error rate difference or the fourth block error rate difference is a difference between a block error rate corresponding to the channel quality measurement value and a block error rate corresponding to the channel quality reference value, and the interval of the third block error rate difference is different from the interval of the fourth block error rate difference; and the sending, by the terminal device, feedback information to the network device includes: determining, by the terminal device, a second target differential set, where the second target differential set is a channel quality indicator set corresponding to the difference between the block error rate corresponding to the channel quality measurement value and the block error rate corresponding to the channel quality reference value, and the second target differential set is the third channel quality indicator set or the fourth channel quality indicator set; and sending, by the terminal device to the network device, feedback information used to indicate a target differential indicator value in the second target differential set.

In a possible design, the channel quality indicator value includes a channel quality absolute indicator value, and the absolute indicator value is used to indicate a channel quality measurement value; and the channel quality indicator set is a preset set or a subset of the preset set, or the channel quality set is at least one of a plurality of preset sets.

Optionally, the channel quality indicator set determined by the network device for the terminal device is a preset set or a subset of the preset set. The preset set may be a set specified in a protocol, namely, a set preset in the network device and the terminal device.

Optionally, absolute indicator values included in the channel quality indicator set determined by the network device for the terminal device may be consecutively selected from the preset set, or absolute indicator values included in the channel quality indicator set may be nonconsecutively selected from the preset set.

Optionally, absolute indicator values included in the channel quality indicator set determined by the network device for the terminal device may be some or all of channel quality indicator values in the at least one of the plurality of preset sets. The plurality of preset sets may be sets preset in the network device and the terminal device.

According to a fourth aspect, an embodiment of this application provides a terminal device, and the terminal device has a function of implementing behavior of the terminal device in the method in the third aspect. The function may be implemented by hardware, or may be implemented by hardware executing corresponding software. The hardware or the software includes one or more modules corresponding to the function.

In a possible implementation, the terminal device includes a transceiver unit and a processing unit. The processing unit is configured to obtain a channel quality indicator set determined by a network device for the terminal device, where the channel quality indicator set includes at least one channel quality indicator value, and the channel quality indicator value is used to indicate channel quality.

The transceiver unit is configured to send feedback information, where the feedback information is used to indicate a target channel quality indicator value, the target channel quality indicator value is a channel quality indicator value in the channel quality indicator set, and the target channel quality indicator value is used to determine current channel quality of a channel.

In a possible implementation, the terminal device includes a processor and a transceiver. The processor is configured to obtain a channel quality indicator set determined by a network device for the terminal device, where the channel quality indicator set includes at least one channel quality indicator value, and the channel quality indicator value is used to indicate channel quality.

The transceiver is configured to send feedback information, where the feedback information is used to indicate a target channel quality indicator value, the target channel quality indicator value is a channel quality indicator value in the channel quality indicator set, and the target channel quality indicator value is used to determine current channel quality of a channel.

Based on a same inventive concept, for a problem-resolving principle and beneficial effects of the terminal device, refer to the method in the third aspect and beneficial effects brought by the method. For implementation of the terminal device, refer to implementation of the method on the terminal device side in the third aspect. Details are not described again.

According to a fifth aspect, an embodiment of this application provides a modulation and coding policy indication method, including: determining, by a network device, a modulation and coding scheme MCS level indicator set of a terminal device, where the MCS level indicator set includes an MCS level indicator value, and the MCS level indicator value is used to indicate a modulation and coding policy; and sending, by the network device, the MCS level indicator set to the terminal device.

In a possible implementation, the network device sends indication information to the terminal device, where the indication information is used to indicate a target MCS level indicator value in the MCS level indicator set, and the target MCS level indicator value is used to indicate a modulation and coding policy used by the network device.

In a possible implementation, the MCS level indicator set is a preset set or a subset of the preset set, or the MCS level indicator set is at least one of a plurality of preset sets.

Optionally, the MCS level indicator set determined by the network device for the terminal device is a preset set or a subset of the preset set. The preset set may be a set specified in a protocol, namely, a set preset in the network device and the terminal device.

Optionally, MCS level indicator values included in the MCS level indicator set determined by the network device for the terminal device may be consecutively selected from the preset set, or MCS level indicator values included in the MCS level indicator set may be nonconsecutively selected from the preset set.

If the MCS level indicator values included in the MCS level indicator set are consecutively selected from the preset set, or the MCS level indicator values included in the MCS level indicator set are selected at equal intervals, when indicating the MCS level indicator set to the terminal device, the network device may indicate only a starting element of the MCS level indicator set and a quantity of elements included in the MCS level indicator set, or the network device indicates only a starting element, and a quantity of elements included in the MCS level indicator set is a value specified in the protocol.

Optionally, if the MCS level indicator values included in the MCS level indicator set are nonconsecutively selected from the preset set and there is no value selection rule, the network device may indicate the MCS level indicator set to the terminal device by using a bitmap.

Optionally, MCS level indicator values included in the MCS level indicator set determined by the network device for the terminal device may be some or all of MCS level indicator values in the at least one of the plurality of preset sets. The plurality of preset sets may be sets preset in the network device and the terminal device.

According to a sixth aspect, an embodiment of this application provides a network device, and the network device has a function of implementing behavior of the network device in the method in the fifth aspect. The function may be implemented by hardware, or may be implemented by hardware executing corresponding software. The hardware or the software includes one or more modules corresponding to the function.

In a possible implementation, the network device includes a processing unit and a transceiver unit. The processing unit is configured to determine a modulation and coding scheme MCS level indicator set of a terminal device, where the MCS level indicator set includes an MCS level indicator value, and the MCS level indicator value is used to indicate a modulation and coding policy.

The transceiver unit is configured to send the MCS level indicator set to the terminal device.

In a possible implementation, the network device includes a processor and a transceiver. The processor is configured to determine a modulation and coding scheme MCS level indicator set of a terminal device, where the MCS level indicator set includes an MCS level indicator value, and the MCS level indicator value is used to indicate a modulation and coding policy.

The transceiver is configured to send the MCS level indicator set to the terminal device.

Based on a same inventive concept, for a problem-resolving principle and beneficial effects of the network device, refer to the method in the fifth aspect and beneficial effects brought by the method. For implementation of the network device, refer to implementation of the method on the network device side in the fifth aspect. Details are not described again.

According to a seventh aspect, an embodiment of this application provides a modulation and coding policy indication method, including: receiving, by a terminal device, an MCS level indicator set determined for the terminal device, where the MCS level indicator set includes at least one MCS level indicator value, and the MCS level indicator value is used to indicate a modulation and coding policy; and storing, by the terminal device, the MCS level indicator set.

In a possible implementation, the terminal device receives indication information sent by a network device, where the indication information is used to indicate a target MCS level indicator value in the MCS level indicator set, and the target MCS level indicator value is used to indicate a modulation and coding policy used by the network device.

In a possible implementation, the MCS level indicator set is a preset set or a subset of the preset set, or the MCS level indicator set is one of a plurality of preset sets.

According to an eighth aspect, an embodiment of this application provides a terminal device, and the terminal device has a function of implementing behavior of the terminal device in the method in the seventh aspect. The function may be implemented by hardware, or may be implemented by hardware executing corresponding software. The hardware or the software includes one or more modules corresponding to the function.

In a possible implementation, the terminal device includes a transceiver unit and a processing unit. The transceiver unit is configured to receive an MCS level indicator set determined for the terminal device, where the MCS level indicator set includes an MCS level indicator value, and the MCS level indicator value is used to indicate a modulation and coding policy.

The processing unit is configured to store the MCS level indicator set.

In a possible implementation, the terminal device includes a processor and a transceiver. The transceiver is configured to receive an MCS level indicator set determined for the terminal device, where the MCS level indicator set includes an MCS level indicator value, and the MCS level indicator value is used to indicate a modulation and coding policy.

The processor is further configured to store the MCS level indicator set.

Based on a same inventive concept, for a problem-resolving principle and beneficial effects of the terminal device, refer to the method in the seventh aspect and beneficial effects brought by the method. For implementation of the terminal device, refer to implementation of the method on the terminal device side in the seventh aspect. Details are not described again.

According to a ninth aspect, an embodiment of this application provides a computer readable storage medium, including an instruction. When the instruction runs on a computer, the computer is enabled to perform the method performed by the network device in the first aspect.

According to a tenth aspect, an embodiment of this application provides a computer readable storage medium, including an instruction. When the instruction runs on a computer, the computer is enabled to perform the method on the terminal device side in the third aspect.

According to an eleventh aspect, an embodiment of this application provides a computer readable storage medium, including an instruction. When the instruction runs on a computer, the computer is enabled to perform the method performed by the network device in the fifth aspect.

According to a twelfth aspect, an embodiment of this application provides a computer readable storage medium, including an instruction. When the instruction runs on a computer, the computer is enabled to perform the method on the terminal device side in the seventh aspect.

In the embodiments of this application, the network device configures a channel quality indicator set exclusive to each terminal device for the terminal device, where the channel quality indicator set includes a channel quality indicator value, the channel quality indicator value is used to indicate channel quality, and the channel quality indicator value is set for channel quality of the terminal device. Therefore, when feeding back the channel quality, the terminal device can accurately feed back the channel quality to the network device, thereby improving accuracy of a channel quality feedback.

According to a thirteenth aspect, an embodiment of this application provides a method for determining channel quality. The method is applied to a system that supports at least one block error rate BLER set, a first BLER set of the at least one BLER set includes a first BLER subset and a second BLER subset, the first BLER subset includes at least one BLER, the second BLER subset includes at least one BLER, and the method includes: receiving, by a network device, a channel quality parameter that corresponds to each BLER in the first BLER subset and that is sent by a terminal device, where the channel quality parameter is used to indicate channel quality between the terminal device and the network device; and determining, by the network device based on at least one channel quality parameter difference and a channel quality parameter corresponding to the at least one BLER in the first BLER subset, a channel quality parameter corresponding to the at least one BLER in the second BLER subset, where the at least one channel quality parameter difference includes a difference between the channel quality parameter corresponding to the at least one BLER in the second BLER subset and the channel quality parameter corresponding to the at least one BLER in the first BLER subset.

The network device may receive a channel quality parameter that corresponds to a BLER in the first BLER subset in the first BLER set and that is sent by the terminal device, and determine, based on channel quality parameters corresponding to some BLERs in the first BLER subset and the channel quality parameter difference between the channel quality parameter corresponding to each BLER in the second BLER subset and the channel quality parameter corresponding to the at least one BLER in the first BLER subset, channel quality parameters corresponding to all BLERs in the second BLER subset. In other words, the network device can determine channel quality parameters corresponding to all BLERs in the first BLER set, and therefore the terminal device does not need to send the channel quality parameters corresponding to all the BLERs in the first BLER set, thereby reducing signaling overheads.

In a possible implementation, the method further includes: sending, by the network device, a channel quality parameter request to the terminal device, where the channel quality parameter request is used to request the at least one channel quality parameter difference between the channel quality parameter corresponding to the at least one BLER in the second BLER subset in the first BLER set and the channel quality parameter corresponding to the at least one BLER in the first BLER subset in the first BLER set; and receiving, by the network device, the at least one channel quality parameter difference between the channel quality parameter corresponding to the at least one BLER in the second BLER subset in the first BLER set and the channel quality parameter corresponding to the at least one BLER in the first BLER subset in the first BLER set.

When the network device requires the channel quality parameter difference, the network device sends the channel quality parameter request to the terminal device, and requests, by using the channel quality parameter request, the channel quality parameter difference required by the network device, so that the terminal device is prevented from reporting an extra channel quality parameter difference, thereby further reducing signaling overheads.

In a possible implementation, the method further includes: sending, by the network device, a channel quality parameter request to the terminal device, where the channel quality parameter request is used to request a channel quality parameter difference between a channel quality parameter corresponding to at least one BLER in a second BLER subset in each of the at least one BLER set and a channel quality parameter corresponding to at least one BLER in a first BLER subset; and receiving, by the network device, the channel quality parameter difference between the channel quality parameter corresponding to the at least one BLER in the second BLER subset in each of the at least one BLER set and the channel quality parameter corresponding to the at least one BLER in the first BLER subset.

The network device may request all channel quality parameter differences to determine channel quality parameters corresponding to all BLERs, thereby improving reliability of channel quality.

In a possible implementation, if the method is applied to a system that supports at least two BLER sets, any two of the at least two BLER sets correspond to different CQI levels.

The network device may receive channel quality parameter differences between channel quality parameters corresponding to BLERs in different CQI levels reported by the terminal device, thereby improving accuracy of determining a channel quality parameter corresponding to a BLER in the second BLER subset.

In a possible implementation, if the method is applied to a system that supports at least two BLER sets, any two of the at least two BLER sets correspond to different transmission modes.

The network device may receive channel quality parameter differences between channel quality parameters corresponding to BLERs in different transmission modes reported by the terminal device, thereby improving accuracy of determining a channel quality parameter corresponding to a BLER in the second BLER subset.

In a possible implementation, the transmission modes include an antenna port configuration and/or a multiple-input multiple-output MIMO preprocessing mode.

The network device may receive channel quality parameter differences between channel quality parameters corresponding to BLERs in different antenna port configurations and/or multiple-input multiple-output MIMO preprocessing modes reported by the terminal device, thereby further improving accuracy of determining a channel quality parameter corresponding to a BLER in the second BLER subset.

According to a fourteenth aspect, a method for determining channel quality is provided. The method is applied to a system that supports at least one block error rate BLER set, each of the at least one BLER set includes a first BLER subset and a second BLER subset, the first BLER subset includes at least one BLER, the second BLER subset includes at least one BLER, and the method includes: determining, by a terminal device, a channel quality parameter corresponding to each BLER in the first BLER subset, where the channel quality parameter is used to indicate channel quality between the terminal device and a network device; and sending, by the terminal device, the channel quality parameter corresponding to each BLER in the first BLER subset to the network device, so that the network device determines, based on at least one channel quality parameter difference and a channel quality parameter corresponding to the at least one BLER in the first BLER subset, a channel quality parameter corresponding to the at least one BLER in the second BLER subset, where the at least one channel quality parameter difference includes a difference between the channel quality parameter corresponding to the at least one BLER in the second BLER subset and the channel quality parameter corresponding to the at least one BLER in the first BLER subset.

The terminal device sends a channel quality parameter corresponding to each BLER in a first BLER subset in a first BLER set, and determines, based on channel quality parameters corresponding to some BLERs in the first BLER subset and the channel quality parameter difference between the channel quality parameter corresponding to each BLER in the second BLER subset and the channel quality parameter corresponding to the at least one BLER in the first BLER subset, channel quality parameters corresponding to all BLERs in the second BLER subset. In other words, the network device can determine channel quality parameters corresponding to all BLERs in the first BLER set, and therefore the terminal device does not need to send the channel quality parameters corresponding to all the BLERs in the first BLER set, thereby reducing signaling overheads.

In some possible implementations, the method further includes: receiving, by the terminal device, a channel quality parameter request sent by the network device, where the channel quality parameter request is used to request at least one channel quality parameter difference between a channel quality parameter corresponding to at least one BLER in a second BLER subset in the first BLER set and a channel quality parameter corresponding to at least one BLER in a first BLER subset in the first BLER set; and sending, by the terminal device, the at least one channel quality parameter difference between the channel quality parameter corresponding to the at least one BLER in the second BLER subset in the first BLER set and the channel quality parameter corresponding to the at least one BLER in the first BLER subset in the first BLER set to the network device according to the channel quality parameter request.

The terminal device receives the channel quality parameter request sent by the network device to the terminal device when the network device requires the channel quality parameter difference, and feeds back the channel quality parameter difference required by the network device, so that the terminal device is prevented from reporting an extra channel quality parameter difference, thereby further reducing signaling overheads.

In some possible implementations, the method further includes: receiving, by the terminal device, a channel quality parameter request sent by the network device, where the channel quality parameter request is used to request the channel quality parameter difference between the channel quality parameter corresponding to the at least one BLER in the second BLER subset in each of the at least one BLER set and the channel quality parameter corresponding to the at least one BLER in the first BLER subset; and sending, by the terminal device, the channel quality parameter difference between the channel quality parameter corresponding to the at least one BLER in the second BLER subset in each of the at least one BLER set and the channel quality parameter corresponding to the at least one BLER in the first BLER subset to the network device according to the channel quality parameter request.

The terminal device may send, to the network device, all channel quality parameter differences requested by the network device, to determine channel quality parameters corresponding to all BLERs, thereby improving reliability of channel quality.

In some possible implementations, the method further includes: if the method is applied to a system that supports at least two BLER sets, any two of the at least two BLER sets correspond to different CQI levels.

The terminal device may send, to the network device, channel quality parameter differences between channel quality parameters corresponding to BLERs in different CQI levels requested by the network device, thereby improving accuracy of determining a channel quality parameter corresponding to a BLER in the second BLER subset.

In some possible implementations, if the method is applied to a system that supports at least two BLER sets, any two of the at least two BLER sets correspond to different transmission modes.

The terminal device may send, to the network device, channel quality parameter differences between channel quality parameters corresponding to BLERs in different transmission modes requested by the network device, thereby improving accuracy of determining a channel quality parameter corresponding to a BLER in the second BLER subset.

In some possible implementations, the transmission modes include an antenna port configuration and/or a multiple-input multiple-output MIMO preprocessing mode.

The terminal device may send, to the network device, channel quality parameter differences between channel quality parameters corresponding to BLERs in different antenna port configurations and/or multiple-input multiple-output MIMO preprocessing modes requested by the network device, thereby further improving accuracy of determining a channel quality parameter corresponding to a BLER in the second BLER subset.

According to a fifteenth aspect, a communication method is provided, including: determining, by a terminal device, indication information based on a correspondence table, where the indication information is used to indicate at least one channel quality indicator CQI index, the correspondence table includes N CQI indexes, M modulation schemes, and K code rate parameters, at least one of the N CQI indexes corresponds to one type of modulation scheme, K of the N CQI indexes are in a one-to-one correspondence with the K code rate parameters, and a product of a code rate corresponding to a first CQI index of the N CQI indexes and a modulation order of a modulation scheme corresponding to the first CQI index is a value greater than 0 and less than 0.0781, where Code Rate Parameter=Code Rate×1024, N>M, N≥K, and N, K, and M are all positive integers; and sending, by the terminal device, the indication information to a network device.

In this embodiment of this application, the terminal device determines the indication information based on the correspondence table, where the indication information is used to indicate the at least one channel quality indicator CQI index, the correspondence table includes the N CQI indexes, the M modulation schemes, and the K code rate parameters, the at least one of the N CQI indexes corresponds to one type of modulation scheme, the K of the N CQI indexes are in a one-to-one correspondence with the K code rate parameters, and the product of the code rate corresponding to the first CQI index of the N CQI indexes and the modulation order of the modulation scheme corresponding to the first CQI index is a value greater than 0 and less than 0.0781, where Code Rate Parameter=Code Rate× 1024, N>M, N≥K, and N, K, and M are all positive integers; and the terminal device sends the indication information, so that the network device determines, according to the indication information, the modulation scheme corresponding to the at least one CQI index. In other words, this application can be applied to a system that requires spectrum efficiency lower than 0.0781, that is, an area in a bad channel condition is covered, to ensure that a user can perform communication on a deep fading channel.

In a possible implementation, the K code rate parameters include a value greater than 0 and less than 40.

In a possible implementation, the N CQI indexes in the correspondence table are arranged in ascending order, products of modulation orders of modulation schemes corresponding to all of the first P CQI indexes of the N CQI indexes and code rates corresponding to all of the first P CQI indexes are arranged in ascending order, and a product of a modulation order of a modulation scheme corresponding to a $(P+h)^{th}$ CQI index and a code rate corresponding to the $(P+h)^{th}$ CQI index is less than a product of a modulation order of a modulation scheme corresponding to a $P^{th}$ CQI index and a code rate corresponding to the $P^{th}$ CQI index, where N>P+h, h is a value ranging from 1 to N−X, and X>P.

A spectrum efficiency value less than 0.0781 that corresponds to a CQI index may be arranged behind a maximum spectrum efficiency value, so that the terminal device can determine, as required, a quantity of bits included in channel quality indication information.

According to a sixteenth aspect, a communication method is provided, including: receiving, by a network device, indication information, where the indication information is used to indicate at least one channel quality indicator CQI index; and determining, by the network device based on a correspondence table, a modulation and coding scheme corresponding to the at least one CQI index, where the correspondence table includes N CQI indexes, M modulation schemes, and K code rate parameters, at least one of the N CQI indexes corresponds to one type of modulation scheme, K of the N CQI indexes are in a one-to-one correspondence with the K code rate parameters, and a product of a code rate parameter corresponding to a first CQI index of the N CQI indexes and a modulation order of a modulation scheme corresponding to the first CQI index is a value greater than 0 and less than 0.0781, where Code Rate Parameter=Code Rate×1024, N>M, N≥K, and N, K, and M are all positive integers.

In this embodiment of this application, the network device receives the indication information, and determines, based on the correspondence table, the modulation scheme corresponding to the at least one CQI index, where the correspondence table includes the N CQI indexes, the M modulation schemes, and the K code rate parameters, the at least one of the N CQI indexes corresponds to one type of modulation scheme, the K of the N CQI indexes are in a one-to-one correspondence with the K code rate parameters, and the product of the code rate corresponding to the first CQI index of the N CQI indexes and the modulation order of the modulation scheme corresponding to the first CQI index is a value greater than 0 and less than 0.0781, where Code Rate Parameter=Code Rate×1024, N>M, N≥K, and N, K, and M are all positive integers; and the network device sends the indication information, so that the network device determines, according to the indication information, the modulation scheme corresponding to the at least one CQI index. In other words, this application can be applied to a system that requires spectrum efficiency lower than 0.0781, that is, an area in a bad channel condition is covered, to ensure that a user can perform communication on a deep fading channel.

In a possible implementation, the K code rate parameters include a value greater than 0 and less than 40.

In a possible implementation, the N CQI indexes in the correspondence table are arranged in ascending order, products of modulation orders of modulation schemes corresponding to all of the first P CQI indexes of the N CQI indexes and code rate parameters corresponding to all of the first P CQI indexes are arranged in ascending order, and a product of a modulation order of a modulation scheme corresponding to a $(P+h)^{th}$ CQI index and a code rate parameter corresponding to the $(P+h)^{th}$ CQI index is less than a product of a modulation order of a modulation scheme corresponding to a $P^{th}$ CQI index and a code rate parameter corresponding to the $P^{th}$ CQI index, where N>P+h, h is a value ranging from 1 to N−X, and X>P.

A spectrum efficiency value less than 0.0781 that corresponds to a CQI index may be arranged behind a maximum spectrum efficiency value, so that a terminal device can determine, as required, a quantity of bits included in channel quality indication information.

According to a seventeenth aspect, a communication method is provided, where the communication method includes: determining, by a network device, indication information based on a correspondence table, where the indication information is used to indicate at least one modulation and coding scheme MCS index, the correspondence table includes N MCS indexes, M modulation schemes, and K code rate parameters, at least one of the N MCS indexes corresponds to one type of modulation scheme, K of the N MCS indexes are in a one-to-one correspondence with the K code rate parameters, and a product of a code rate corresponding to a first MCS index of the N MCS indexes and a modulation order of a modulation scheme corresponding to the first MCS index is a value greater than 0 and less than 0.0781, where Code Rate Parameter=Code Rate×1024, N>M, N≥K, and N, K, and M are all positive integers; and sending, by the network device, the indication information.

In this embodiment of this application, the network device determines the indication information based on the correspondence table, where the indication information is used to indicate the at least one channel quality indicator MCS index, the correspondence table includes the N MCS indexes, the M modulation schemes, and the K code rate parameters, the at least one of the N MCS indexes corresponds to one type of modulation scheme, the K of the N MCS indexes are in a one-to-one correspondence with the K code rate parameters, and the product of the code rate corresponding to the first MCS index of the N MCS indexes and the modulation order of the modulation scheme corresponding to the first MCS index is a value greater than 0 and less than 0.0781, where Code Rate Parameter=Code Rate× 1024, N>M, N≥K, and N, K, and M are all positive integers; and the network device sends the indication information, so that a terminal device determines, according to the indication information, the modulation scheme corresponding to the at least one MCS index. In other words, this application can be applied to a system that requires spectrum efficiency lower than 0.0781, that is, an area in a bad channel condition is covered, to ensure that a user can perform communication on a deep fading channel.

In a possible implementation, the K code rates include a value greater than 0 and less than 40, N≥K, and K is a positive integer.

In a possible implementation, the N MCS indexes in the correspondence table are arranged in ascending order, products of modulation orders of modulation schemes corresponding to all of the first P MCS indexes of the N MCS indexes and code rate parameters corresponding to all of the first P MCS indexes are arranged in ascending order, and a product of a modulation order of a modulation scheme corresponding to a $(P+h)^{th}$ MCS index and a code rate parameter corresponding to the $(P+h)^{th}$ MCS index is less than a product of a modulation order of a modulation scheme corresponding to a $P^{th}$ MCS index and a code rate parameter corresponding to the $P^{th}$ MCS index, where N>P+h, h is a value ranging from 1 to N−X, and X>P.

According to an eighteenth aspect, a communication method is provided, where the communication method includes: receiving, by a terminal device, indication information, where the indication information is used to indicate at least one modulation and coding scheme MCS index; and determining, by the terminal device based on a correspondence table, a modulation and coding scheme corresponding to the at least one MCS index, where the correspondence table includes N MCS indexes, M modulation schemes, and K code rate parameters, at least one of the N MCS indexes corresponds to one type of modulation scheme, K of the N MCS indexes are in a one-to-one correspondence with the K code rate parameters, and a product of a code rate parameter corresponding to a first CQI index of the N MCS indexes and a modulation order of a modulation scheme corresponding to the first MCS index is a value greater than 0 and less than 0.0781, where Code Rate Parameter=Code Rate×1024, N>M, N≥K, and N, K, and M are all positive integers.

In a possible implementation, the K code rate parameters include a value greater than 0 and less than 40.

In a possible implementation, the N MCS indexes in the correspondence table are arranged in ascending order, products of modulation orders of modulation schemes corresponding to all of the first P MCS indexes of the N MCS indexes and code rate parameters corresponding to all of the first P MCS indexes are arranged in ascending order, and a product of a modulation order of a modulation scheme corresponding to a $(P+h)^{th}$ MCS index and a code rate parameter corresponding to the $(P+h)^{th}$ MCS index is less than a product of a modulation order of a modulation scheme corresponding to a $P^{th}$ MCS index and a code rate parameter corresponding to the $P^{th}$ MCS index, where N>P+h, h is a value ranging from 1 to N−X, and X>P.

According to a nineteenth aspect, a network device is provided, including a processor, a memory, and a communications interface. The processor is connected to the memory and the communications interface. The memory is configured to store an instruction, the processor is configured to execute the instruction, and the communications interface is configured to communicate with another network element under control of the processor. When the processor executes the instruction stored in the memory, the processor is enabled to perform the method in the thirteenth aspect or any possible implementation of the thirteenth aspect.

According to a twentieth aspect, a terminal device is provided, including a processor, a memory, and a communications interface. The processor is connected to the memory and the communications interface. The memory is configured to store an instruction, the processor is configured to execute the instruction, and the communications interface is configured to communicate with another network element under control of the processor. When the processor executes the instruction stored in the memory, the processor is enabled to perform the method in the fourteenth aspect or any possible implementation of the fourteenth aspect.

According to a twenty-first aspect, a computer storage medium is provided, where the computer storage medium stores program code, and the program code is used to indicate an instruction used to perform the method in the thirteenth aspect or any possible implementation of the thirteenth aspect.

According to a twenty-second aspect, a computer storage medium is provided, where the computer storage medium stores program code, and the program code is used to indicate an instruction used to perform the method in the fourteenth aspect or any possible implementation of the fourteenth aspect.

According to a twenty-third aspect, a network device is provided, where the network device includes a module configured to perform the method in the thirteenth aspect or any possible implementation of the thirteenth aspect.

According to a twenty-fourth aspect, a terminal device is provided, where the terminal device includes a module configured to perform the method in the fourteenth aspect or any possible implementation of the fourteenth aspect.

According to a twenty-fifth aspect, a system is provided, where the system includes: the network device in the twenty-third aspect and the terminal device in the twenty-fourth aspect.

According to a twenty-sixth aspect, a terminal device is provided, including a processor, a memory, and a communications interface. The processor is connected to the memory and the communications interface. The memory is configured to store an instruction, the processor is configured to execute the instruction, and the communications interface is configured to communicate with another network element under control of the processor. When the processor executes the instruction stored in the memory, the processor is enabled to perform the method in the fifteenth aspect or any possible implementation of the fifteenth aspect.

According to a twenty-seventh aspect, a network device is provided, including a processor, a memory, and a communications interface. The processor is connected to the memory and the communications interface. The memory is configured to store an instruction, the processor is configured to execute the instruction, and the communications interface is configured to communicate with another network element under control of the processor. When the processor executes the instruction stored in the memory, the processor is enabled to perform the method in the sixteenth aspect or any possible implementation of the sixteenth aspect.

According to a twenty-eighth aspect, a computer storage medium is provided, where the computer storage medium stores program code, and the program code is used to indicate an instruction used to perform the method in the fifteenth aspect or any possible implementation of the fifteenth aspect.

According to a twenty-ninth aspect, a computer storage medium is provided, where the computer storage medium stores program code, and the program code is used to indicate an instruction used to perform the method in the sixteenth aspect or any possible implementation of the sixteenth aspect.

According to a thirtieth aspect, a terminal device is provided, where the terminal device includes a module configured to perform the method in the fifteenth aspect or any possible implementation of the fifteenth aspect.

According to a thirty-first aspect, a network device is provided, where the network device includes a module configured to perform the method in the sixteenth aspect or any possible implementation of the sixteenth aspect.

According to a thirty-second aspect, a system is provided, where the system includes: the terminal device in the thirtieth aspect and the network device in the thirty-first aspect.

According to a thirty-third aspect, a network device is provided, including a processor, a memory, and a communications interface. The processor is connected to the memory and the communications interface. The memory is configured to store an instruction, the processor is configured to execute the instruction, and the communications interface is configured to communicate with another network element under control of the processor. When the processor executes the instruction stored in the memory, the processor is enabled to perform the method in the seventeenth aspect or any possible implementation of the seventeenth aspect.

According to a thirty-fourth aspect, a terminal device is provided, including a processor, a memory, and a communications interface. The processor is connected to the memory and the communications interface. The memory is configured to store an instruction, the processor is configured to execute the instruction, and the communications interface is configured to communicate with another network element under control of the processor. When the processor executes the instruction stored in the memory, the processor is enabled to perform the method in the eighteenth aspect or any possible implementation of the eighteenth aspect.

According to a thirty-fifth aspect, a computer storage medium is provided, where the computer storage medium stores program code, and the program code is used to indicate an instruction used to perform the method in the seventeenth aspect or any possible implementation of the seventeenth aspect.

According to a thirty-sixth aspect, a computer storage medium is provided, where the computer storage medium stores program code, and the program code is used to indicate an instruction used to perform the method in the eighteenth aspect or any possible implementation of the eighteenth aspect.

According to a thirty-seventh aspect, a network device is provided, where the network device includes a module configured to perform the method in the seventeenth aspect or any possible implementation of the seventeenth aspect.

According to a thirty-eighth aspect, a terminal device is provided, where the terminal device includes a module configured to perform the method in the eighteenth aspect or any possible implementation of the eighteenth aspect.

According to a thirty-ninth aspect, a system is provided, where the system includes: the network device in the thirty-seventh aspect and the terminal device in the thirty-eighth aspect.

According to the foregoing solutions, in the embodiments of this application, the network device may receive a channel quality parameter that corresponds to a BLER in the first BLER subset in the first BLER set and that is sent by the terminal device, and determine, based on channel quality parameters corresponding to some BLERs in the first BLER subset and the channel quality parameter difference between the channel quality parameter corresponding to each BLER in the second BLER subset and the channel quality parameter corresponding to the at least one BLER in the first BLER subset, channel quality parameters corresponding to all BLERs in the second BLER subset. In other words, the network device can determine channel quality parameters corresponding to all BLERs in the first BLER set, and therefore the terminal device does not need to send the channel quality parameters corresponding to all the BLERs in the first BLER set, thereby reducing signaling overheads.

BRIEF DESCRIPTION OF THE DRAWINGS

FIG. 2 is a value table of a CQI absolute indicator value in the current system;

FIG. 3 is a value table of a CQI differential indicator value in the current system;

FIG. 9 is a schematic diagram of a CQI table according to an embodiment of this application;

FIG. 11A and FIG. 11B are a schematic diagram of an MCS table according to an embodiment of this application;

DETAILED DESCRIPTION OF ILLUSTRATIVE EMBODIMENTS

The following describes technical solutions in this application with reference to the accompanying drawings.

The following describes the embodiments of this application with reference to the accompanying drawings in the embodiments of this application.

A preset set in the embodiments of this application may be a set preset in a network device and a terminal device.

Figure 1:
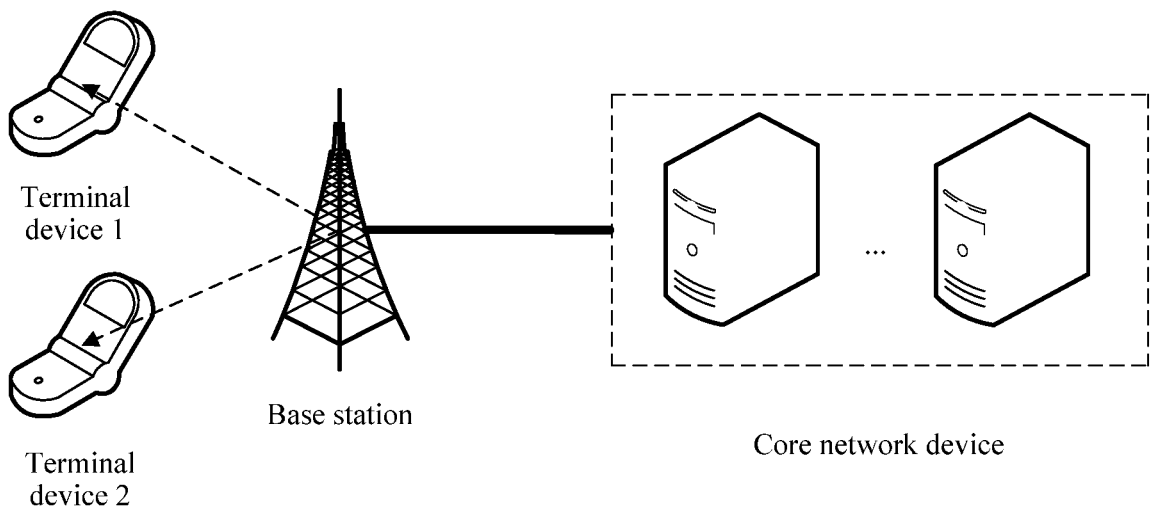
FIG. 1 is a schematic diagram of an application scenario according to an embodiment of this application.

The embodiments of this application may be applied to a wireless communications system. The wireless communications system usually includes a cell, and each cell includes one base station (BS). As shown in FIG. 1, a base station provides a communication service for a plurality of terminal devices, and the base station is connected to a core network device. The base station includes a baseband unit (BBU) and a remote radio unit (RRU). The BBU and the RRU may be placed in different places. For example, the RRU is remotely deployed and is placed in an open area far away from a heavy-traffic area, and the BBU is placed in a central equipment room. Alternatively, the BBU and the RRU may be placed in a same equipment room. The BBU and the RRU may be different components in a same rack.

It should be noted that the wireless communications system in the embodiments of this application includes but is not limited to a narrowband internet of things (NB-IoT) system, a global system for mobile communications (GSM), an enhanced data rates for GSM evolution (EDGE) system, a wideband code division multiple access (WCDMA) system, a code division multiple access 2000 (CDMA2000) system, a time division-synchronous code division multiple access (TD-SCDMA) system, a long term evolution (LTE) system, a 5G system, and a future mobile communications system.

The base station in the embodiments of this application is an apparatus that is deployed in a radio access network and that is configured to provide a wireless communication function for the terminal device. The base station may include a macro base station, a micro base station (also referred to as a small cell), a relay station, an access point, a transmission reception point (TRP), and the like in various forms. In systems that use different radio access technologies, names of a device that has a base station function may be different. For example, in an LTE system, the device is referred to as an evolved NodeB (eNB or eNodeB), and in a $3^{rd}$ generation (3G) system, the device is referred to as a NodeB (NB). For ease of description, in all the embodiments of this application, all the foregoing apparatuses that provide a wireless communication function for the terminal device are collectively referred to as the network device.

The terminal device in the embodiments of this application may include various handheld devices, vehicle-mounted devices, wearable devices, or computing devices that have a wireless communication function, or other processing devices connected to a wireless modem. The terminal device may also be referred to as a mobile station (MS), a terminal, or may include a subscriber unit, a cellular phone, a smartphone, a wireless data card, a personal digital assistant (PDA) computer, a tablet computer, a wireless modem, a handset, a laptop computer, a machine type communication (MTC) terminal, and the like. For ease of description, the devices described above are collectively referred to as the terminal device in all the embodiments of this application.

For example, a 5G communications system supports a plurality of service types, different deployment scenarios, and a wider spectrum range. The plurality of service types include but are not limited to enhanced mobile broadband (eMBB), massive machine type communication (mMTC), ultra-reliable and low latency communications (URLLC), a multimedia broadcast multicast service (MBMS), a positioning service, and the like. The different deployment scenarios include but are not limited to an indoor hotspot scenario, a dense urban scenario, a rural scenario, an urban macro scenario, a high-speed railway scenario, and the like. The wider spectrum range indicates that 5G supports a spectrum range up to 100 GHz, and the spectrum range includes a low-frequency part less than 6 GHz and a high-frequency part ranging from 6 GHz to 100 GHz.

Compared with a 4G communications system, one feature of the 5G communications system is that a URLLC service is supported. There are a plurality of URLLC service types, and typical examples include industrial control, industrial production process automation, human computer interaction, telemedicine, and the like. To better quantize performance indicators of a URLLC service to provide a reference input and evaluation criterion for designing the 5G system, the 3GPP RAN and RAN1 working groups define the following performance indicators of the URLLC service.

A latency is a transmission time that is required when a service data unit (SDU) of a user application layer packet is transmitted from a radio protocol stack layer 2/3 of a transmit end to a radio protocol stack layer 2/3 of a receive end. Both an uplink user plane latency requirement and a downlink user plane latency requirement of a URLLC service are 0.5 ms, and the foregoing requirements are applicable only when neither a base station nor a terminal is in a discontinuous reception state. It should be noted that the latency performance requirement of 0.5 ms herein means an average latency of a data packet.

Reliability is a success probability that X bits are correctly transmitted from the transmit end to the receive end in a particular time (e.g., L seconds) in a given channel quality condition. The foregoing time is also defined as a time that is required when a service data unit (SDU) of a user application layer packet is transmitted from a radio protocol stack layer 2/3 of a transmit end to a radio protocol stack layer 2/3 of a receive end. For a URLLC service, a typical requirement is achieving reliability of 99.999% in 1 ms. It should be noted that the foregoing performance indicator is merely a typical value. Specifically, the URLLC service may have different reliability requirements. For example, some extremely hash industrial control requires an end-to-end latency of 0.25 ms and a transmission success probability of 99.9999999%.

A system capacity is a maximum cell throughput of a system when a particular proportion of user interruption is met. The user interruption herein means that the system cannot meet a reliability requirement of the URLLC service in a particular latency range.

It may be learned from the foregoing description that a strict reliability requirement needs to be met in a harsh transmission latency condition, and each transmission, especially retransmission, needs to be as correct as possible. However, robust reduction of a modulation and coding level only leads to low system transmission efficiency. Therefore, a channel quality feedback needs to be enhanced, so that not only transmission reliability can be ensured, but also scheduling with excessively low transmission efficiency can be avoided.

For example, a CQI feedback technology is a typical channel quality feedback technology. In a long term evolution (LTE) system, the CQI feedback technology includes an absolute indicator value feedback and a differential indicator value feedback. A CQI absolute indicator value is shown in a table in FIG. 2. As shown in the figure, each CQI index corresponds to modulation and a code rate in a specified channel condition. CQI absolute indicator values in a table form a channel quality indicator CQI set.

In the CQI absolute indicator value feedback, after obtaining current channel quality through measurement, the terminal device feeds back one type of feedback information, and the feedback information corresponds to a CQI index corresponding to the current channel quality. In other words, one type of feedback information corresponds to one type of CQI index. For example, if 16 types of CQI indexes are included, four-bit feedback information needs to be used for a feedback. Usually, a few types of CQI indexes are set to reduce feedback overheads. For example, only 16 types of CQI indexes are set. This indication is relatively coarse, and precision is not high.

Further, relatively large overheads are caused when an absolute indicator value feedback is used. In the industry, a CQI is gradually fed back by using a differential indicator value feedback. In the differential indicator value feedback, a CQI reference index value is first determined, and an offset is calculated for each remaining CQI index by using the reference index value as a reference. Therefore, the terminal device only needs to feed back feedback information corresponding to the offset. To reduce overheads of feedback information, several optional offsets are determined to form a channel quality indicator CQI set, and one type of feedback information corresponds to one offset. For example, a channel quality indicator CQI set is {−1, 0, 1, 2}. The terminal device may feed back the four offsets by using two-bit feedback information. Currently, the channel quality indicator CQI set, for example, a channel quality indicator CQI set shown in a table in FIG. 3, is specified for all cases in the industry. Reference index values are different in different feedback scenarios, and definitions of offsets are also different. For example, an offset between a wideband CQI index of a code word 0 and a wideband CQI index of a code word 1 is calculated by using the wideband CQI index of the code word 1 as a reference index value. For example, an offset between a subband CQI index and a wideband CQI index is calculated by using the wideband CQI index as a reference index value. For example, an offset between a CQI index of each of selected M subbands with best signal quality and a wideband CQI index is calculated by using the wideband CQI index as a reference index value.

In a specific feedback scenario, all terminal devices use a same channel quality indicator set, resulting in an inaccurate channel quality indication. For example, for the channel quality indicator set in FIG. 3, when an offset is 2, feedback information fed back by the terminal device is 0, and when an offset is 5, the feedback information fed back by the terminal device is still 10. Therefore, the terminal device cannot accurately indicate current channel quality of a channel.

Regardless of the absolute indicator value feedback or the differential indicator value feedback, feedbacks are not accurate because all terminal devices use the same set to provide feedbacks. To resolve the foregoing problem, in the embodiments of this application, a channel quality indicator set is independently configured for each terminal device. It should be noted that a channel quality indicator value included in the channel quality indicator set may be an absolute indicator value or a differential indicator value.

It should be noted that a quantity of channel quality indicator values included in the channel quality indicator set configured for the terminal device is not limited in the embodiments of this application, and there may be one or more channel quality indicator values. The channel quality indicator value is used to indicate channel quality.

For example, the channel quality indicator set includes a channel quality absolute indicator value (for example, a CQI index). The network device configures one channel quality indicator set for each terminal device. The channel quality indicator set may be a preset set or a subset of the preset set specified in a protocol, the preset set specified in the protocol includes a relatively large quantity of absolute indicator values, a division granularity is relatively fine, and each absolute indicator value corresponds to one modulation and coding policy in a specific channel condition. If a channel quality change of each terminal device varies, a configured channel quality indicator set also varies, that is, a subset selected from the preset set varies. Alternatively, the channel quality indicator set configured by the network device for each terminal device may be at least one of a plurality of preset sets specified in a protocol. For example, the network device configures a plurality of channel quality indicator sets for one terminal device, and one channel quality indicator set corresponds to one service type. When feeding back different service types, the terminal device provides feedbacks by using different channel quality indicator sets. Optionally, at least two of the plurality of preset sets include different quantities of absolute indicator values.

For another example, the channel quality indicator set includes a differential indicator value (for example, an offset of a CQI index). The network device configures one channel quality indicator set for each terminal device, where the channel quality indicator set adapts to a channel quality change of the terminal device. For example, if the terminal device is a center user, it indicates that channel quality of the terminal device is relatively good, an SINR fluctuation is relatively small, and a fluctuation in a differential indicator value in the channel quality indicator set is relatively small. If the terminal device is an edge user, it indicates that channel quality of the terminal device is relatively poor, an SINR fluctuation is relatively large, and a fluctuation in a differential indicator value in the channel quality indicator set is relatively large. Each terminal device can accurately indicate channel quality of the terminal device by using feedback information.

The channel quality indicator set specially configured for the terminal device is used, so that the terminal device can accurately feed back current channel quality.

A channel quality feedback method provided in the embodiments of this application is described below in detail.

Figure 4:
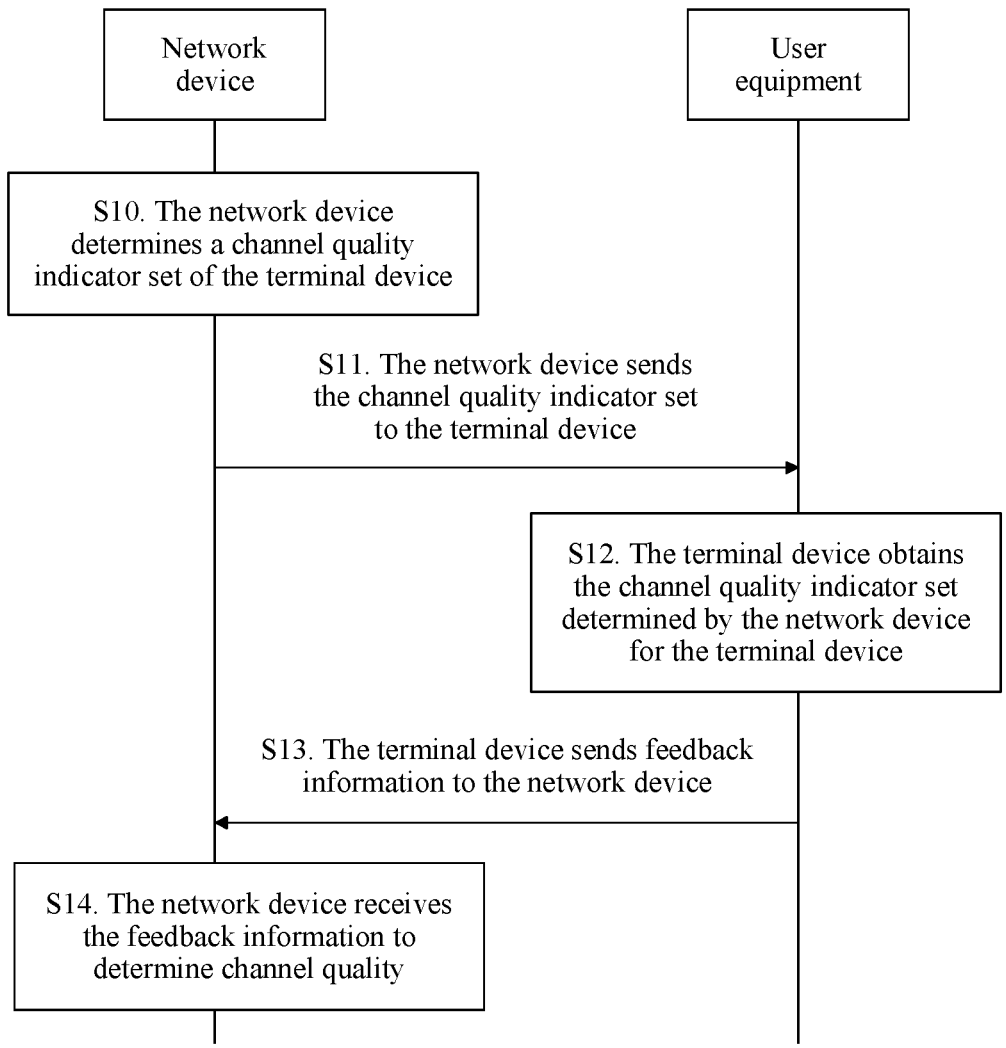
FIG. 4 is an interaction flowchart of a channel quality feedback method according to an embodiment of this application.

FIG. 4 is a schematic flowchart of a channel quality feedback method according to an embodiment of this application. The method is described from a perspective of interaction between a network device and a terminal device, and the method may include but is not limited to the following steps:

Step S10: The network device determines a channel quality indicator set of the terminal device, where the channel quality indicator set includes a channel quality indicator value, and the channel quality indicator value is used to indicate channel quality.

Step S11: The network device sends the channel quality indicator set to the terminal device.

Step S12: The terminal device obtains the channel quality indicator set determined by the network device for the terminal device, where the channel quality indicator set includes a channel quality indicator value, and the channel quality indicator value is used to indicate channel quality.

Step S13: The terminal device sends feedback information to the network device, where the feedback information is used to indicate a target channel quality indicator value, the target channel quality indicator value is a channel quality indicator value in the channel quality indicator set, and the target channel quality indicator value is used to determine current channel quality of a channel.

Step S14: The network device receives the feedback information to determine channel quality.

In this embodiment of this application, the network device independently determines the channel quality indicator set for the terminal device, and sends the determined channel quality indicator set to the terminal device. The terminal device subsequently feeds back the channel quality to the network device based on the channel quality indicator set. Optionally, that the network device independently determines the channel quality indicator set for the terminal device may be that the network device configures the channel quality indicator set for the terminal device.

Optionally, the channel quality indicator set includes at least one channel quality indicator value, and the channel quality indicator value is used to indicate channel quality. The channel quality indicator value may be a channel quality differential indicator value or a channel quality absolute indicator value, the channel quality differential indicator value is used to indicate an offset between a channel quality measurement value and a channel quality reference value, and the channel quality absolute indicator value is used to indicate a channel quality measurement value. Optionally, the channel quality may be a CQI, an MCS or a BLER, and this is not limited in this application. The CQI, the MCS, and the BLER are merely used as examples for description herein.

Optionally, if the channel quality is a CQI, the channel quality measurement value may be a CQI index in a current channel quality condition, and the channel quality reference value may be a CQI index that is fed back at a time closest to a reference time corresponding to the measurement value (which may be a CQI index that is periodically fed back at the time closest to the reference time corresponding to the measurement value, or may be a CQI index that is aperiodically fed back at the time closest to the reference time corresponding to the measurement value, or may be a channel quality value that is fed back at the time closest to the reference time corresponding to the measurement value and that is in a specific channel quality reporting set).

Figure 7:
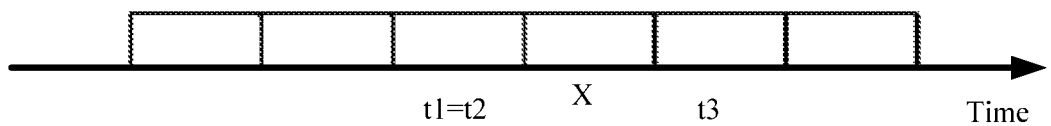
FIG. 7 is a schematic diagram of a reference time according to an embodiment of this application.
Figure 8:
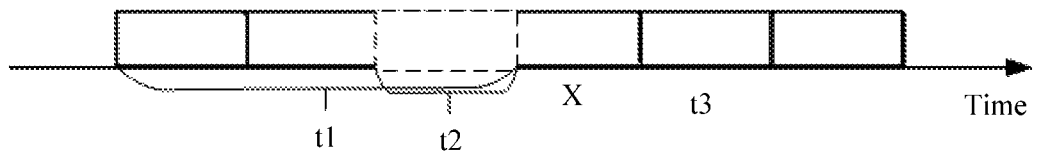
FIG. 8 is another schematic diagram of a reference time according to an embodiment of this application.

The reference time corresponding to the measurement value may be a reference measurement time corresponding to the measurement value or a measurement reporting time corresponding to the measurement value. The measurement reporting time corresponding to the measurement value is a time for sending feedback information (the feedback information is used to indicate channel quality to the network device based on the channel quality measurement value) for the channel quality measurement value by the terminal device, and the reference measurement time is usually defined as a preset time period before the measurement reporting time (for example, two subframes before the measurement reporting time). The terminal device measures the channel quality to obtain the channel quality measurement value, and a measurement time for measuring the channel quality by the terminal device overlaps with the reference measurement time, or there are a plurality of measurement times, and the reference measurement time is one of the measurement times. As shown in FIG. 7, t3 represents a measurement reporting time, t2 represents a reference measurement time, and t1 represents a measurement time. In FIG. 7, an interval between t2 and t3 is one subframe, and t1 and t2 overlap. As shown in FIG. 8, t3 represents a measurement reporting time, t2 represents a reference measurement time, and t1 represents a measurement time. In FIG. 8, an interval between t2 and t3 is one subframe, t1 spans three subframes (that is, the terminal device measures channel quality in all the three subframes, and finally feeds back a channel quality average), and t2 is a subframe in t1. The interval between t2 and t3 is usually specified in a protocol.

Optionally, if the channel quality is an MCS, the channel quality measurement value may be an MCS level to match a target block error rate with a current channel quality condition, and the channel quality reference value may be an MCS level used for current transmission.

Optionally, if the channel quality is a BLER, the channel quality measurement value may be a BLER level corresponding to an MCS used for current transmission in a current channel quality condition, and the channel quality reference value may be an expected target BLER level in current transmission. BLER levels may include $\{1, 2, 3, 4, 5\}$, and BLERs corresponding to the BLER levels are $\{10^{\wedge}-1, 10^{\wedge}-2, 10^{\wedge}-3, 10^{\wedge}-4, 10^{\wedge}-5\}$.

In an optional implementation, a channel quality indicator value in the channel quality indicator set is a channel quality differential indicator value, that is, the channel quality indicator value is an offset between a channel quality measurement value and a channel quality reference value. Because channel quality changes of different terminal devices are different, a channel quality indicator set needs to be independently configured for each terminal device. A channel quality indicator value in the channel quality indicator set is set based on a channel quality change of the terminal device, and can accurately reflect the channel quality change of the terminal device.

Figure 5:
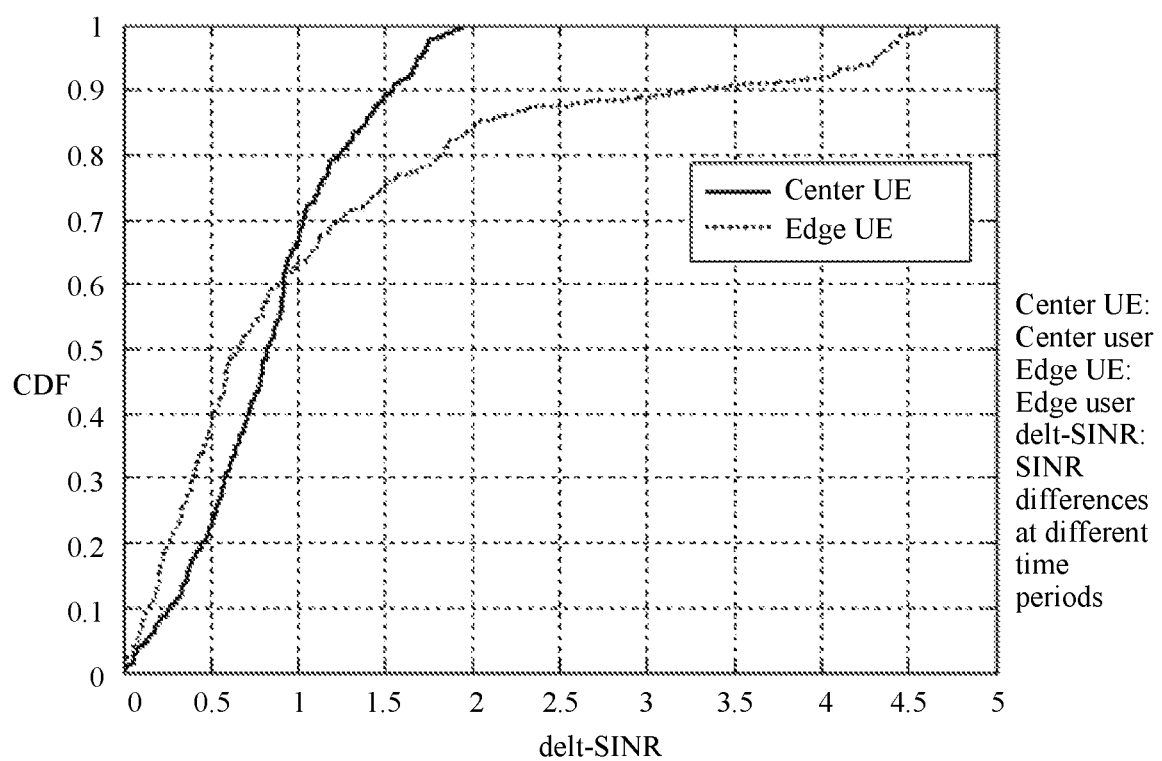
FIG. 5 is a schematic diagram of an SINR fluctuation according to an embodiment of this application.

For example, a received signal to interference plus noise ratio (Signal to Interference plus Noise Ratio, SINR) of a terminal device on a cell edge or in a cell center varies with time. As shown in FIG. 5, a solid line is a cumulative distribution function (cumulative distribution function, CDF) distribution curve of an SINR fluctuation of a cell center user at intervals of 10 ms, and SINR fluctuations corresponding to 50%, 80%, and 95% are respectively 0.8 dB, 1.2 dB, and 1.7 dB. A dotted line in FIG. 5 is a CDF distribution curve of an SINR fluctuation of a cell edge user at intervals of 10 ms, and SINR fluctuations corresponding to 50%, 80%, and 95% are respectively 0.9 dB, 2 dB, and 4.3 dB, as shown in the following table:

|  | 50% | 80% | 95% |
| --- | --- | --- | --- |
| Center user | 0.8 dB | 1.2 dB | 1.7 dB |
| Edge user | 0.9 dB | 2 dB | 4.3 dB |

It may be learned from the foregoing table that an SINR fluctuation of the cell edge user is significantly higher than that of the center user. The network device may separately configure channel quality indicator sets for the edge user and the center user. The following uses an example in which the channel quality is a CQI for description. The channel quality measurement value is a CQI index obtained through measurement, and the channel quality reference value is a CQI reference index value. The differential indicator value is an offset between the CQI index obtained through measurement and the CQI reference index value.

For example, a channel quality indicator set configured for the center user is $\{-1.2, -0.8, 0, 0.8\}$, and a channel quality indicator set configured for the edge user is $\{-3, -1.3, 0, 1.3\}$. A fluctuation between channel quality indicator values in the channel quality indicator set configured for the center user is relatively small, and a fluctuation between channel quality indicator values in the channel quality indicator set configured for the edge user is relatively large. This is mainly to adapt to characteristics of channel quality changes of the center user and the edge user.

It may be learned from the foregoing description that, although there are only four differential indicator values in the channel quality indicator set and corresponding UCI signaling has two bits, each user can accurately indicate a current channel quality fluctuation by using a user-specific channel quality indicator set.

In the current system, there is only one channel quality indicator set of $\{-2, -1, 0, 1\}$ in a scenario. For example, the first value indicates an excessive downward offset for the center user (a relatively low MCS level is used for subsequent transmission), resulting in a waste of transmission resources. The first value indicates an insufficient downward offset for the edge user, and therefore a base station configures a relatively high MCS level for the terminal, resulting in a transmission error.

In addition to determining a differential indicator value in the channel quality indicator set based on a cell attribute of the center user or the edge user of the terminal device, configuration may be performed based on a channel quality historical value reported by the terminal device. For example, if CQI indexes historically reported by the terminal device are relatively small or fluctuate greatly, a relatively large channel quality indicator value is set in the channel quality indicator set. Otherwise, a relatively small value is set.

Optionally, a differential indicator value in the channel quality indicator set may be an integer and/or a fraction. For example, the channel quality indicator set is $\{-0.3, 0, 0.3, 0.6\}$.

Optionally, differential indicator values in the channel quality indicator set may be nonuniformly distributed. For example, the channel quality indicator set is $\{-5, -1, 0, 1, 5\}$.

Figure 6:
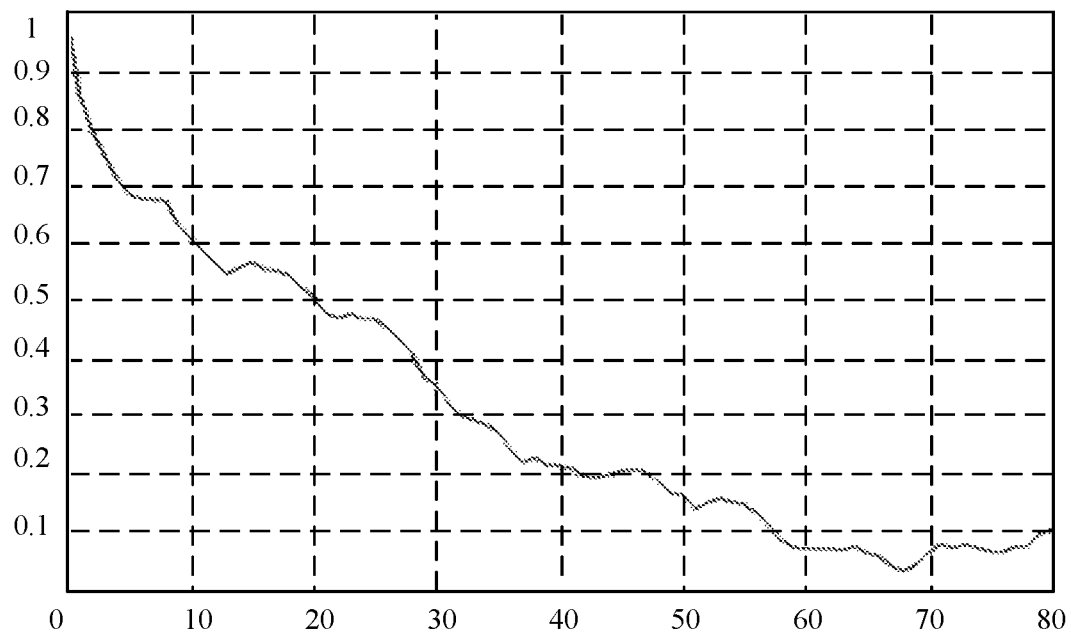
FIG. 6 is a simulation diagram of a time correlation according to an embodiment of this application.

Further, optionally, a channel quality change is also correlated to duration of a time period. FIG. 6 is a simulation diagram of duration of a time period and an SINR correlation of a channel according to an embodiment of this application. Horizontal coordinates in the simulation diagram represent a time period in milliseconds, and vertical coordinates represent an SINR correlation coefficient. As shown in the figure, a longer time period indicates a smaller SINR correlation of the channel and a larger fluctuation in a channel quality differential indicator value in a corresponding channel quality indicator set. In contrast, a shorter time period indicates a larger SINR correlation of the channel and a smaller fluctuation in a channel quality differential indicator value in a corresponding channel quality indicator set.

In this embodiment of this application, the channel quality differential indicator value in the channel quality indicator set is used to indicate the offset between the channel quality measurement value and the channel quality reference value, that is, a time period between the reference time corresponding to the channel quality measurement value and a reference time corresponding to the channel quality reference value determines a fluctuation in the differential indicator value in the channel quality indicator set. It should be noted that the reference time corresponding to the channel quality reference value is a reference measurement time corresponding to the channel quality reference value or a measurement reporting time corresponding to the channel quality reference value. A definition of the reference measurement time corresponding to the channel quality reference value herein is the same as that of the reference measurement time corresponding to the measurement value, and a definition of the measurement reporting time corresponding to the channel quality reference value herein is the same as that of the measurement reporting time corresponding to the measurement value. Details are not described herein again.

In this embodiment of this application, for a same terminal device, it is set that intervals of a plurality of time periods respectively correspond to a plurality of channel quality indicator sets, and the intervals of the plurality of time periods do not overlap. A time period is a time difference between a reference time corresponding to a measurement value and a reference time corresponding to a channel quality reference value. An interval of a first time period and an interval of a second time period in this embodiment of this application may be intervals of any two time periods of the intervals of the plurality of time periods. The interval of the first time period corresponds to a first channel quality indicator set, and the interval of the second time period corresponds to a second channel quality indicator set.

Optionally, if a time period in the interval of the first time period is less than a time period in the interval of the second time period, a fluctuation in a differential indicator value in the first channel quality indicator set is less than a fluctuation in a differential indicator value in the second channel quality indicator set. For example, a variance of the differential indicator values in the first channel quality indicator set may be less than a variance of the differential indicator values in the second channel quality indicator set.

For example, when the network device sets an interval of a time period to be less than 5 ms, a corresponding channel quality indicator set is {−0.5, 0, 0.5, 1}; when the network device sets an interval of a time period to be greater than 5 ms and less than 10 ms, a corresponding channel quality indicator set is {−1, 0, 1, 2}; when the network device sets an interval of a time period to be greater than 10 ms, a corresponding channel quality indicator set is {−2, 0, 2, 4}.

Further, optionally, a channel quality change is also correlated to a value of a reference BLER. For example, if a BLER corresponding to a measurement value is the same as a BLER corresponding to a reference value, an SINR difference is relatively small, and correspondingly, a fluctuation in a channel quality differential indicator value in a channel quality indicator set is relatively small. If a BLER corresponding to a measurement value is different from a BLER corresponding to a reference value, an SINR difference is relatively large, and correspondingly, a fluctuation in a channel quality differential indicator value in a channel quality indicator set is relatively large. In addition, if the BLER corresponding to the measurement value is greater than the BLER corresponding to the reference value, the differential indicator value in the channel quality indicator set is greater than 0 or equal to 0. If the BLER corresponding to the measurement value is less than the BLER corresponding to the reference value, the differential indicator value in the channel quality indicator set is less than 0 or equal to 0.

In this embodiment of this application, for a same terminal device, it is set that intervals of a plurality of BLER differences respectively correspond to a plurality of channel quality indicator sets, and the intervals of the plurality of BLER differences do not overlap. A BLER difference is a block error rate difference between a BLER corresponding to a measurement value and a BLER corresponding to a channel quality reference value. An interval of a first BLER difference and an interval of a second BLER difference in this embodiment of this application may be intervals of any two BLER differences of the intervals of the plurality of BLER differences. The interval of the first BLER difference corresponds to a first channel quality indicator set, and the interval of the second BLER difference corresponds to a second channel quality indicator set.

Optionally, if an absolute indicator value of a BLER difference in the interval of the first BLER difference is less than an absolute indicator value of a BLER difference in the interval of the second BLER difference, a fluctuation in a differential indicator value in the first channel quality indicator set is less than a fluctuation in a differential indicator value in the second channel quality indicator set. For example, a variance of the differential indicator values in the first channel quality indicator set may be less than a variance of the differential indicator values in the second channel quality indicator set.

Optionally, different channel quality indicator sets may be further determined based on a result of comparing a BLER difference in a BLER difference interval with 0. If a BLER difference is 0, a channel quality indicator set is {−0.5, 0, 0.5, 1}. If a BLER difference is greater than 0, a channel quality indicator set is {0, 1, 2, 3}. If a BLER difference is less than 0, a channel quality indicator set is {−3, −2, −1, 0}.

The network device sends the configured channel quality indicator set to the terminal device. Optionally, the channel quality indicator set may be sent by using a higher layer signaling configuration, or the channel quality indicator set may be sent by using a MAC CE signaling configuration. Further, the channel quality indicator set may be alternatively sent by using a user-specific signaling configuration.

The terminal device obtains the channel quality indicator set determined by the network device for the terminal device, where the channel quality indicator set includes a channel quality differential indicator value. For example, the channel quality indicator set determined by the network device for the terminal device is {−1, 0, 1, 2}. The terminal device measures a channel and feeds back channel quality. For example, the terminal device measures a channel at a moment t1, obtains a channel quality measurement value CQI of 3, and uses a CQI index fed back at a moment to as a reference value. It is assumed that the CQI index fed back at the moment to is 2, and the moment to is before the moment t1. A difference between the channel quality measurement value and the channel quality reference value is 3−2=1.

The following table shows a correspondence between feedback information and a CQI differential indicator value. It may be learned from the following table that the terminal device sends feedback information of 10.

| UCI bit | CQI differential indicator value |
| --- | --- |
| 00 | −1 |
| 01 | 0 |
| 10 | 1 |
| 11 | 2 |

After receiving the feedback information, the network device may obtain the channel quality measurement value through calculation based on the channel quality reference value. The channel quality measurement value is used to indicate current channel quality, and further affects an MCS and/or power configured during subsequent scheduling by the network device.

Optionally, for a same terminal device, channel quality indicator sets configured by the network device are a plurality of channel quality indicator sets that respectively correspond to intervals of a plurality of time periods. For example, when the network device sets an interval of a time period to be less than 5 ms, a corresponding channel quality indicator set is {−0.5, 0, 0.5, 1}, when the network device sets an interval of a time period to be greater than 5 ms and less than 10 ms, a corresponding channel quality indicator set is {−1, 0, 1, 2}, and when the network device sets an interval of a time period to be greater than 10 ms, a corresponding channel quality indicator set is {−2, 0, 2, 4}.

The terminal device measures a channel at a moment t1, obtains a channel quality measurement value CQI of 3, and uses a CQI index fed back at a moment to as a reference value. It is assumed that the CQI index fed back at the moment to is 2, and the moment to is before the moment t1. A difference between the channel quality measurement value and the channel quality reference value is 3−2=1. If a time period between the moment t1 and the moment to is 6 ms, a corresponding channel quality indicator set is {−1, 0, 1, 2}, and feedback information corresponding to the differential indicator value of 1 is 10. The terminal device sends the feedback information of 10.

After receiving the feedback information of 10, the network device first needs to determine a first target channel quality indicator set corresponding to the feedback information. Specifically, optionally, the network device determines a time period between a reference time corresponding to the measurement value and a reference time corresponding to the reference value, determines that the time period belongs to an interval of a target time period of preset intervals of a plurality of time periods, and uses a channel quality indicator set corresponding to the interval of the target time period as the first target channel quality indicator set. For example, the network device determines that the first target channel quality indicator set is a channel quality indicator set of {−1, 0, 1, 2} corresponding to an interval of a time period greater than 5 ms and less than 10 ms. Further, a target differential indicator value is determined as 1 based on the feedback information of 10, and then the channel quality measurement value is obtained based on the channel quality reference value, where the channel quality measurement value is used to indicate current channel quality, and further affects an MCS and/or power configured during subsequent scheduling by the network device.

Optionally, for a same terminal device, channel quality indicator sets configured by the network device are a plurality of channel quality indicator sets that respectively correspond to intervals of a plurality of BLER differences, and the intervals of the plurality of BLER differences do not overlap. An interval of a third block error rate difference and an interval of a fourth block error rate difference in this embodiment of this application may be intervals of any two block error rate differences of the intervals of the plurality of BLER differences. The interval of the third block error rate difference corresponds to a third channel quality indicator set, and the interval of the fourth block error rate difference corresponds to a fourth channel quality indicator set.

For example, the plurality of channel quality indicator sets that respectively correspond to the intervals that are of the plurality of BLER differences and that are set by the network device are as follows: If a BLER difference is 0, a channel quality indicator set is {−0.5, 0, 0.5, 1}. If a BLER difference is greater than 0, a channel quality indicator set is {0, 1, 2, 3}. If a BLER difference is less than 0, a channel quality indicator set is {−3, −2, −1, 0}.

The terminal device measures a channel at a moment t1, obtains a channel quality measurement value CQI of 2 and a reference BLER of 1%, and uses a CQI index fed back at a moment to as a reference value. It is assumed that the CQI index fed back at the moment to is 2, a reference BLER of 10%, and the moment to is before the moment t1. A difference between the channel quality measurement value and the channel quality reference value is 2−2=0. If a BLER difference between a BLER corresponding to the measurement value and a BLER corresponding to the reference value is less than 0, a corresponding channel quality indicator set is {−3, −2, −1, 0}, and feedback information corresponding to the differential indicator value 0 is 11. The terminal device sends the feedback information of 11.

After receiving the feedback information of 11, the network device first needs to determine a second target channel quality indicator set corresponding to the feedback information. Specifically, optionally, the network device determines the BLER difference between the BLER corresponding to the measurement value and the BLER corresponding to the reference value, determines that the BLER difference belongs to an interval of a target BLER difference of preset intervals of a plurality of BLER differences, and uses a channel quality indicator set corresponding to the interval of the target BLER difference as the second target channel quality indicator set. For example, the network device determines that the second target channel quality indicator set is a channel quality indicator set of {−3, −2, −1, 0} corresponding to a BLER difference interval less than 0. Further, a target differential indicator value is determined as 0 based on the feedback information of 11, and then the channel quality measurement value is obtained based on the channel quality reference value, where the channel quality measurement value is used to indicate current channel quality, and further affects an MCS and/or power configured during subsequent scheduling by the network device.

In an optional implementation, a channel quality indicator value in the channel quality indicator set is a channel quality absolute indicator value, and the channel quality absolute indicator value is used to indicate a channel quality measurement value, for example, a CQI index obtained through measurement. Different users usually work in different SINR intervals. For example, an edge user usually works in a relatively low SINR, for example, −12 dB to −2 dB; a center user works in a relatively high SINR, for example, 15 dB to 25 dB. Therefore, ranges of CQI indexes measured and fed back by different users are also different. To reduce feedback overheads and classify CQI types at a finer granularity, the network device independently configures a channel quality indicator set for each terminal device. An absolute indicator value in the channel quality indicator set is set based on channel quality of the terminal device, and can accurately reflect a channel quality change of the terminal device.

Optionally, the channel quality indicator set configured by the network device for the terminal device may be a preset set or a subset of the preset set, and the preset set is a set specified in a protocol. FIG. 9 may show the preset set specified in the protocol, and the preset set includes 32 absolute indicator values. To reduce overheads, the network device configures the preset set or a subset of the preset set for each terminal device based on channel quality of the terminal device. For example, a channel quality indicator set configured by the network device for an edge user is a set whose working interval is 0 to 15, and a channel quality indicator set configured by the network device for a center user is a set whose working interval is 16 to 31. It should be noted that a valid bit L that is used to indicate CQI feedback information in UCI is correlated to a quantity S of absolute indicator values in a CQI set configured through RRC, where $L \geq \log_2(S)$.

The channel quality indicator set configured by the network device for the terminal device may be a set including consecutive values in the preset set specified in the protocol, or the channel quality indicator set configured by the network device for the terminal device may be a set including nonconsecutive values in the preset set specified in the protocol.

When indicating the channel quality indicator set to the terminal device, the network device may directly indicate an absolute indicator value included in the channel quality indicator set, for example, directly indicate a CQI index included in the channel quality indicator set. For example, a channel quality indicator set configured by the network device for a terminal device of an edge user is {0, 2, 4, 6, 8, 10, 12}, a channel quality indicator set configured by the network device for a terminal device of a center user is {14, 16, 18, 20, 22, 24}, and SINR intervals detected by the terminal device of the edge user and the terminal device of the center user are different. Therefore, CQIs of different intervals are configured.

Optionally, a quantity of absolute indicator values in the channel quality indicator set indicated by the network device to the terminal device may be specified in the protocol (the quantity specified in the protocol is a quantity preset in the network device and the terminal device), or is configurable. If the quantity of absolute indicator values in the channel quality indicator set is configurable, the quantity may be configured based on a service. For example, a quantity of absolute indicator values in a channel quality indicator set corresponding to a URLLC service is less than a quantity of absolute indicator values in a channel quality indicator set corresponding to an eMBB service. Alternatively, the network device configures the quantity of absolute indicator values in the channel quality indicator set based on a service and/or a channel quality fluctuation status. For example, a channel quality indicator set with a relatively small quantity of absolute indicator values is configured for a user at a relatively slow moving speed or a user in a static state, and a channel quality indicator set with a relatively large quantity of absolute indicator values is configured for a user at a relatively fast moving speed.

For example, a channel quality indicator set configured by the network device for a terminal device of a URLLC service is {0, 2, 4, 6, 8, . . . , 28, 30}, that is, even-numbered CQI indexes. A channel quality indicator set configured by the network device for a terminal device of an eMBB service is {0, 1, 2, . . . , 31} or {6, 8, 10, 12, 14, 16, 17, . . . , 31}.

To indicate a channel status at any moment, a relatively large SINR interval, namely, a relatively large CQI index range, needs to be configured for the terminal device of the URLLC service. However, considering a limitation of CQI indication signaling overheads on the URLLC service, elements may be uniformly selected from the preset set, but this application is not limited to uniform selection. Because the terminal device of the eMBB service is insensitive to CQI indication signaling overheads, a relatively large set may be configured for the terminal device of the eMBB service, and even the entire preset set may be configured for the terminal device of the eMBB service. If the entire preset set is configured for the terminal device of the eMBB service, the entire preset set may be configured on the terminal side by default, and no additional signaling is required for indication.

The channel quality indicator set configured by the network device for the terminal device is a set including consecutive values in the preset set specified in the protocol, or the channel quality indicator set configured by the network device for the terminal device is a set including elements at equal intervals (for example, one value is selected at intervals of one element, and indices are 3, 5, and 7) in the preset set specified in the protocol. In this case, signaling (the signaling may include but is not limited to higher layer signaling, MAC CE signaling, user-specific signaling, and the like) used by the network device to indicate the channel quality indicator set to the terminal device may indicate only an index of a starting element of the channel quality indicator set in the preset set and a quantity of elements included in the channel quality indicator set, or indicate only an index of a starting element of the channel quality indicator set in the preset set, and a quantity of elements in the channel quality indicator set is specified in the protocol. An element in the channel quality indicator set is an absolute indicator value in the channel quality indicator set.

For example, the quantity of elements in the channel quality indicator set is specified in the protocol, and the channel quality indicator set configured by the network device for the terminal device includes consecutive absolute indicator values in the preset set specified in the protocol. If the channel quality indicator set configured by the network device for the terminal device of the edge user is {0, 1, 2, 3, 4, 5, 6, 7, 8, 9, 10, 11}, 0 is indicated. If the channel quality indicator set configured by the network device for the terminal device of the center user is {10, 11, 12, 13, 14, 15, 16, 17, 18, 19, 20, 21}, 10 is indicated. Optionally, the quantity of elements in the channel quality indicator set may be bound to a service type (for example, a quantity of elements included in the channel quality indicator set of the URLLC service is 8, and a quantity of elements included in the channel quality indicator set of the eMBB service is 16).

For another example, the quantity of elements in the channel quality indicator set is specified in the protocol, and the channel quality indicator set configured by the network device for the terminal device includes elements at equal intervals in the preset set specified in the protocol, that is, values are selected at equal intervals from the preset set, and only the index of the starting element is indicated (if the channel quality is a CQI, the index is a CQI index). If the channel quality indicator set configured by the network device for the terminal device of the edge user is {0, 2, 4, 6, 8, 10}, 0 is indicated. If the channel quality indicator set configured by the network device for the terminal device of the center user is {10, 12, 14, 16, 18, 20}, 10 is indicated. Optionally, the quantity of elements in the channel quality indicator set may be bound to a service type (for example, a quantity of elements included in the channel quality indicator set of the URLLC service is 8, and a quantity of elements included in the channel quality indicator set of the eMBB service is 16).

If a manner of selecting channel quality absolute indicator values (that is, consecutively selecting values or selecting values at equal intervals) from the channel quality indicator set configured by the network device for the terminal device is determined, the network device may indicate only a starting location (the starting location may be an index, for example, a CQI index) and a quantity of absolute indicator values included in the channel quality indicator set (for example, a quantity of included CQI indexes). The starting location and the quantity of absolute indicator values may be independently coded or jointly coded.

For example, if the channel quality indicator set configured by the network device for the terminal device of the edge user is {0, 2, 4, 6, 8, 10}, {0, 6} is indicated, where 0 is a starting location, and 6 is a quantity of absolute indicator values included in the channel quality indicator set. Alternatively, two elements 0 and 6 may be jointly coded, for example, 160 is obtained through calculation according to a tree indication formula. If the channel quality indicator set configured by the network device for the terminal device of the center user is {10, 11, 12, 13, 14, 15, 16, 17, 18, 19, 20}, {10, 11} is indicated, where 10 is a starting location, and 11 is a quantity of absolute indicator values included in the channel quality indicator set. Alternatively, two elements 10 and 11 are jointly coded, for example, 331 is obtained through calculation according to the tree indication formula. The tree indication formula is as follows:

if$(L_{set}-1) \leq \lfloor N_{ca}/2 \rfloor$ then $RIV = N_{ca}(L_{set}-1) + \text{Set}_{start}$ else $RIV = N_{ca}(N_{ca}-L_{Set}+1) + (N_{ca}-1-\text{Set}_{start})$ where $L_{Set} \geq 1$ and shall not exceed $N_{ca} - \text{Set}_{start}$ $L_{Set}$ is a quantity of CQIs in the channel quality indicator set, $N_{ca}$ is a quantity of elements in the preset set, and $\text{Set}_{start}$ is a starting location.

If the channel quality indicator set configured by the network device for the terminal device includes elements randomly selected from the preset set specified in the protocol. In other words, there is no rule, signaling (the signaling may include but is not limited to higher layer signaling, MAC CE signaling, user-specific signaling, and the like) for indicating the channel quality indicator set may be used for indication to the terminal device by using a bitmap. For example, if the preset set includes 64 absolute indicator values, 64 bits are used for indication. If the channel quality indicator set includes the absolute indicator value, a bit corresponding to the absolute indicator value is set to 1. If the channel quality indicator set does not include the absolute indicator value, a bit corresponding to the absolute indicator value is set to 0.

For example, the channel quality indicator set configured by the network device for the terminal device of the edge user is {0, 2, 4, 6, 8, 10, 12}, and the channel quality indicator set configured by the network device for the terminal device of the center user is {14, 16, 18, 20, 22, 24}. In this case, when the bitmap is used for indication to the terminal device, 101010101010000 . . . 0 may be indicated to the terminal device of the edge user, and 000000000000001010101010100 . . . 0 may be indicated to the terminal device of the center user.

The terminal device obtains the channel quality indicator set determined by the network device, where the channel quality indicator set is the preset set or a subset of the preset set, and the channel quality indicator set includes a channel quality absolute indicator value. The terminal device measures channel quality, and sends, to the network device, feedback information corresponding to a channel quality measurement value. A quantity of bits for the feedback information is correlated to a quantity of absolute indicator values included in the channel quality indicator set. For example, as shown in FIG. 9, the preset set includes 32 absolute indicator values, the channel quality indicator set configured by the network device for the terminal device includes 16 absolute indicator values (for example, an interval of 0 to 15 or an interval of 16 to 31), and the terminal device may provide a feedback by using four-bit feedback information.

After receiving the feedback information sent by the terminal device, the network device needs to determine an absolute indicator value corresponding to the feedback information. For example, if the feedback information sent by the terminal device is 1111, an absolute indicator value of 15 or 31 may be indicated. Therefore, the network device needs to obtain the channel quality indicator set preconfigured for the terminal device. For example, if the channel quality indicator set preconfigured by the network device for the terminal device is 16 to 31, it indicates that the absolute indicator value corresponding to the feedback information is 31.

In this embodiment of this application, the network device configures a channel quality indicator set exclusive to each terminal device for the terminal device, where the channel quality indicator set includes a channel quality indicator value, the channel quality indicator value is used to indicate channel quality, and the channel quality indicator value is set for channel quality of the terminal device. Therefore, when feeding back the channel quality, the terminal device can accurately feed back the channel quality to the network device, thereby improving accuracy of a channel quality feedback.

Figure 10:
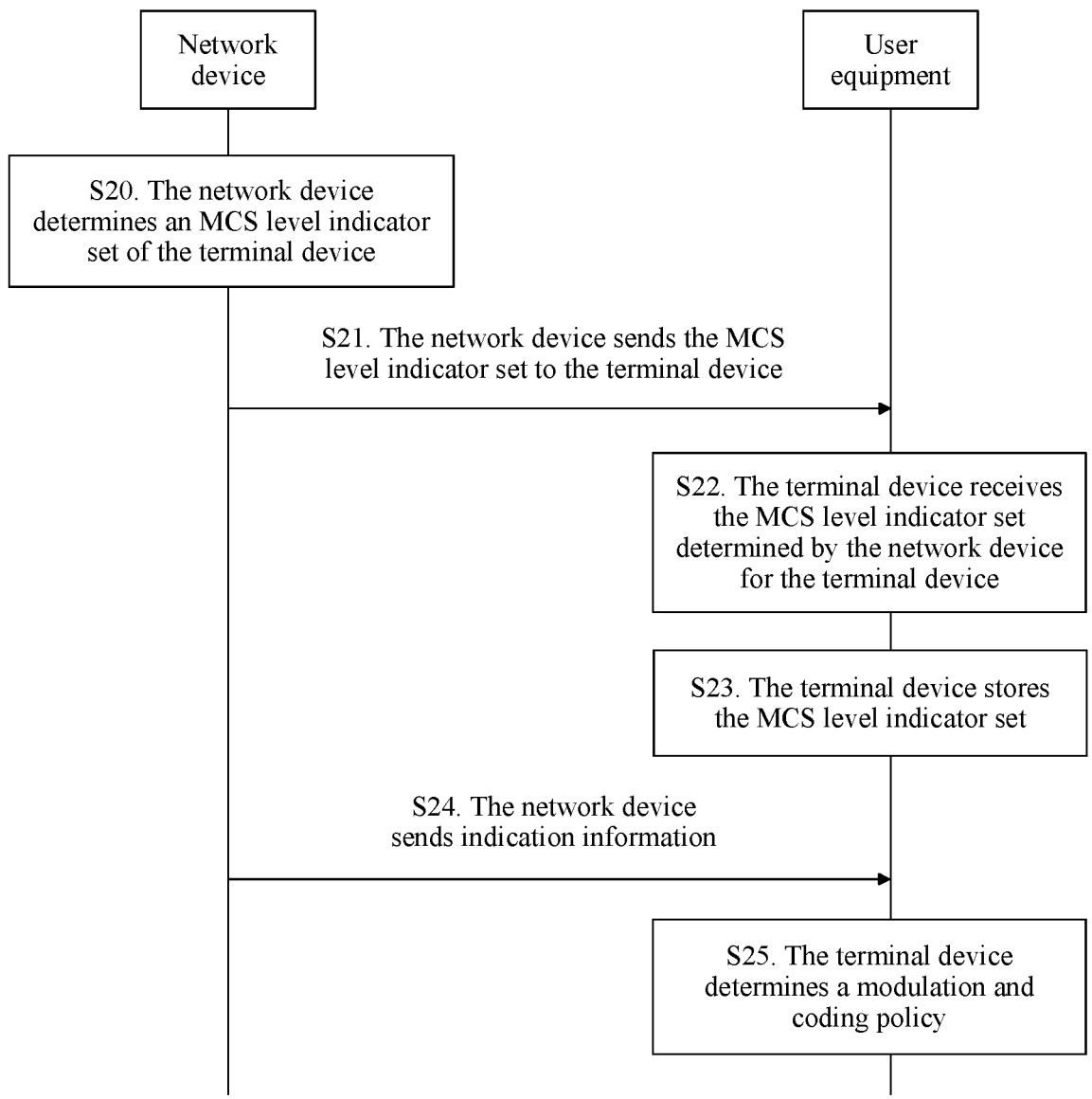
FIG. 10 is an interaction diagram of a modulation and coding policy indication method according to an embodiment of this application.

FIG. 10 is a schematic flowchart of a modulation and coding policy indication method according to an embodiment of this application. The method is described from a perspective of interaction between a network device and a terminal device, and the method may include but is not limited to the following steps:

Step S20: The network device determines a modulation and coding scheme MCS level indicator set of the terminal device, where the MCS level indicator set includes an MCS level indicator value, and the MCS level indicator value is used to indicate a modulation and coding policy.

Step S21: The network device sends the MCS level indicator set to the terminal device.

Step S22: The terminal device receives the MCS level indicator set determined for the terminal device, where the MCS level indicator set includes an MCS level indicator value, and the MCS level indicator value is used to indicate a modulation and coding policy.

Step S23: The terminal device stores the MCS level indicator set.

Step S24: The network device sends indication information to the terminal device, where the indication information is used to indicate a target MCS level indicator value in the MCS level indicator set, and the target MCS level indicator value is used to indicate a modulation and coding policy used by the network device.

Step S25: The terminal device receives the indication information sent by the network device, where the indication information is used to indicate the target MCS level indicator value in the MCS level indicator set, and the target MCS level indicator value is used to indicate the modulation and coding policy used by the network device.

In this embodiment of this application, different terminal devices usually work in different SINR intervals. For example, when a terminal device is an edge user, the terminal device usually works in a relatively low SINR, for example, −12 dB to −2 dB, and when a terminal device is a center user, the terminal device usually works in a relatively high SINR, for example, 15 dB to 25 dB. A range of MCS levels for transmitting data by the network device to the edge user is also different from a range of MCS levels for transmitting data by the network device to the center user. For example, an MCS level used by the network device to transmit data to the edge user is relatively low, and an MCS level used by the network device to transmit data to the center user is relatively high. To reduce indication overheads, the network device independently configures an MCS level indicator set for each terminal device.

Optionally, the MCS level indicator set configured by the network device for the terminal device is a preset set or a subset of the preset set, and the preset set may be a set specified in a protocol. FIG. 11A and FIG. 11B may show a preset set according to an embodiment of this application. The preset set includes 64 MCS levels. The network device may configure some or all of the 64 MCS levels based on a channel quality status of the terminal device.

For example, an MCS level indicator set configured by the network device for the terminal device that is an edge user is 0 to 27 and 58 to 61, and an MCS level indicator set configured by the network device for the terminal device that is a center user is 28 to 57 and 61 to 63. It should be noted that indices herein represent MCS levels in FIG. 11A and FIG. 11B, and MCS levels 58 to 63 are used for retransmission. A valid bit L that is in DCI and that is used to indicate an MCS level is correlated to a quantity S of MCS levels in an MCS level indicator set configured through RRC, where L≥log 2(S).

The MCS level indicator set configured by the network device for the terminal device may include consecutive MCS level indicator values (MCS levels) in the preset set specified in the protocol, or a MCS level indicator set configured by the network device for the terminal device may include nonconsecutive MCS level indicator values (MCS levels) in the preset set specified in the protocol.

The MCS level indicator set configured by the network device for the terminal device includes consecutive MCS level indicator values in the preset set specified in the protocol, or the MCS level indicator set configured by the network device for the terminal device includes MCS level indicator values at equal intervals in the preset set specified in the protocol (for example, one value is selected at intervals of one element, and indices are 3, 5, and 7). In this case, signaling (the signaling may include but is not limited to higher layer signaling, MAC CE signaling, user-specific signaling, and the like) used by the network device to indicate the MCS level indicator set to the terminal device may indicate only an index of a starting element of the MCS level indicator set in the preset set and a quantity of elements included in the MCS level indicator set, or indicate only an index of a starting element of the MCS level indicator set in the preset set, and a quantity of elements in the MCS level indicator set is specified in the protocol. An element in the MCS level indicator set is an MCS level indicator value in the MCS level indicator set. Further, optionally, the signaling used by the network device to indicate the MCS level indicator set to the terminal device may be alternatively used for indication by using a tree indication method. The tree indication method is the same as the tree indication method in the embodiment in FIG. 4, and details are not described herein again.

If the MCS level indicator set configured by the network device for the terminal device includes elements randomly selected from the preset set specified in the protocol. In other words, there is no rule, signaling (the signaling may include but is not limited to higher layer signaling, MAC CE signaling, user-specific signaling, and the like) for indicating the MCS level indicator set may be used for indication to the terminal device by using a bitmap. For example, if the preset set includes 64 absolute indicator values, 64 bits are used for indication. If the MCS level indicator set includes the MCS level indicator value, a bit corresponding to the MCS level indicator value is set to 1. If the MCS level indicator set does not include the MCS level indicator value, a bit corresponding to the MCS level indicator value is set to 0.

The terminal device obtains and stores the MCS level indicator set configured by the network device for the terminal device. When the network device transmits data to the terminal device, the network device needs to indicate the used target MCS level indicator value to the terminal device, where the target MCS level indicator value is used to indicate the modulation and coding policy used by the network device, so that the terminal device can process the received data according to the modulation and coding policy.

Specifically, optionally, the network device sends the indication information to the terminal device, where the indication information is used to indicate the target MCS level indicator value in the MCS level indicator set configured for the terminal device. Optionally, the network device may send the indication information to the terminal device by using DCI. For example, the MCS level indicator set configured by the network device for the terminal device is 0 to 27 and 58 to 61. The indication information may be 5 bits, and one type of indication information corresponds to one MCS level indicator value.

The terminal device searches for, based on the MCS level indicator set configured by the network device, the target MCS level indicator value corresponding to the indication information, where the target MCS level indicator value is used to indicate the modulation and coding policy used by the network device.

In this embodiment of this application, the network device determines the MCS level indicator set exclusive to the terminal device for the terminal device. The MCS level indicator set includes an MCS level indicator value, and the MCS level indicator value is used to indicate a modulation and coding policy. The MCS level indicator set exclusive to the terminal device may be a set that is set based on channel quality of the terminal device. Subsequently, when indicating the modulation and coding policy, the network device can improve indication accuracy while reducing overheads.

The foregoing describes the method in the embodiments of this application in detail, and the following describes an apparatus provided in the embodiments of this application.

Figure 12:
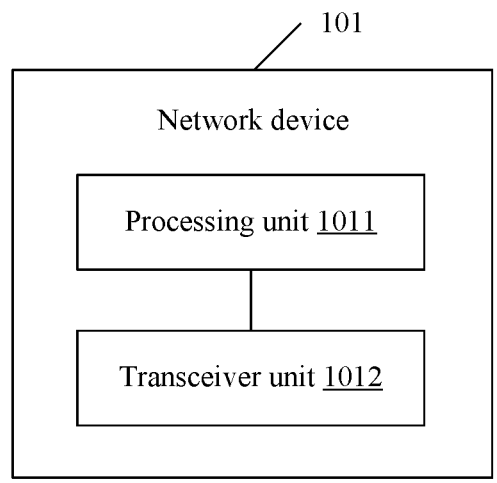
FIG. 12 is a schematic diagram of a logical structure of a network device according to an embodiment of this application.

FIG. 12 is a schematic diagram of a logical structure of a network device 101 according to an embodiment of this application. The network device 101 may include a processing unit 1011 and a transceiver unit 1012.

The processing unit 1011 is configured to determine a channel quality indicator set of a terminal device, where the channel quality indicator set includes at least one channel quality indicator value, and the channel quality indicator value is used to indicate channel quality.

The transceiver unit 1012 is configured to send the channel quality indicator set to the terminal device.

It should be noted that the processing unit 1011 is configured to perform step S10 in the method embodiment shown in FIG. 4, and the transceiver unit 1012 is configured to perform step S11 in the method embodiment shown in FIG. 4.

For specific details, refer to the description of the network device side in the foregoing method in FIG. 4. Details are not described herein again.

Figure 13:
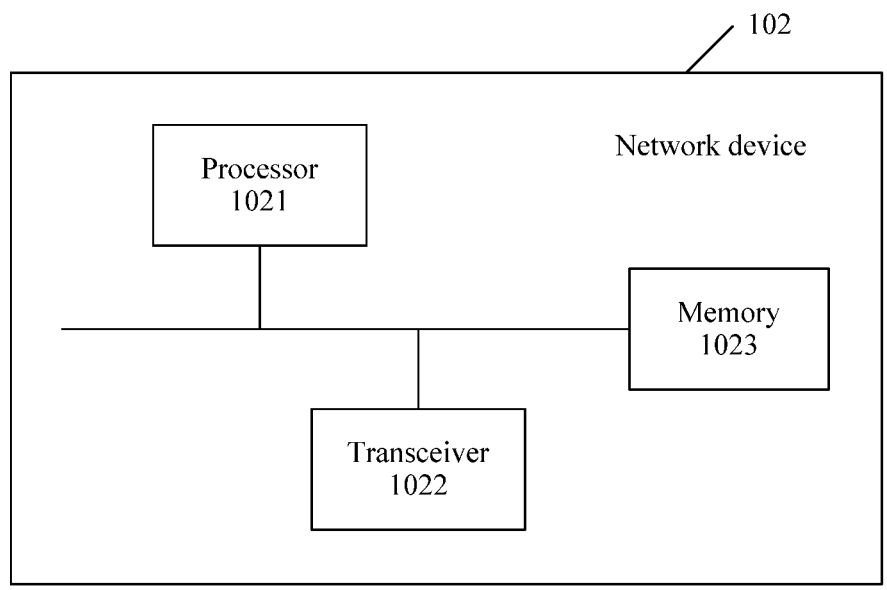
FIG. 13 is a schematic diagram of a physical structure of a network device according to an embodiment of this application.

FIG. 13 is a schematic diagram of a physical structure of a network device 102 according to an embodiment of this application. The network device 102 includes a processor 1021, a transceiver 1022, and a memory 1023. The processor 1021, the memory 1023, and the transceiver 1022 are interconnected through a bus.

The memory 1023 includes but is not limited to a random access memory (Random Access Memory, RAM), a read-only memory (Read-Only Memory, ROM), an erasable programmable read-only memory (Erasable Programmable Read Only Memory, EPROM), or a compact disc read-only memory (Compact Disc Read-Only Memory, CD-ROM). The memory 1023 is configured to store a related instruction and data.

The transceiver 1022 may be a communications module or a transceiver circuit, and is configured to transmit information such as data and signaling between the network device and a terminal device. In this embodiment of this application, the transceiver 1022 is configured to perform step S11 in the method embodiment shown in FIG. 4.

The processor 1021 may be a controller, a central processing unit (Central Processing Unit, CPU), a general purpose processor, a digital signal processor (Digital Signal Processor, DSP), an application-specific integrated circuit (Application-Specific Integrated Circuit, ASIC), a field programmable gate array (Field Programmable Gate Array, FPGA) or another programmable logic device, a transistor logic device, a hardware component, or a combination thereof. The processor 1021 may implement or execute various example logical blocks, modules, and circuits described with reference to content disclosed in the embodiments of this application. Alternatively, the processor 1021 may be a combination of processors implementing a computing function, for example, one microprocessor or a combination of microprocessors, or a combination of a DSP and a microprocessor. In this embodiment of this application, the processor 1021 is configured to perform step S10 in the embodiment shown in FIG. 4.

For example, the processor 1021 is configured to determine a channel quality indicator set of a terminal device, where the channel quality indicator set includes at least one channel quality indicator value, and the channel quality indicator value is used to indicate channel quality.

The transceiver 1022 is configured to send the channel quality indicator set to the terminal device.

For specific details, refer to the description of the network device side in the foregoing method in FIG. 4. Details are not described herein again.

Figure 14:
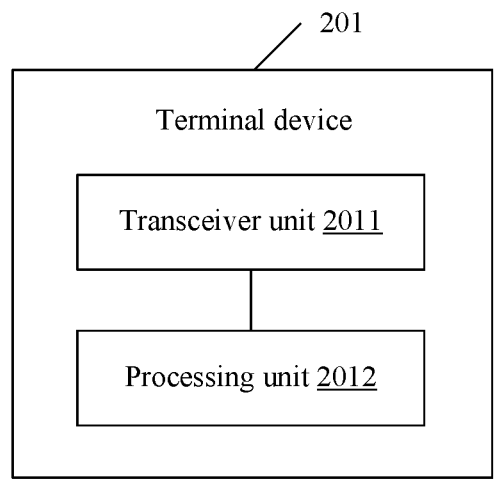
FIG. 14 is a schematic diagram of a logical structure of a terminal device according to an embodiment of this application.

FIG. 14 is a schematic diagram of a logical structure of a terminal device 201 according to an embodiment of this application. The terminal device 201 may include a transceiver unit 2011 and a processing unit 2012.

The processing unit 2012 is configured to obtain a channel quality indicator set determined by a network device for the terminal device, where the channel quality indicator set includes at least one channel quality indicator value, and the channel quality indicator value is used to indicate channel quality.

The transceiver unit 2011 is configured to send feedback information to the network device, where the feedback information is used to indicate a target channel quality indicator value, the target channel quality indicator value is a channel quality indicator value in the channel quality indicator set, and the target channel quality indicator value is used to determine current channel quality of a channel.

It should be noted that the transceiver unit 2011 is configured to perform step S13 in the method embodiment shown in FIG. 4, and the processing unit 2012 is configured to perform step S12 in the method embodiment shown in FIG. 4.

For specific details, refer to the description of the terminal device side in the foregoing method in FIG. 4. Details are not described herein again.

Figure 15:
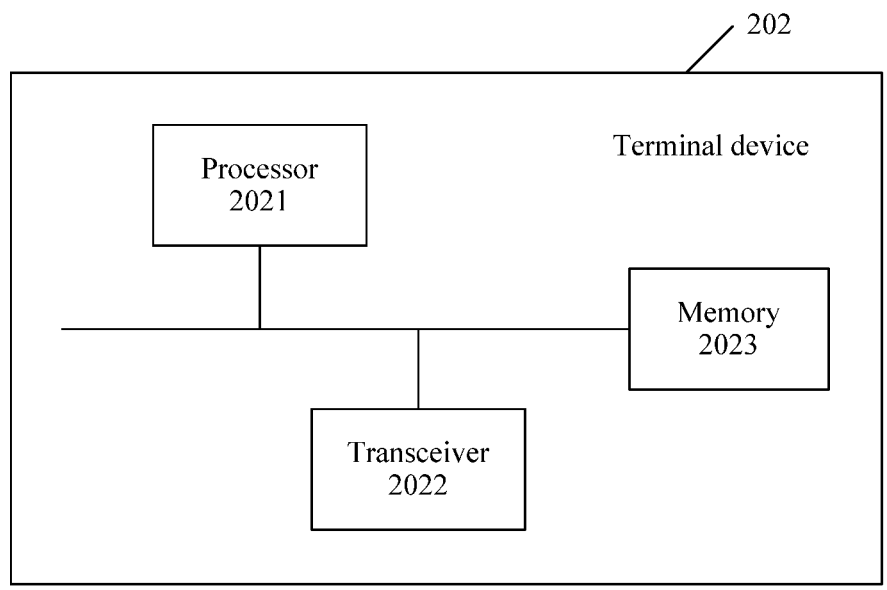
FIG. 15 is a schematic diagram of a physical structure of a terminal device according to an embodiment of this application.

FIG. 15 shows a terminal device 202 according to an embodiment of this application. The terminal device 202 includes a processor 2021, a transceiver 2022, and a memory 2023, and the processor 2021, the memory 2023, and the transceiver 2022 are interconnected through a bus.

The memory 2023 includes but is not limited to a RAM, a ROM, an EPROM, or a CD-ROM, and the memory 2024 is configured to store a related instruction and data.

The transceiver 2022 may be a communications module or a transceiver circuit, and is configured to transmit information such as data and signaling between a network device and the terminal device. In this embodiment of this application, the transceiver 2022 is configured to perform step S13 in the method embodiment shown in FIG. 4.

The processor 2021 may be a controller, a CPU, a general purpose processor, a DSP, an ASIC, an FPGA or another programmable logic device, a transistor logic device, a hardware component, or any combination thereof. The processor 2021 may implement or execute various example logical blocks, modules, and circuits described with reference to content disclosed in the embodiments of this application. Alternatively, the processor 2021 may be a combination of processors implementing a computing function, for example, one microprocessor or a combination of microprocessors, or a combination of a DSP and a microprocessor. In this embodiment of this application, the processor 2021 is configured to perform step S12 in the embodiment shown in FIG. 4.

For example, the processor 2021 is configured to obtain a channel quality indicator set determined by a network device for the terminal device, where the channel quality indicator set includes at least one channel quality indicator value, and the channel quality indicator value is used to indicate channel quality.

The transceiver 2022 is configured to send feedback information to the network device, where the feedback information is used to indicate a target channel quality indicator value, the target channel quality indicator value is a channel quality indicator value in the channel quality indicator set, and the target channel quality indicator value is used to determine current channel quality of a channel.

For specific details, refer to the description of the terminal device side in the foregoing method in FIG. 4. Details are not described herein again.

Figure 16:
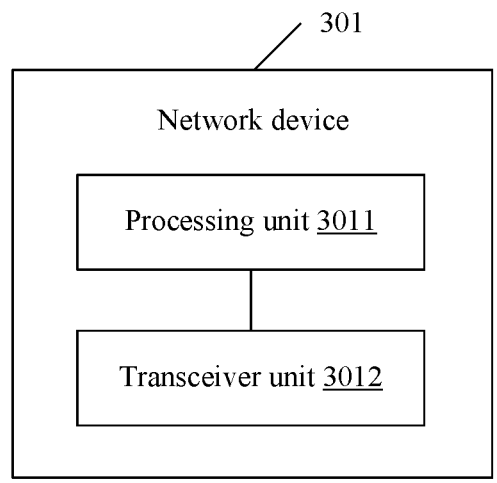
FIG. 16 is a schematic diagram of a logical structure of a network device according to an embodiment of this application.

FIG. 16 is a schematic diagram of a logical structure of a network device 301 according to an embodiment of this application. The network device 301 may include a processing unit 3011 and a transceiver unit 3012.

The processing unit 3011 is configured to determine a modulation and coding scheme MCS level indicator set of a terminal device, where the MCS level indicator set includes at least one MCS level indicator value, and the MCS level indicator value is used to indicate a modulation and coding policy.

The transceiver unit 3012 is configured to send the MCS level indicator set to the terminal device.

It should be noted that the processing unit 3011 is configured to perform step S20 in the method embodiment shown in FIG. 10, and the transceiver unit 3012 is configured to perform step S21 in the method embodiment shown in FIG. 10.

For specific details, refer to the description of the network device side in the foregoing method in FIG. 10. Details are not described herein again.

Figure 17:
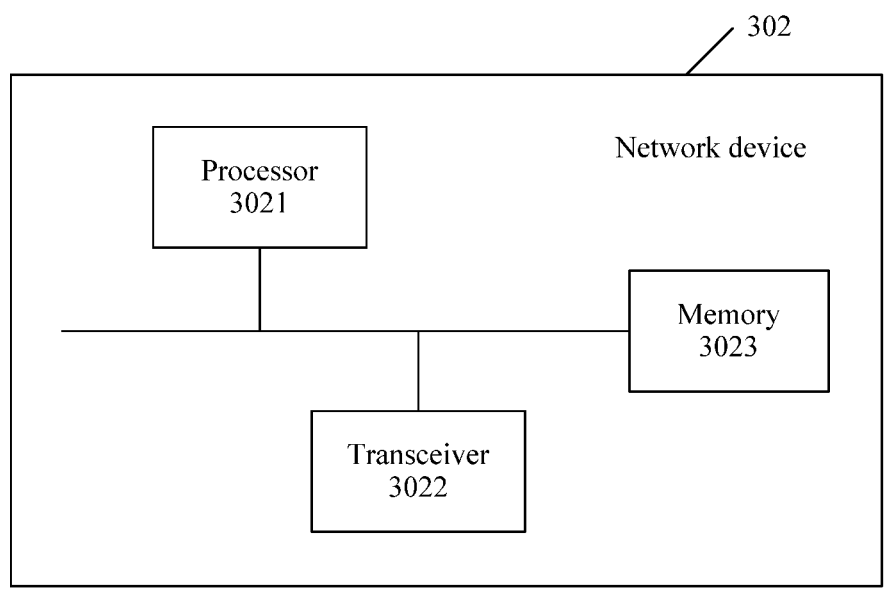
FIG. 17 is a schematic diagram of a physical structure of a network device according to an embodiment of this application.

FIG. 17 is a schematic diagram of a physical structure of a network device 302 according to an embodiment of this application. The network device 302 includes a processor 3021, a transceiver 3022, and a memory 3023. The processor 3021, the memory 3023, and the transceiver 3022 are interconnected through a bus.

The memory 3023 includes but is not limited to a random access memory (Random Access Memory, RAM), a read-only memory (Read-Only Memory, ROM), an erasable programmable read-only memory (Erasable Programmable Read Only Memory, EPROM), or a compact disc read-only memory (Compact Disc Read-Only Memory, CD-ROM). The memory 3023 is configured to store a related instruction and data.

The transceiver 3022 may be a communications module or a transceiver circuit, and is configured to transmit information such as data and signaling between the network device and a terminal device. In this embodiment of this application, the transceiver 3022 is configured to perform step S21 in the method embodiment shown in FIG. 10.

The processor 3021 may be a controller, a central processing unit (Central Processing Unit, CPU), a general purpose processor, a digital signal processor (Digital Signal Processor, DSP), an application-specific integrated circuit (Application-Specific Integrated Circuit, ASIC), a field programmable gate array (Field Programmable Gate Array, FPGA) or another programmable logic device, a transistor logic device, a hardware component, or a combination thereof. The processor 3021 may implement or execute various example logical blocks, modules, and circuits described with reference to content disclosed in the embodiments of this application. Alternatively, the processor 3021 may be a combination of processors implementing a computing function, for example, one microprocessor or a combination of microprocessors, or a combination of a DSP and a microprocessor. In this embodiment of this application, the processor 3021 is configured to perform step S20 in the embodiment shown in FIG. 10.

For example, the processor 3021 is configured to determine a modulation and coding scheme MCS level indicator set of a terminal device, where the MCS level indicator set includes at least one MCS level indicator value, and the MCS level indicator value is used to indicate a modulation and coding policy.

The transceiver 3022 is configured to send the MCS level indicator set to the terminal device.

For specific details, refer to the description of the network device side in the foregoing method in FIG. 10. Details are not described herein again.

Figure 18:
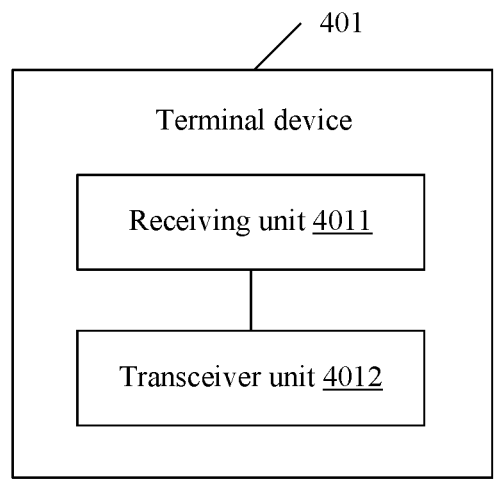
FIG. 18 is a schematic diagram of a logical structure of a terminal device according to an embodiment of this application.

FIG. 18 is a schematic diagram of a logical structure of a terminal device 401 according to an embodiment of this application. The terminal device 401 may include a transceiver unit 4011 and a processing unit 4012.

The transceiver unit 4011 is configured to receive an MCS level indicator set determined for the terminal device, where the MCS level indicator set includes at least one MCS level indicator value, and the MCS level indicator value is used to indicate a modulation and coding policy.

The processing unit 4012 is configured to store the MCS level indicator set.

It should be noted that the transceiver unit 4011 is configured to perform step S22 in the method embodiment shown in FIG. 10, and the processing unit 4012 is configured to perform step S23 in the method embodiment shown in FIG. 10.

For specific details, refer to the description of the terminal device side in the foregoing method in FIG. 10. Details are not described herein again.

Figure 19:
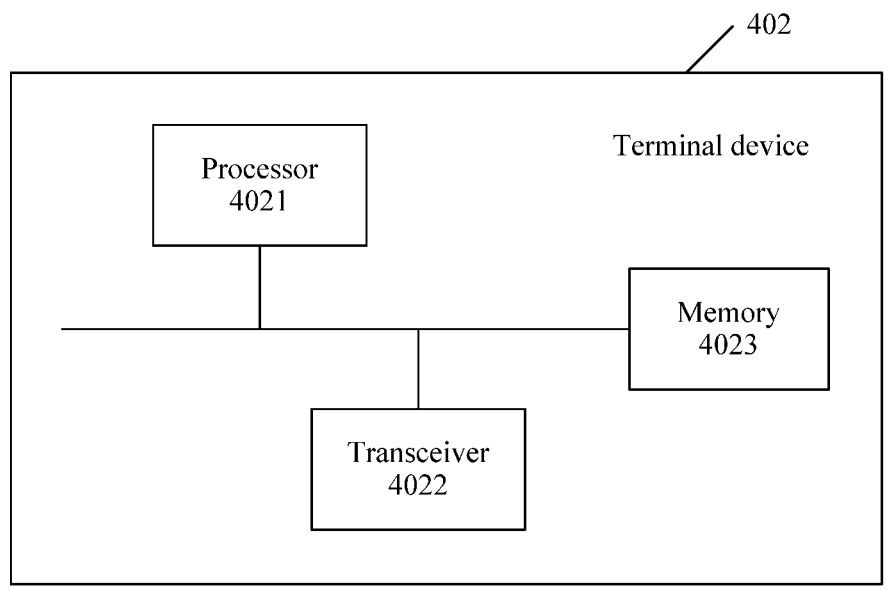
FIG. 19 is a schematic diagram of a physical structure of a terminal device according to an embodiment of this application.

FIG. 19 shows a terminal device 402 according to an embodiment of this application. The terminal device 402 includes a processor 4021, a transceiver 4022, and a memory 4023, and the processor 4021, the memory 4023, and the transceiver 4022 are interconnected through a bus.

The memory 4023 includes but is not limited to a RAM, a ROM, an EPROM, or a CD-ROM, and the memory 4024 is configured to store a related instruction and data.

The transceiver 4022 may be a communications module or a transceiver circuit, and is configured to transmit information such as data and signaling between a network device and the terminal device. In this embodiment of this application, the transceiver 4022 is configured to perform step S22 in the method embodiment shown in FIG. 10.

The processor 4021 may be a controller, a CPU, a general purpose processor, a DSP, an ASIC, an FPGA or another programmable logic device, a transistor logic device, a hardware component, or any combination thereof. The processor 4021 may implement or execute various example logical blocks, modules, and circuits described with reference to content disclosed in the embodiments of this application. Alternatively, the processor 4021 may be a combination of processors implementing a computing function, for example, one microprocessor or a combination of microprocessors, or a combination of a DSP and a microprocessor. In this embodiment of this application, the processor 4021 is configured to perform step S23 in the embodiment shown in FIG. 10.

For example, the transceiver 4022 is configured to receive an MCS level indicator set determined for the terminal device, where the MCS level indicator set includes at least one MCS level indicator value, and the MCS level indicator value is used to indicate a modulation and coding policy.

The processor 4021 is configured to store the MCS level indicator set.

For specific details, refer to the description of the terminal device side in the foregoing method in FIG. 10. Details are not described herein again.

In an implementation process, steps of the foregoing methods may be completed by using a hardware integrated logic circuit in the processor, or by using an instruction in a form of software. The steps of the methods disclosed with reference to the embodiments of this application may be directly performed and completed by a hardware processor, or may be performed and completed by using a combination of hardware in the processor and a software unit. The software unit may be located in a mature storage medium in the art, such as a random access memory, a flash memory, a read-only memory, a programmable read-only memory, an electrically erasable programmable memory, or a register. The storage medium is located in the memory, and the processor executes an instruction in the memory and completes the steps of the foregoing methods in combination with hardware in the processor. To avoid repetition, details are not described herein again.

It should be understood that the term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

A 5G communications system strives to support higher system performance, more service types, different deployment scenarios, and a wider spectrum range. The service types mainly include an enhanced mobile broadband (eMBB) service, a massive machine type communication (mMTC) service, an ultra-reliable and low latency communications (URLLC) service, a multimedia broadcast multicast service (MBMS), a positioning service, and the like. The deployment scenarios mainly include an indoor hotspot scenario, a dense urban scenario, a rural scenario, an urban macro scenario, a high-speed railway scenario, and the like. The wider spectrum range is mainly a spectrum range up to 100 GHz. In other words, the spectrum range includes a low-frequency part less than 6 GHz and a high-frequency part ranging from 6 GHz to 100 GHz.

Compared with a 4G communications system, one feature of the 5G communications system is that a URLLC service is supported. There are many URLLC service types, for example, industrial control, industrial production process automation, human computer interaction, and telemedicine. To better quantize performance indicators of a URLLC service to provide a reference input and evaluation criterion for designing the 5G system, the 3rd generation partnership project (3GPP) radio access network (RAN) and RAN1 working groups define the following performance indicators of the URLLC service.

A latency is a transmission time that is required when a service data unit (SDU) of a user application layer packet is transmitted from a radio protocol stack layer 2/3 of a transmit end to a radio protocol stack layer 2/3 of a receive end. Both an uplink user plane latency requirement and a downlink user plane latency requirement of a URLLC service are 0.5 ms, and the foregoing requirements are applicable only when neither a base station nor a terminal is in a discontinuous reception (DRX) state. It should be noted that the performance requirement of 0.5 ms herein means an average latency of a data packet, and is not bound to the following reliability requirement.

Reliability is a success probability that X bits are correctly transmitted from the transmit end to the receive end in a particular time (L seconds) in a given channel quality condition. The foregoing time is also defined as a time that is required when a service data unit (Service Data Unit, SDU) of a user application layer packet is transmitted from a radio protocol stack layer 2/3 of a transmit end to a radio protocol stack layer 2/3 of a receive end. For a URLLC service, a typical requirement is achieving reliability of 99.999% in 1 ms.

It should be noted that the foregoing performance indicator is merely an example. Specifically, the URLLC service may have different reliability requirements. For example, some extremely hash industrial control requires a transmission success probability of 99.9999999% in an end-to-end latency of 0.25 ms.

A system capacity is a maximum throughput that a system can reach without user interruption. The user interruption herein means that the system cannot meet a reliability requirement in a particular latency range.

In a conventional solution, a terminal device indicates channel quality between a network device and the terminal device by using a channel quality indicator (CQI) index corresponding to a BLER. Specifically, the terminal device may feed back CQI indices corresponding to all block error rates. However, if a channel environment changes, when the CQI indices corresponding to all the block error rates are fed back in the conventional solution, signaling overheads of feeding back the CQI indices are relatively high.

Figure 20:
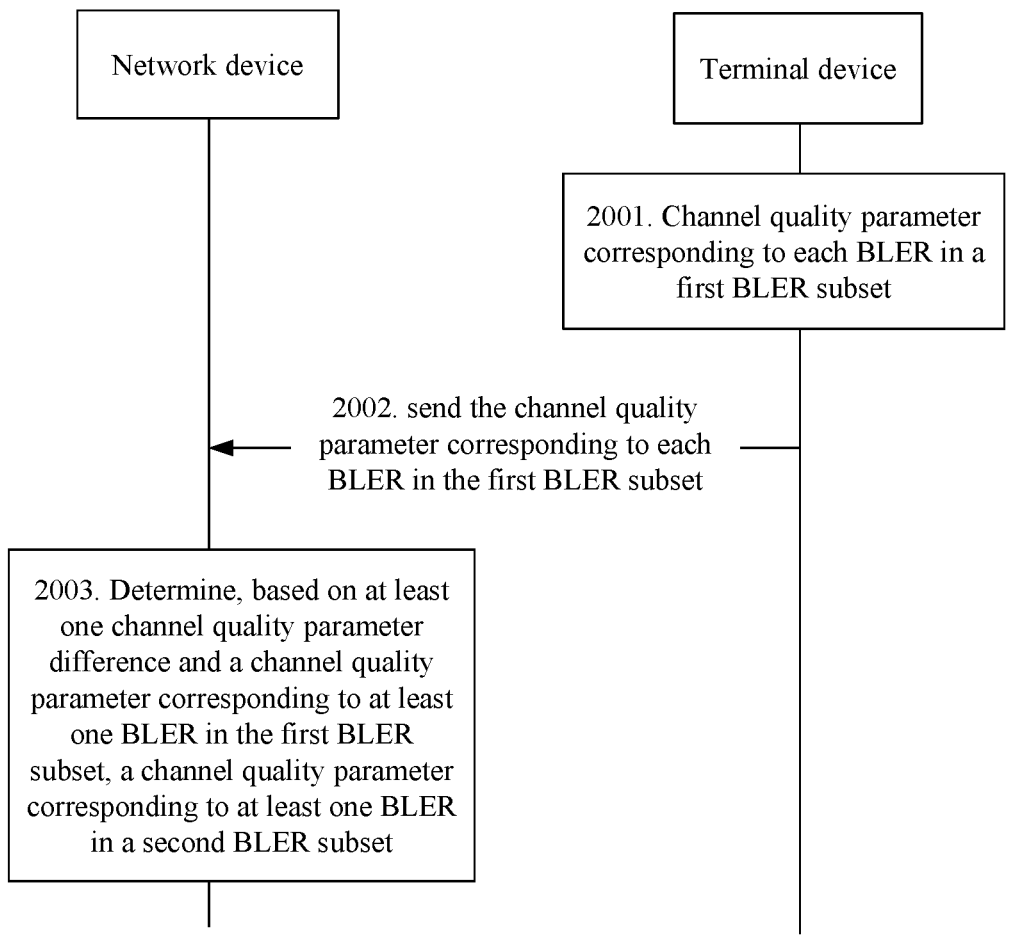
FIG. 20 is a schematic flowchart of a communication method according to an embodiment of this application.

FIG. 20 is a schematic flowchart of a communication method according to an embodiment of this application.

The communication method is applied to a system that supports at least one block error rate BLER set, a first BLER set of the at least one BLER set includes a first BLER subset and a second BLER subset, the first BLER subset includes at least one BLER, and the second BLER subset includes at least one BLER.

It should be understood that a BLER in this embodiment of this application may be 10%, 1%, 0.1%, or 0.001%, or may be of another type. This is not limited in this application.

Optionally, the first BLER set may be any one of the at least one BLER set, that is, another BLER set of the at least one BLER set may also include a first BLER subset and a second BLER subset. This is not limited in this application.

It should be noted that, in this embodiment of this application, a terminal device determines, as the first BLER subset, a set including at least one BLER that is in each BLER set and that corresponds to a channel quality parameter absolute value that needs to be sent to a network device, that is, BLERs specifically included in first BLER subsets in different BLER sets may be the same or different.

Optionally, a BLER included in the first BLER set and a BLER included in another BLER set of the at least one BLER set may be totally the same, or may be partially the same, or may be totally different. This is not limited in this application.

2001. The terminal device determines a channel quality parameter corresponding to each BLER in the first BLER subset.

The terminal device may determine the channel quality parameter corresponding to each BLER in the first BLER subset in the first BLER set, or may determine channel quality parameters corresponding to all BLERs in all first BLER subsets in all of the at least one BLER set included in the system. This is not limited in this application.

Optionally, the channel quality parameter may be a signal to interference plus noise ratio (Signal to Interference plus Noise Ratio, SINR), or may be a CQI index.

2002. The terminal device sends, to the network device, the channel quality parameter corresponding to each BLER in the first BLER subset.

Correspondingly, the network device receives the channel quality parameter that corresponds to each BLER in the first BLER subset and that is sent by the terminal device.

2003. The network device determines, based on the channel quality parameter corresponding to each BLER in the first BLER subset and at least one channel quality parameter difference between a channel quality parameter corresponding to at least one BLER in the second BLER subset and a channel quality parameter corresponding to at least one BLER in the first BLER subset, a channel quality parameter corresponding to each BLER in the second BLER subset.

Specifically, the network device may receive only the channel quality parameter corresponding to each BLER in the first BLER subset, and determine, based on the at least one channel quality parameter difference between the channel quality parameter corresponding to the at least one BLER in the second BLER subset and the channel quality parameter corresponding to the at least one BLER in the first BLER subset, the channel quality parameter corresponding to the at least one BLER in the second BLER subset. A channel quality parameter difference between channel quality parameters corresponding to two BLERs is basically kept consistent in a fixed condition. Therefore, in this embodiment of this application, when a channel environment changes, the terminal device can learn of channel quality parameters corresponding to all BLERs in the first BLER set only by sending a channel quality parameter corresponding to a BLER in the first BLER subset, so that the terminal device is prevented from sending the channel quality parameters corresponding to all the BLERs in the first BLER set when the channel environment changes, thereby reducing signaling overheads.

It should be understood that the fixed condition herein may be a transmission mode or a moving speed or a channel environment (for example, an urban environment or a rural environment).

Optionally, the at least one channel quality parameter difference may be a table, a set, or a value.

For example, if the first BLER subset includes only one BLER (a first BLER is used as an example for description), the network device may determine, based on a received channel quality parameter corresponding to the first BLER and a channel quality parameter difference between the channel quality parameter corresponding to the first BLER and the channel quality parameter corresponding to the at least one BLER in the second BLER subset, the channel quality parameter corresponding to the at least one BLER in the second BLER subset.

Specifically, as shown in Table 1, a BLER included in the first BLER subset may be 10%, and a BLER included in the second BLER subset may be 1%, 0.1%, 0.01% or 0.001%. The network device may receive a CQI that corresponds to 10% and that is sent by the terminal device, and determine, based on this value and CQI level differences in Table 1, CQIs that respectively correspond to 1%, 0.1%, 0.01%, and 0.001%.

TABLE 1

| BLER | CQI level difference | SINR difference |
|---|---|---|
| 10%-1% | 0.5 | 0.5 |
| 10%-0.1% | 1 | 1 |
| 10%-0.01% | 1.5 | 1.5 |
| 10%-0.001% | 2 | 2 |

It should be noted that a decimal in the table indicates that an equivalent code rate converted from the decimal meets a target BLER requirement. For example, the first BLER corresponds to a CQI 1, and a difference between the CQI 1 corresponding to the first BLER and a CQI 2 corresponding to a second BLER is 0.5. The CQI 1 corresponds to 16QAM and a code rate 1 of 0.5, and a CQI level adjacent to the CQI 1 corresponds to 16QAM and a code rate 2 of 0.75. In this case, the CQI 2 corresponds to 16QAM and a code rate of 0.5+(0.75−0.5)×0.5 (Code Rate 1+(Code Rate 2−Code Rate 1)×CQI Level Difference).

It should be noted that the first BLER subset is for the convenience of describing absolute values of channel quality parameters that need to be fed back for these BLERs, and there is no other limitation.

For example, the first BLER set may include only the first BLER and the second BLER. In this way, the network device may determine, based on the received channel quality parameter corresponding to the first BLER and a channel quality parameter difference between the channel quality parameter corresponding to the first BLER and a channel quality parameter corresponding to the second BLER, the channel quality parameter corresponding to the second BLER.

Optionally, in this embodiment of this application, the at least one channel quality parameter difference may be specified in a protocol, or may be sent by the terminal device to the network device in advance. This is not limited in this application.

Optionally, the terminal device may report the at least one channel quality parameter difference periodically or in real time.

Optionally, when the network device requires a channel quality parameter difference, the network device may send a channel quality parameter request to the terminal device, to trigger the terminal device to report the channel quality parameter difference, thereby avoiding a resource waste.

Optionally, the terminal device may report only one channel quality parameter difference, and another channel quality parameter difference is obtained through interpolation, thereby further reducing signaling overheads. When only a channel quality parameter difference corresponding to two BLERs exists in a table in the following embodiment, channel quality parameter differences corresponding to a plurality of groups of BLERs may be obtained through interpolation. To avoid repetition, details are not described in the following embodiment.

For example, as shown in Table 2, the terminal device reports only a CQI level difference between a CQI corresponding to 10% and a CQI corresponding to 0.001% in a same channel environment. If the terminal device receives a CQI 1 corresponding to 10%, the terminal device may determine, based on Table 2, a CQI 2 corresponding to 0.001%. The terminal device may further determine the CQI level differences in Table 1 based on 10%, 0.001%, the CQI 1, and the CQI 2 through interpolation.

TABLE 2

| BLER | CQI level difference |
|---|---|
| 10%-0.001% | 2 |

Optionally, if the system includes at least two BLER sets, CQI levels corresponding to all BLERs in the at least two BLER sets may be different from each other. In this way, a CQI level difference may be precisely a channel quality parameter difference in an SINR, thereby improving accuracy of determining a channel quality parameter corresponding to a BLER in the second BLER subset.

Optionally, CQI level differences corresponding to different BLERs may be different in different transmission modes. For example, as shown in Table 3, there may be a plurality of values of a channel quality difference between channel quality corresponding to two BLERs, and each difference corresponds to one CQI level difference index.

TABLE 3

| BLER $10^{(-n)}$ | CQI level difference index 0 | CQI level difference index 1 | CQI level difference index 2 | CQI level difference index 4 |
|---|---|---|---|---|
| 1 | 0 | 0 | 0 | 0 |
| 2 | 0 | 1 | 2 | 3 |
| 3 | 1 | 2 | 3 | 4 |
| 4 | 2 | 3 | 5 | 7 |
| 5 | 2 | 4 | 6 | 8 |

For example, Table 4 or Table 5 shows channel quality parameter differences of channel quality parameters separately corresponding to pairs of BLERs in different CQIs.

TABLE 4

| CQI level difference | CQI 1 | CQI 2 | CQI 3 | CQI 4 | CQI 5 | CQI 6 | CQI 7 | CQI 8 |
|---|---|---|---|---|---|---|---|---|
| 10%-0.001% | 2 | 2 | 2 | 2 | 2 | 3 | 3.5 | 4 |

TABLE 5

| CQI level difference | CQI 1 | CQI 2 | CQI 3 | CQI 4 | CQI 5 | CQI 6 | CQI 7 | CQI 8 |
|---|---|---|---|---|---|---|---|---|
| 10%-1% | 0.5 | 0.5 | 0.5 | 0.5 | 0.5 | 0.8 | 0.5 | 0.9 |
| 1%-0.1% | 0.5 | 0.5 | 0.5 | 0.5 | 0.5 | 0.8 | 0.8 | 1 |
| 0.1%-0.01% | 0.5 | 0.5 | 0.5 | 0.5 | 0.5 | 0.8 | 1 | 1 |
| 0.01%-0.001% | 0.5 | 0.5 | 0.5 | 0.5 | 0.5 | 0.8 | 1 | 1 |

It should be understood that CQI levels in this embodiment of this application may be all or some of CQI levels defined in the protocol. Table 4 and Table 5 are merely described by using only eight CQI levels as an example. However, this application is not limited thereto.

It should be further understood that in Table 5, when a CQI level is a CQI 1, a corresponding BLER set may include 10%, 1, 0.1%, 0.01%, and 0.001%. In this case, CQI level differences may be CQI level differences corresponding to a column in which the CQI 1 is located in Table 5. If it is learned that BLER=10% corresponds to the CQI 1, a CQI corresponding to BLER=1% may be calculated as follows: CQI 1+(CQI 2−CQI 1)+0.5).

Optionally, the terminal device may feed back channel quality parameter differences of channel quality parameters corresponding to pairs of BLERs only in some of the CQI levels, thereby reducing signaling overheads.

For example, as shown in Table 4, the terminal device may feed back channel quality parameter differences between a channel quality parameter corresponding to 10% and a channel quality parameter corresponding to 0.001% only in a CQI 5, a CQI 6, a CQI 7, and a CQI 8.

Optionally, the some of the CQI levels may be odd-numbered CQI levels or even-numbered CQI levels, CQI levels at coarse granularities, or sampled CQI levels. The sampled CQI levels may be uniformly sampled CQI levels or nonuniformly sampled CQI levels. As CQI levels increase, a difference between CQI level differences corresponding to adjacent CQI levels is larger, and uniform CQI level differences may be obtained through non-uniform sampling, thereby reducing signaling overheads.

Optionally, if the system includes at least two BLER sets, the at least two BLER sets may correspond to a plurality of code rates (coderate). In this case, a CQI level difference can be more accurate, thereby improving accuracy of determining a channel quality parameter corresponding to a BLER in the second BLER subset.

For example, the terminal device may alternatively feed back CQI level differences of CQIs corresponding to pairs of BLERs in different code rates. When Coderate=0.1, an SINR difference between a CQI corresponding to BLER=1 and a CQI corresponding to BLER=0.0001 is 2 db, and a corresponding CQI level difference is 1. When Coderate=0.9, an SINR difference between a CQI corresponding to BLER=1 and a CQI corresponding to BLER=0.0001 is 4 dB, and a corresponding CQI level difference is 2.

It should be noted that, actually, there is a correspondence among modulation, a code rate, and a CQI level. For example, if modulation is QPSK, Coderate=0.1 indicates that a corresponding CQI level of 0, if modulation is QPSK, Coderate=0.2 indicates that a corresponding CQI level is 1, and so on.

Figure 21:
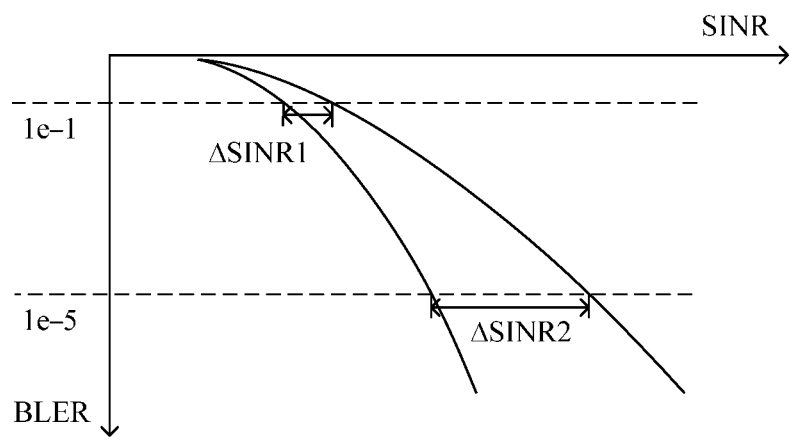
FIG. 21 is a schematic flowchart of channel quality parameter differences of different terminal devices.

Optionally, BLER-SINR slope values of different terminal devices are different. Therefore, as shown in FIG. 21, independent channel quality parameter differences may be used for different terminal devices.

Optionally, if the system includes at least two BLER sets, BLERs in the at least two BLER sets may correspond to a plurality of transmission modes. In this way, an SINR difference may be precisely an SINR difference in a transmission mode, thereby improving accuracy of determining a channel quality parameter corresponding to a BLER in the second BLER subset.

Optionally, the transmission modes include an antenna port configuration and/or a multiple-input multiple-output (Multiple Input Multiple Output, MIMO) preprocessing mode.

It should be understood that the antenna port configuration may be specifically ix (that is, one transmit port and one receive port), 1×2, 2×2 or the like. The preprocessing mode may include at least one of transmit diversity, precoding, and beamforming.

It should be further understood that MIMO includes single-input single-output (Single Input Single Output, SISO), single-input multiple-output (Single Input Multiple Output, SIMO), and multiple-input single-output (Multiple Input Single Output, MISO).

For example, Table 6 shows CQI level differences between a CQI level corresponding to a BLER of 10% and a CQI level corresponding to a BLER of 0.001% in different transmission modes.

TABLE 6

| CQI level difference | Transmission mode 1 | Transmission mode 2 |
|---|---|---|
| 10%-0.001% | 1 | 3 |

Optionally, CQI level differences corresponding to different BLERs in different transmission modes may be different. For example, as shown in Table 7 and Table 8, there may be a plurality of values of a channel quality difference between channel quality corresponding to two BLERs.

Optionally, the network device may select a proper CQI level difference based on a transmission mode.

Optionally, the terminal device may further send indication information to the network device, where the indication information is used by the network device to determine one CQI level difference from a plurality of CQI level differences. In the following embodiment, when a channel quality parameter includes a plurality of values, one of the plurality of values may be determined according to the indication information sent by the terminal device. To avoid repetition, details are not described in the following embodiment.

TABLE 7

| BLER | CQI level difference |
|---|---|
| 10%-0.001% | 1, 2, 3, 4 |

TABLE 8

| BLER | CQI level difference |
|---|---|
| 10%-1% | 0.5, 2.5, 3.5, 6.5 |
| 10%-0.1% | 1, 3, 5, 7 |
| 10%-0.01% | 1.5, 3.5, 5.5, 7.5 |
| 10%-0.001% | 2, 4, 6, 8 |

Optionally, if the system includes at least two BLER sets, in this embodiment of this application, each of the at least two BLER sets may be more specifically divided based on a CQI level and a transmission mode.

For example, as shown in Table 9, a transmission mode 1 and a CQI 1 correspond to one BLER set.

Optionally, modulation and coding differences corresponding to pairs of BLERs may also be determined by using an SINR difference.

For example, as shown in Table 10 or Table 11, an SINR difference between an SINR corresponding to BLER=10% and an SINR corresponding to BLER=0.001% is 2.

TABLE 10

| BLER | SINR difference |
|---|---|
| 10%-0.001% | 4 |

TABLE 11

| BLER | SINR difference |
|---|---|
| 10%-1% | 0 |
| 10%-0.1% | 1 |
| 10%-0.01% | 2 |
| 10%-0.001% | 4 |

Similarly, as shown in Table 12 or Table 13, an SINR difference may also include a plurality of values in different transmission modes.

TABLE 12

| BLER | SINR difference |
|---|---|
| 10%-0.001% | 1, 2, 4, 6, 8 |

TABLE 13

| BLER | SINR difference |
|---|---|
| 10%-1% | 0, 1 |
| 10%-0.1% | 1, 2 |
| 10%-0.01% | 1, 2, 3 |
| 10%-0.001% | 2, 3, 4 |

Optionally, in this embodiment of this application, for example, as shown in Table 14, Table 15, and Table 16, each BLER set may be more specifically divided.

TABLE 9

| | Transmission mode 1 | | | | Transmission mode 2 | | | |
|---|---|---|---|---|---|---|---|---|
| SINR difference (db) | CQI 1 | CQI 2 | CQI 3 | CQI 4 | CQI 1 | CQI 2 | CQI 3 | CQI 4 |
| 10%-1% | 0.5 | 0.8 | 0.5 | 0.9 | 0.5 | 0.5 | 0.5 | 0.5 |
| 1%-0.1% | 0.5 | 0.8 | 0.8 | 1 | 0.5 | 0.5 | 0.5 | 0.5 |
| 0.1%-0.01% | 0.5 | 0.8 | 1 | 1 | 0.5 | 0.5 | 0.5 | 0.5 |
| 0.01%-0.001% | 0.5 | 0.8 | 1 | 1 | 0.5 | 0.5 | 0.5 | 0.5 |

TABLE 14

| SINR difference | CQI 1 | CQI 2 | CQI 3 | CQI 4 | CQI 5 | CQI 6 | CQI 7 | CQI 8 |
|---|---|---|---|---|---|---|---|---|
| 10%-1% | 0 | 0 | 0 | 0 | 0 | 0 | 0 | 1 |
| 1%-0.1% | 1 | 1 | 1 | 0 | 0 | 1 | 1 | 1 |
| 0.1%-0.01% | 0 | 0 | 0 | 1 | 1 | 1 | 1 | 1 |
| 0.01%-0.001% | 1 | 1 | 1 | 1 | 1 | 1 | 1 | 1 |

TABLE 15

| SINR difference | CQI 1 | CQI 2 | CQI 3 | CQI 4 | CQI 5 | CQI 6 | CQI 7 | CQI 8 |
|---|---|---|---|---|---|---|---|---|
| 10%-1% | 0 | 0 | 0 | 0 | 0 | 0 | 0 | 1 |
| 10%-0.1% | 0 | 0 | 0 | 1 | 1 | 1 | 1 | 2 |
| 10%-0.01% | 1 | 1 | 1 | 2 | 2 | 2 | 2 | 3 |
| 10%-0.001% | 1 | 1 | 1 | 2 | 2 | 2 | 3 | 3 |

TABLE 16

| SINR difference | CQI 1 | CQI 2 | CQI 3 | CQI 4 | CQI 5 | CQI 6 | CQI 7 | CQI 8 |
|---|---|---|---|---|---|---|---|---|
| 10%-1% | [0.1] | [0.1] | [0.1] | [0.1] | [0.1] | [0.1] | [0.1] | [1.2] |
| 10%-0.1% | [0.1] | [0.1] | [0.1] | [1.2] | [1.2] | [1.2] | [1.2] | [2.3] |
| 10%-0.01% | [1.2] | [1.2] | [1.2] | [2.3] | [2.3] | [2.3] | [2.3] | [3.4] |
| 10%-0.001% | [1.2] | [1.2] | [1.2] | [2.3] | [2.3] | [2.3] | [2.3] | [3.4] |

Optionally, a BLER set of at least one BLER set may correspond to a plurality of transmission modes. For example, Table 17 shows SINR differences corresponding to two BLERs in different transmission modes, and Table 18 may show SINR differences that correspond to two BLERs and that are affected by another condition.

TABLE 17

| SINR difference | Transmission mode 1 | Transmission mode 2 |
|---|---|---|
| 10%-0.001% | 2 | 5 |

TABLE 18

| SINR difference | Transmission mode 1 | Transmission mode 2 |
|---|---|---|
| 10%-0.001% | 2, 4 | 5, 7 |

Optionally, as shown in Table 19 and Table 20, each BLER set of at least one BLER set may be divided based on a transmission mode and a CQI level.

TABLE 19

| | Transmission mode 1 | | | | Transmission mode 2 | | | |
| SINR difference | CQI 1 | CQI 2 | CQI 3 | CQI 4 | CQI 1 | CQI 2 | CQI 3 | CQI 4 |
|---|---|---|---|---|---|---|---|---|
| 10%-1% | 1 | 1 | 1 | 1 | 0.5 | 0.5 | 0.5 | 0.5 |
| 1%-0.1% | 1 | 1 | 1 | 1 | 0.5 | 0.5 | 0.5 | 0.5 |
| 0.1%-0.01% | 1 | 1 | 1 | 1 | 0.5 | 0.5 | 0.5 | 0.5 |
| 0.01%-0.001% | 1 | 1 | 1 | 1 | 0.5 | 0.5 | 0.5 | 0.5 |

TABLE 20

| | Transmission mode 1 | | | | Transmission mode 2 | | | |
| SINR difference | CQI 1 | CQI 2 | CQI 3 | CQI 4 | CQI 1 | CQI 2 | CQI 3 | CQI 4 |
|---|---|---|---|---|---|---|---|---|
| 10%-1% | 1.2 | 1.2 | 1.2 | 1.2 | 0.1 | 0.1 | 0.1 | 0.1 |
| 1%-0.1% | 1.2 | 1.2 | 1.2 | 1.2 | 0.1 | 0.1 | 0.1 | 0.1 |
| 0.1%-0.01% | 1.2 | 1.2 | 1.2 | 1.2 | 0.1 | 0.1 | 0.1 | 0.1 |
| 0.01%-0.001% | 1.2 | 1.2 | 1.2 | 1.2 | 0.1 | 0.1 | 0.1 | 0.1 |

Optionally, the terminal device may further send an index value of a channel quality parameter difference to the network device, where the index value of the channel quality parameter difference is in a one-to-one correspondence with the channel quality parameter difference. The network device may determine the corresponding channel quality parameter difference based on the index value of the channel quality parameter difference.

Specifically, the network device may learn of a plurality of channel quality parameter differences between channel quality parameters corresponding to two BLERs, but cannot specifically learn which difference is a current difference between the channel quality parameters corresponding to the two BLERs. In this case, the network device may determine, based on the index value that is of a channel quality parameter difference and that is sent by the terminal device, which one of the plurality of differences between the channel quality parameters corresponding to the two BLERs is specifically the channel quality parameter difference, so that the channel quality parameter corresponding to each BLER in the second BLER subset can be accurately determined, thereby improving accuracy of determining channel quality.

Optionally, if a channel quality parameter is a CQI level, a CQI level difference reported by the terminal device may be represented by using a CQI index.

Specifically, a correspondence between a CQI level difference and a CQI level difference index is shown in Table 21. For example, if the terminal device determines that a CQI level difference corresponding to two BLERs is 4, the terminal device may send a CQI level difference index of 3 to the network device, so that the network device can determine, based on the CQI level difference index of 3, that the CQI level difference corresponding to the two BLERs is 4.

TABLE 21

|  | CQI level difference index | | | |
| --- | --- | --- | --- | --- |
|  | 0 | 1 | 2 | 3 |
| CQI level difference | 0 | 1 | 2 | 4 |

Optionally, the network device sends a channel quality parameter request to the terminal device, where the channel quality parameter request may be used to request at least one channel quality parameter difference between a channel quality parameter corresponding to each BLER in a second BLER subset in a BLER set of the at least one BLER set included in the system and a channel quality parameter corresponding to at least one BLER in a first BLER subset. Correspondingly, the terminal device reports, to the network device according to the channel quality parameter request, the at least one channel quality parameter difference requested by using the channel quality parameter request.

Optionally, the network device may use higher layer signaling or physical layer signaling to carry the channel quality parameter request.

For example, the network device may use higher layer signaling or physical layer signaling to carry a channel quality parameter request that is used to request the at least one channel quality parameter difference between the channel quality parameter corresponding to each BLER in the second BLER subset in the first BLER set and the channel quality parameter corresponding to the at least one BLER in the first BLER subset. The channel quality parameter request may be used to request the terminal device to report a CQI level difference corresponding to BLER=10% and BLER=0.001% in the transmission method 1 and/or in an SINR.

Optionally, the channel quality parameter request may be further used to request a specific quantity of channel quality parameter differences corresponding to the at least one BLER.

For example, the channel quality parameter request may be used to request CQI level differences corresponding to BLERs in four SINRs. In this way, after receiving the foregoing higher layer signaling or the foregoing physical layer signaling, the terminal device reports four CQI level differences of 0, 1, 2, and 3 that correspond to BLER=10% and BLER=0.001%. The four CQI level differences may separately correspond to different SINRs.

Optionally, the network device may request, by using the channel quality parameter request, a channel quality parameter difference between BLERs in some of BLER sets in the system.

For example, the channel quality parameter request may be used to request the terminal device to report four CQI level differences corresponding to BLER=10% and BLER=0.001%, BLER=10% and BLER=0.01%, BLER=10% and BLER=0.1%, and BLER=10% and BLER=1%.

Optionally, the network device sends a channel quality parameter request to the terminal device, where the channel quality parameter request may be used to request a channel quality parameter difference between a channel quality parameter corresponding to at least one BLER in a first BLER subset in each of the at least one BLER set and a channel quality parameter corresponding to each BLER in a second BLER subset. Correspondingly, the terminal device reports, to the network device according to the channel quality parameter request, the at least one channel quality parameter difference requested by using the channel quality parameter request.

Optionally, the network device may use higher layer signaling or physical layer signaling to carry the channel quality parameter request, or may report all CQI level difference sets by using a semi-static configuration.

Therefore, according to the method for determining channel quality in this embodiment of this application, the network device may receive a channel quality parameter that corresponds to a BLER in the first BLER subset in the first BLER set and that is sent by the terminal device, and determine, based on channel quality parameters corresponding to some BLERs in the first BLER subset and the channel quality parameter difference between the channel quality parameter corresponding to each BLER in the second BLER subset and the channel quality parameter corresponding to the at least one BLER in the first BLER subset, channel quality parameters corresponding to all BLERs in the second BLER subset. In other words, the network device can determine channel quality parameters corresponding to all BLERs in the first BLER set, and therefore the terminal device does not need to send the channel quality parameters corresponding to all the BLERs in the first BLER set, thereby reducing signaling overheads.

Table 22 shows a correspondence between a CQI index and spectrum efficiency (Efficiency) in a conventional solution. In this conventional solution, 16 states may be represented by using 4 bits, and lowest spectrum efficiency corresponding to a CQI index is 0.1523, that is, a main channel condition interval of a user can be covered.

TABLE 22

| CQI index | Modulation scheme (Modulation) | Code rate (code rate) × 1024 | Efficiency |
|---|---|---|---|
| 0 | Out of range (out of range) | | |
| 1 | QPSK | 78 | 0.1523 |
| 2 | QPSK | 193 | 0.3770 |
| 3 | QPSK | 449 | 0.8770 |
| 4 | 16QAM | 378 | 1.4766 |
| 5 | 16QAM | 490 | 1.9141 |
| 6 | 16QAM | 616 | 2.4063 |
| 7 | 64QAM | 466 | 2.7305 |
| 8 | 64QAM | 567 | 3.3223 |
| 9 | 64QAM | 666 | 3.9023 |
| 10 | 64QAM | 772 | 4.5234 |
| 11 | 64QAM | 873 | 5.1152 |
| 12 | 256QAM | 711 | 5.5547 |
| 13 | 256QAM | 797 | 6.2266 |
| 14 | 256QAM | 885 | 6.9141 |
| 15 | 256QAM | 948 | 7.4063 |

Figure 22:
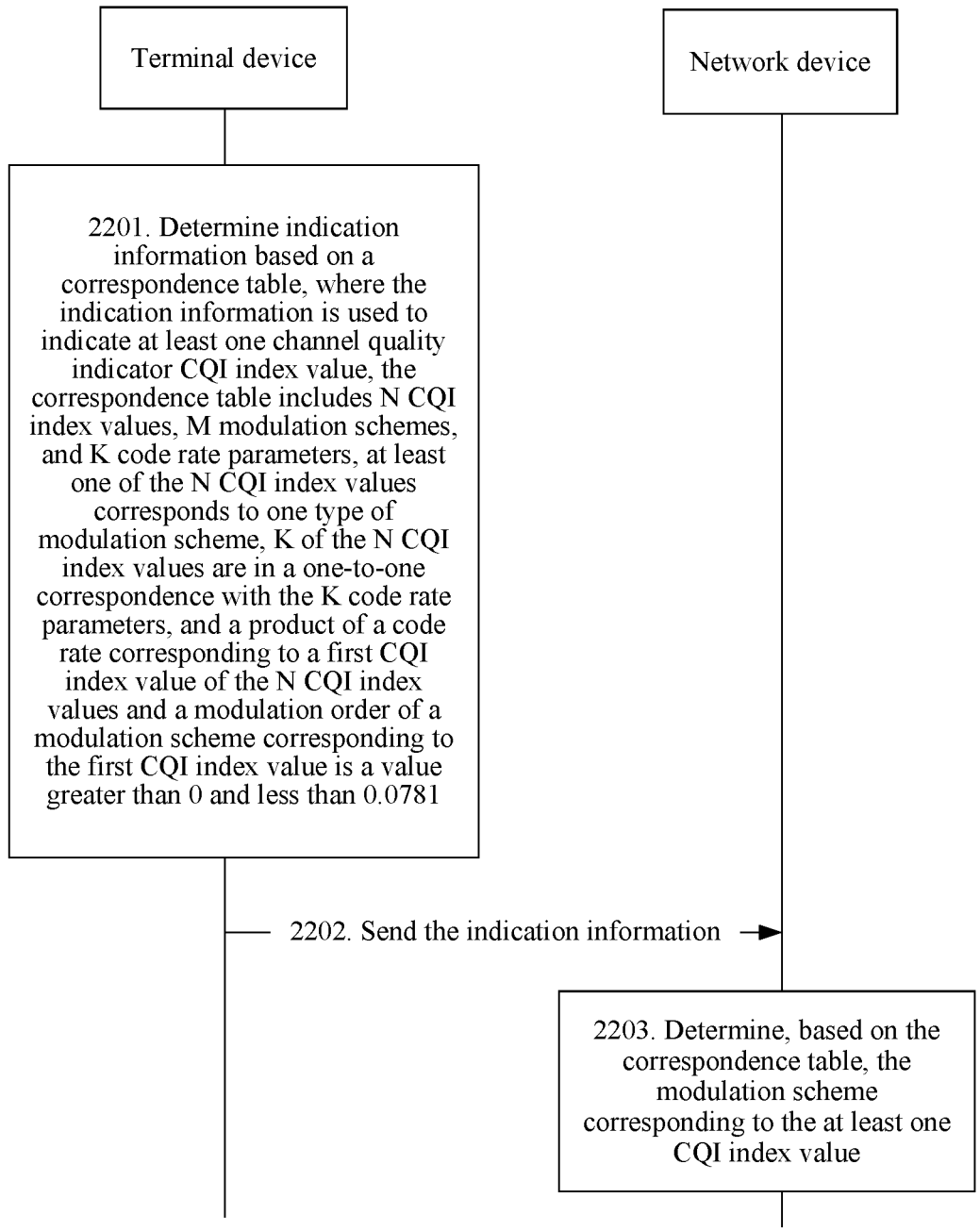
FIG. 22 is a schematic flowchart of a communication method according to an embodiment of this application.

FIG. 22 is a schematic flowchart of a communication method according to an embodiment of this application.

2201. A terminal device determines indication information based on a correspondence table, where the indication information is used to indicate at least one channel quality indicator CQI index, the correspondence table includes N CQI indexes, M modulation schemes, and K code rate parameters, at least one of the N CQI indexes corresponds to one type of modulation scheme, K of the N CQI indexes are in a one-to-one correspondence with the K code rate parameters, and a product of a code rate corresponding to a first CQI index of the N CQI indexes and a modulation order of a modulation scheme corresponding to the first CQI index is a value greater than 0 and less than 0.0781, where Code Rate Parameter=Code Rate×1024, N>M, N≥K, and N, K, and M are all positive integers.

It should be noted that, the product of the code rate corresponding to the first CQI index of the N CQI indexes and the modulation order of the modulation scheme corresponding to the first CQI index is greater than 0 means there is one of the N CQI indexes meets this condition, instead of a specific CQI index.

Specifically, the correspondence table may be shown in Table 23, and a CQI index may correspond to a reserved value.

Optionally, the spectrum efficiency, the modulation scheme, and the code rate parameter meet the following relationship: Spectrum Efficiency=Modulation Order of Modulation Scheme×Code Rate.

TABLE 23

| CQI index | Modulation scheme (Modulation) | Code rate (code rate) × 1024 | Efficiency |
|---|---|---|---|
| 0 | Out of range | | |
| 1 | QPSK | 2 | 0.0039 |
| 2 | QPSK | 4 | 0.0078 |
| 3 | QPSK | 8 | 0.0156 |
| 4 | QPSK | 16 | 0.0312 |
| 5 | QPSK | 40 | 0.0781 |
| 6 | QPSK | 78 | 0.1523 |
| 7 | QPSK | 120 | 0.2344 |
| 8 | QPSK | 193 | 0.3770 |
| 9 | QPSK | 308 | 0.6016 |
| 10 | QPSK | 449 | 0.8770 |
| 11 | QPSK | 602 | 1.1758 |
| 12 | 16QAM | 378 | 1.4766 |
| 13 | 16QAM | 490 | 1.9141 |
| 14 | 16QAM | 616 | 2.4063 |
| 15 | 64QAM | 466 | 2.7305 |

TABLE 23-continued

| CQI index | Modulation scheme (Modulation) | Code rate (code rate) × 1024 | Efficiency |
|---|---|---|---|
| 16 | 64QAM | 567 | 3.3223 |
| 17 | 64QAM | 666 | 3.9023 |
| 18 | 64QAM | 772 | 4.5234 |
| 19 | 64QAM | 873 | 5.1152 |
| 20 | 64QAM | 948 | 5.5547 |
| 21 | 256QAM | 711 | 5.5547 |
| 22 | 256QAM | 797 | 6.2266 |
| 23 | 256QAM | 885 | 6.9141 |
| 24 | 256QAM | 948 | 7.4063 |
| 25 | Reserved | Reserved | Reserved |
| 26 | Reserved | Reserved | Reserved |
| 27 | Reserved | Reserved | Reserved |
| 28 | Reserved | Reserved | Reserved |
| 29 | Reserved | Reserved | Reserved |
| 30 | Reserved | Reserved | Reserved |
| 31 | Reserved | Reserved | Reserved |

Optionally, the channel quality indication information may include more than 4 bits, and values of the bits may represent more than 16 states.

For example, in Table 23, 5 bits represent 32 states, and the 32 states may include a reserved (reserved) state.

It should be understood that spectrum efficiency less than 0.0781 in this embodiment of this application may be a value other than those in Table 23. This is not limited in this application.

Optionally, the K code rate parameters include a value greater than 0 and less than 40.

For example, as shown in Table 25, a code rate value may be 16, 8, or 4. It should be understood that a code rate value greater than 0 and less than 40 in this embodiment of this application may be another value. This is not limited in this application.

Optionally, the N CQI indexes in the correspondence table are arranged in ascending order, products of modulation orders of modulation schemes corresponding to all of the first P CQI indexes of the N CQI indexes and code rates corresponding to all of the first P CQI indexes are arranged in ascending order, and a product of a modulation order of a modulation scheme corresponding to a $(P+h)^{th}$ CQI index and a code rate corresponding to the $(P+h)^{th}$ CQI index is less than a product of a modulation order of a modulation scheme corresponding to a $P^{th}$ CQI index and a code rate corresponding to the $P^{th}$ CQI index, where N>P+h, h is a value ranging from 1 to N−X, and X>P.

Specifically, a spectrum efficiency value less than 0.0781 that corresponds to a CQI index may be arranged behind a maximum spectrum efficiency value, so that the terminal device can determine, as required, a quantity of bits included in the channel quality indication information.

For example, as shown in Table 24, when a quantity of bits in the channel quality indication information is limited, 4 bits are used to represent 16 states. If a user needs to cover an area in a bad channel condition, 5 bits are used to cover all states in Table 24.

TABLE 24

| CQI index | Modulation scheme (Modulation) | Code rate (code rate) × 1024 | Efficiency |
|---|---|---|---|
| 0 | Out of range | | |
| 1 | QPSK | 16 | 0.1523 |
| 2 | QPSK | 40 | 0.3770 |
| 3 | QPSK | 78 | 0.8770 |
| 4 | 16QAM | 378 | 1.4766 |

TABLE 24-continued

| CQI index | Modulation scheme (Modulation) | Code rate (code rate) × 1024 | Efficiency |
|---|---|---|---|
| 5 | 16QAM | 490 | 1.9141 |
| 6 | 16QAM | 616 | 2.4063 |
| 7 | 64QAM | 466 | 2.7305 |
| 8 | 64QAM | 567 | 3.3223 |
| 9 | 64QAM | 666 | 3.9023 |
| 10 | 64QAM | 772 | 4.5234 |
| 11 | 64QAM | 873 | 5.1152 |
| 12 | 256QAM | 711 | 5.5547 |
| 13 | 256QAM | 797 | 6.2266 |
| 14 | 256QAM | 885 | 6.9141 |
| 15 | 256QAM | 948 | 7.4063 |
| 16 | QPSK | 2 | 0.0039 |
| 17 | QPSK | 4 | 0.0078 |
| 18 | QPSK | 8 | 0.0156 |
| 19 | QPSK | 16 | 0.0312 |
| 20 | QPSK | 40 | 0.0781 |
| 21 | Reserved | Reserved | Reserved |
| 22 | Reserved | Reserved | Reserved |
| 23 | Reserved | Reserved | Reserved |
| 24 | Reserved | Reserved | Reserved |
| 25 | Reserved | Reserved | Reserved |
| 26 | Reserved | Reserved | Reserved |
| 27 | Reserved | Reserved | Reserved |
| 28 | Reserved | Reserved | Reserved |
| 29 | Reserved | Reserved | Reserved |
| 30 | Reserved | Reserved | Reserved |
| 31 | Reserved | Reserved | Reserved |

Optionally, spectrum efficiency corresponding to CQI indexes that are sequentially arranged behind the $P^{th}$ CQI index may be arranged in ascending order.

For example, spectrum efficiency corresponding to CQI indexes of 16 to 20 shown in Table 24 gradually decreases as the CQI indexes increase, that is, decreases from 0.0039 to 0.0781.

Optionally, the correspondence table may be a part selected from the foregoing table, that is, a total quantity of states is reduced, thereby reducing signaling overheads. For example, details are shown in Table 25 and Table 26:

TABLE 25

| CQI index | Modulation scheme (Modulation) | Code rate (code rate) × 1024 | Efficiency |
|---|---|---|---|
| 0 | Out of range | | |
| 1 | QPSK | 4 | 0.00781 |
| 2 | QPSK | 16 | 0.0312 |
| 3 | QPSK | 78 | 0.1523 |
| 4 | QPSK | 449 | 0.8770 |
| 5 | 16QAM | 616 | 2.4063 |
| 6 | 64QAM | 772 | 4.5234 |
| 7 | 256QAM | 797 | 6.2266 |
| 8 | Reserved | Reserved | Reserved |
| 9 | Reserved | Reserved | Reserved |
| 10 | Reserved | Reserved | Reserved |
| 11 | Reserved | Reserved | Reserved |
| 12 | Reserved | Reserved | Reserved |
| 13 | Reserved | Reserved | Reserved |
| 14 | Reserved | Reserved | Reserved |
| 15 | Reserved | Reserved | Reserved |

TABLE 26

| CQI index | Modulation scheme (Modulation) | Code rate (code rate) × 1024 | Efficiency |
|---|---|---|---|
| 0 | Out of range | | |
| 1 | QPSK | 78 | 0.1523 |
| 2 | QPSK | 449 | 0.8770 |
| 3 | 16QAM | 378 | 1.4766 |

TABLE 26-continued

| CQI index | Modulation scheme (Modulation) | Code rate (code rate) × 1024 | Efficiency |
|---|---|---|---|
| 4 | 16QAM | 616 | 2.4063 |
| 5 | 64QAM | 666 | 3.9023 |
| 6 | 64QAM | 873 | 5.1152 |
| 7 | 256QAM | 797 | 6.2266 |

Optionally, the network device may send higher layer signaling to the terminal device, where the higher layer signaling indicates the correspondence table. Specifically, the terminal device and the network device may agree on Table 23, Table 24, Table 25 or Table 26. The network device may determine a to-be-used table based on a service or a channel environment, and send the higher layer signaling to indicate the to-be-used correspondence table. Optionally, the terminal device and the network device may agree on a default table or some of correspondences in a table. If the network device determines that a channel quality indication range needs to be changed, that is, only one of a plurality of tables or some of correspondences in a table are required, the network device sends the higher layer signaling to the terminal device to indicate a table or some of correspondences in a table. In this way, when the terminal device uses the table indicated by the network device, an indication requirement of a current channel environment can be met, and signaling overheads can be reduced.

2202. The terminal device sends the indication information to the network device. Correspondingly, the network device receives the indication information.

2203. The network device determines, according to the indication information, the modulation and coding scheme corresponding to the at least one CQI index.

Optionally, the network device may determine, based on the at least one CQI index indicated by the indication information and the correspondence table, the modulation and coding scheme corresponding to the at least one CQI index.

Optionally, the network device may determine each element in the correspondence table according to a protocol agreement, or determine each element in the correspondence table based on the correspondence table previously configured for the terminal.

Optionally, at least two CQI indexes are in a one-to-one correspondence with at least two modulation schemes.

Optionally, in modulation schemes corresponding to all CQI indices in the correspondence table, a quantity of QPSK modulation schemes is the largest or a quantity of 64QAM modulation schemes is the largest, or a 256 QAM modulation scheme is included.

For example, Table 27 covers low and medium SINRs (that is, a quantity of QPSK modulation schemes is relatively large) and can cover 64QAM, and is widely applied.

TABLE 27

| CQI index | Modulation scheme (Modulation) | Code rate (code rate) × 1024 | Efficiency |
|---|---|---|---|
| 0 | Out of range | | |
| 1 | QPSK | 4 | 0.0078 |
| 2 | QPSK | 8 | 0.0156 |
| 3 | QPSK | 16 | 0.0312 |
| 4 | QPSK | 40 | 0.0781 |
| 5 | QPSK | 78 | 0.1523 |
| 6 | QPSK | 120 | 0.2344 |
| 7 | QPSK | 193 | 0.3770 |

TABLE 27-continued

| CQI index | Modulation scheme (Modulation) | Code rate (code rate) × 1024 | Efficiency |
|---|---|---|---|
| 8 | QPSK | 308 | 0.6016 |
| 9 | QPSK | 449 | 0.8770 |
| 10 | QPSK | 602 | 1.1758 |
| 11 | 16QAM | 378 | 1.4766 |
| 12 | 16QAM | 616 | 2.4063 |
| 13 | 64QAM | 567 | 3.3223 |
| 14 | 64QAM | 772 | 4.5234 |
| 15 | 64QAM | 948 | 5.5547 |

For another example, Table 28 covers low, medium, and high SINRs (main SINRs), that is, a high CQI level corresponds to a high SINR, and a low CQI level corresponds to a low SINR. In other words, transmission efficiency of the user can be ensured, and robust transmission of the user can be ensured.

TABLE 28

| CQI index | Modulation scheme (Modulation) | Code rate (code rate) × 1024 | Efficiency |
|---|---|---|---|
| 0 | | Out of range | |
| 1 | QPSK | 78 | 0.1523 |
| 2 | QPSK | 120 | 0.2344 |
| 3 | QPSK | 193 | 0.3770 |
| 4 | QPSK | 308 | 0.6016 |
| 5 | QPSK | 449 | 0.8770 |
| 6 | QPSK | 602 | 1.1758 |
| 7 | 16QAM | 378 | 1.4766 |
| 8 | 16QAM | 490 | 1.9141 |
| 9 | 16QAM | 616 | 2.4063 |
| 10 | 64QAM | 466 | 2.7305 |
| 11 | 64QAM | 567 | 3.3223 |
| 12 | 64QAM | 666 | 3.9023 |
| 13 | 64QAM | 772 | 4.5234 |
| 14 | 64QAM | 873 | 5.1152 |
| 15 | 64QAM | 948 | 5.5547 |

For another example, as shown in Table 29, Table 29 covers medium and high SINRs, CQI levels in a low-SINR interval are sparse, and CQI levels in a high-SINR interval are dense. This is applicable to a user with relatively good channel quality, and improves transmission efficiency.

TABLE 29

| CQI index | Modulation scheme (Modulation) | Code rate (code rate) × 1024 | Efficiency |
|---|---|---|---|
| 0 | | Out of range | |
| 1 | QPSK | 78 | 0.1523 |
| 2 | QPSK | 308 | 0.6016 |
| 3 | QPSK | 602 | 1.1758 |
| 4 | 16QAM | 378 | 1.4766 |
| 5 | 16QAM | 490 | 1.9141 |
| 6 | 16QAM | 616 | 2.4063 |
| 7 | 64QAM | 466 | 2.7305 |
| 8 | 64QAM | 567 | 3.3223 |
| 9 | 64QAM | 666 | 3.9023 |
| 10 | 64QAM | 772 | 4.5234 |
| 11 | 64QAM | 873 | 5.1152 |
| 12 | 256QAM | 711 | 5.5547 |
| 13 | 256QAM | 797 | 6.2266 |
| 14 | 256QAM | 885 | 6.9141 |
| 15 | 256QAM | 948 | 7.4063 |

Optionally, the network device may determine a correspondence between each CQI index and a modulation scheme in Table 27, Table 28, and Table 29 according to a protocol agreement, or the network device preconfigures a correspondence between each CQI index and a modulation scheme in Table 27, Table 28, and Table 29 for the terminal device.

Therefore, in this embodiment of this application, the terminal device determines the indication information based on the correspondence table, where the indication information is used to indicate the at least one channel quality indicator CQI index, the correspondence table includes the N CQI indexes, the M modulation schemes, and the K code rate parameters, the at least one of the N CQI indexes corresponds to one type of modulation scheme, the K of the N CQI indexes are in a one-to-one correspondence with the K code rate parameters, and the product of the code rate corresponding to the first CQI index of the N CQI indexes and the modulation order of the modulation scheme corresponding to the first CQI index is a value greater than 0 and less than 0.0781, where Code Rate Parameter=Code Rate× 1024, N>M, N≥K, and N, K, and M are all positive integers; and the terminal device sends the indication information, so that the network device determines, according to the indication information, the modulation scheme corresponding to the at least one CQI index. In other words, this application can be applied to a system that requires spectrum efficiency lower than 0.0781, that is, an area in a bad channel condition is covered, to ensure that a user can perform communication on a deep fading channel.

Figure 23:
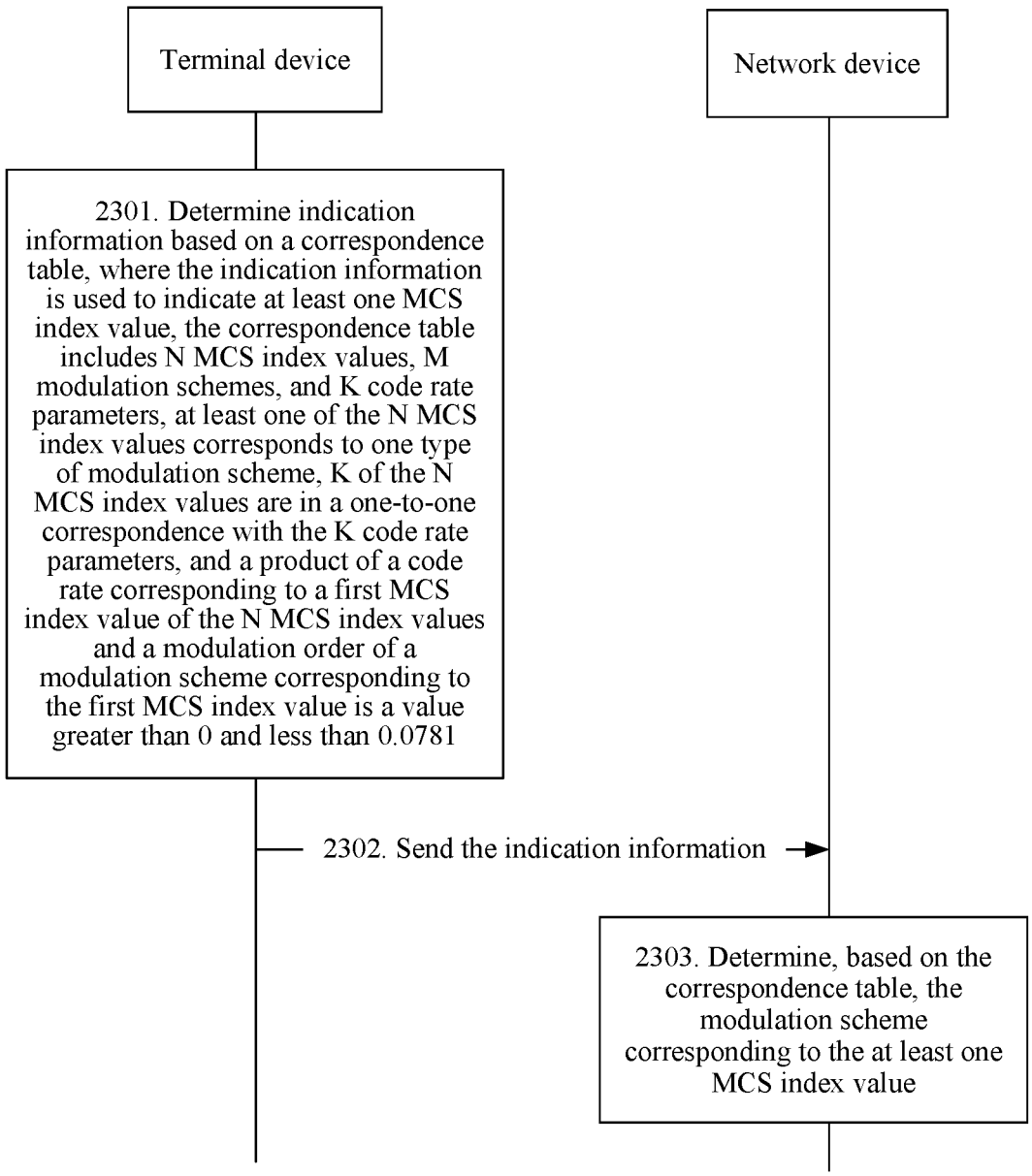
FIG. 23 is a schematic flowchart of a communication method according to an embodiment of this application.

FIG. 23 is a schematic flowchart of a communication method according to an embodiment of this application.

2301. A network device determines indication information based on a correspondence table, where the indication information is used to indicate at least one modulation and coding scheme (Modulation and Coding Scheme, MCS) index value, the correspondence table includes N MCS indexes, M modulation schemes, and K code rate parameters, at least one of the N MCS indexes corresponds to one type of modulation scheme, K of the N MCS indexes are in a one-to-one correspondence with the K code rate parameters, and a product of a code rate corresponding to a first MCS index of the N MCS indexes and a modulation order of a modulation scheme corresponding to the first MCS index is a value greater than 0 and less than 0.0781, where Code Rate Parameter=Code Rate×1024, N>M, N≥K, and N, K, and M are all positive integers.

For example, details are shown in Table 30 and Table 31:

TABLE 30

| MCS index | Modulation scheme (Modulation) | Code rate (code rate) × 1024 |
|---|---|---|
| 0 | 2 | 78 |
| 1 | 2 | 120 |
| 2 | 2 | 193 |
| 3 | 2 | 308 |
| 4 | 2 | 449 |
| 5 | 2 | 602 |
| 6 | 4 | 378 |
| 7 | 4 | 434 |
| 8 | 4 | 490 |
| 9 | 4 | 553 |
| 10 | 4 | 616 |
| 11 | 4 | 658 |
| 11 | 4 | 658 |
| 12 | 6 | 466 |
| 13 | 6 | 517 |
| 14 | 6 | 567 |
| 15 | 6 | 616 |
| 16 | 6 | 666 |
| 17 | 6 | 719 |
| 18 | 6 | 772 |
| 19 | 6 | 822 |

TABLE 30-continued

| MCS index | Modulation scheme (Modulation) | Code rate (code rate) × 1024 |
|---|---|---|
| 20 | 6 | 873 |
| 21 | 8 | 683 |
| 22 | 8 | 711 |
| 23 | 8 | 754 |
| 24 | 8 | 797 |
| 25 | 8 | 841 |
| 26 | 8 | 885 |
| 27 | 8 | 917 |
| 28 | 2 | Reserved |
| 29 | 4 | |
| 30 | 6 | |
| 31 | 8 | |

TABLE 31

| MCS index | Modulation scheme (Modulation) | Code rate (code rate) × 1024 |
|---|---|---|
| 0 | 2 | 4 |
| 1 | 2 | 8 |
| 2 | 2 | 16 |
| 3 | 2 | 32 |
| 4 | 2 | 78 |
| 5 | 2 | 193 |
| 6 | 2 | 449 |
| 7 | 4 | 378 |
| 8 | 4 | 434 |
| 9 | 4 | 490 |
| 10 | 4 | 553 |
| 11 | 4 | 658 |
| 12 | 8 | 797 |
| 13 | 8 | 948 |

Optionally, the K code rate parameters include a value greater than 0 and less than 40.

Optionally, as shown in Table 32, the N MCS indexes in the correspondence table are arranged in ascending order, spectrum efficiency corresponding to the first P MCS indexes of the N MCS indexes is arranged in ascending order, and spectrum efficiency corresponding to a $(P+h)^{th}$ MCS index is less than spectrum efficiency corresponding to a $P^{th}$ MCS index, where N>P+h, and h=1, 2, . . . .

TABLE 32

| MCS index | Modulation scheme (Modulation) | Code rate (code rate) × 1024 |
|---|---|---|
| 0 | 2 | 120 |
| 1 | 2 | 193 |
| 2 | 2 | 308 |
| 3 | 2 | 449 |
| 4 | 2 | 602 |
| 5 | 4 | 378 |
| 6 | 4 | 434 |
| 7 | 4 | 490 |
| 8 | 4 | 553 |
| 9 | 4 | 616 |
| 10 | 4 | 658 |
| 11 | 6 | 466 |
| 12 | 6 | 517 |
| 13 | 6 | 567 |
| 14 | 6 | 616 |
| 15 | 6 | 666 |
| 16 | 6 | 719 |
| 17 | 6 | 772 |
| 18 | 6 | 822 |
| 19 | 6 | 873 |
| 20 | 8 | 683 |
| 21 | 8 | 711 |
| 22 | 8 | 754 |
| 23 | 8 | 797 |
| 24 | 8 | 841 |
| 25 | 8 | 885 |
| 26 | 8 | 917 |
| 27 | 8 | 948 |
| 28 | 2 | Reserved |
| 29 | 4 | Reserved |
| 30 | 6 | Reserved |
| 31 | 8 | Reserved |
| 32 | 2 | 2 |
| 33 | 2 | 3 |
| 34 | 2 | 4 |
| 35 | 2 | 6 |
| 36 | 2 | 8 |
| 37 | 2 | 12 |
| 38 | 2 | 16 |
| 39 | 2 | 28 |
| 40 | 2 | 40 |
| 41 | 2 | 56 |
| 42-63 | Reserved | |

2302. A terminal device receives the indication information sent by the network device.

2303. The terminal device determines, based on the correspondence table, the modulation and coding scheme corresponding to the at least one MCS index.

It should be understood that an implementation of this embodiment of this application may be similar to the implementation of the embodiment shown in FIG. 22. To avoid repetition, details are not described herein again.

Therefore, according to the communication method in this embodiment of this application, the network device determines the indication information based on the correspondence table, where the indication information is used to indicate the at least one channel quality indicator MCS index, the correspondence table includes the N MCS indexes, the M modulation schemes, and the K code rate parameters, the at least one of the N MCS indexes corresponds to one type of modulation scheme, the K of the N MCS indexes are in a one-to-one correspondence with the K code rate parameters, and the product of the code rate corresponding to the first MCS index of the N MCS indexes and the modulation order of the modulation scheme corresponding to the first MCS index is a value greater than 0 and less than 0.0781, where Code Rate Parameter=Code Rate× 1024, N>M, N≥K, and N, K, and M are all positive integers; and the network device sends the indication information, so that the terminal device determines, according to the indication information, the modulation scheme corresponding to the at least one MCS index. In other words, this application can be applied to a system that requires spectrum efficiency lower than 0.0781, that is, an area in a bad channel condition is covered, to ensure that a user can perform communication on a deep fading channel.

Figure 24:
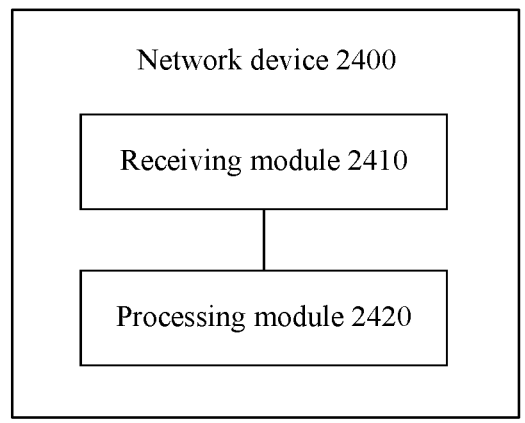
FIG. 24 is a schematic block diagram of a network device according to an embodiment of this application.

FIG. 24 is a schematic block diagram of a network device 2400 according to an embodiment of this application. As shown in FIG. 24, the network device 2400 includes: a receiving module 2410, configured to receive a channel quality parameter that corresponds to each BLER in a first BLER subset and that is sent by a terminal device, where the channel quality parameter is used to indicate channel quality between the terminal device and the network device; and a processing module 2420, configured to determine, based on at least one channel quality parameter difference and a channel quality parameter corresponding to at least one BLER in the first BLER subset, a channel quality parameter corresponding to at least one BLER in a second BLER subset, where the at least one channel quality parameter difference includes a difference between the channel quality parameter corresponding to the at least one BLER in the second BLER subset and the channel quality parameter corresponding to the at least one BLER in the first BLER subset.

Optionally, the network device 2400 further includes a sending module, configured to send a channel quality parameter request to the terminal device, where the channel quality parameter request is used to request at least one channel quality parameter difference between a channel quality parameter corresponding to at least one BLER in a second BLER subset in a first BLER set and a channel quality parameter corresponding to at least one BLER in a first BLER subset in the first BLER set. The receiving module 2410 is further configured to receive the at least one channel quality parameter difference between the channel quality parameter corresponding to the at least one BLER in the second BLER subset in the first BLER set and the channel quality parameter corresponding to the at least one BLER in the first BLER subset in the first BLER set.

Optionally, the network device 2400 further includes a sending module, configured to send a channel quality parameter request to the terminal device, where the channel quality parameter request is used to request a channel quality parameter difference between a channel quality parameter corresponding to at least one BLER in a second BLER subset in each of a at least one BLER set and a channel quality parameter corresponding to at least one BLER in a first BLER subset. The receiving module 2410 is further configured to receive the channel quality parameter difference between the channel quality parameter corresponding to the at least one BLER in the second BLER subset in each of the at least one BLER set and the channel quality parameter corresponding to the at least one BLER in the first BLER subset.

Optionally, if the method is applied to a system that supports at least two BLER sets, any two of the at least two BLER sets correspond to different transmission modes.

Optionally, the transmission modes include an antenna port configuration and/or a multiple-input multiple-output MIMO preprocessing mode.

Therefore, in this embodiment of this application, the network device may receive a channel quality parameter that corresponds to a BLER in the first BLER subset in the first BLER set and that is sent by the terminal device, and determine, based on channel quality parameters corresponding to some BLERs in the first BLER subset and the channel quality parameter difference between the channel quality parameter corresponding to each BLER in the second BLER subset and the channel quality parameter corresponding to the at least one BLER in the first BLER subset, channel quality parameters corresponding to all BLERs in the second BLER subset. In other words, the network device can determine channel quality parameters corresponding to all BLERs in the first BLER set, and therefore the terminal device does not need to send the channel quality parameters corresponding to all the BLERs in the first BLER set, thereby reducing signaling overheads.

It should be understood that the network device 2400 in this embodiment of this application may correspond to the network device in the data transmission method 2000 in the embodiments of this application, and the foregoing and other management operations and/or functions of the modules in the network device 2400 are separately used to implement corresponding steps of the foregoing methods. For brevity, details are not described herein again.

Figure 25:
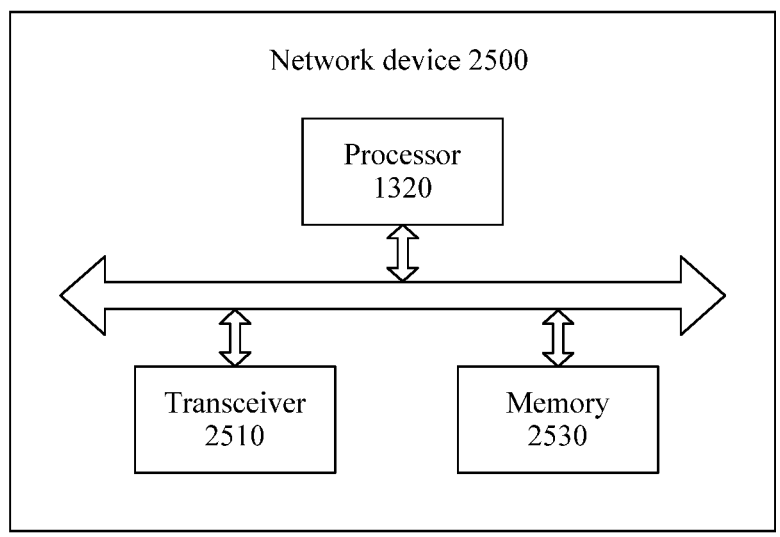
FIG. 25 is a schematic structural diagram of a network device according to an embodiment of this application.

In this embodiment of this application, the receiving module 2410 may be implemented by a transceiver, and the processing module 2420 may be implemented by a processor. As shown in FIG. 25, a network device 2500 may include a transceiver 2510, a processor 2520, and a memory 2530. The memory 2530 may be configured to store indication information, and may be further configured to store code, an instruction, and the like executed by the processor 2520.

Figure 26:
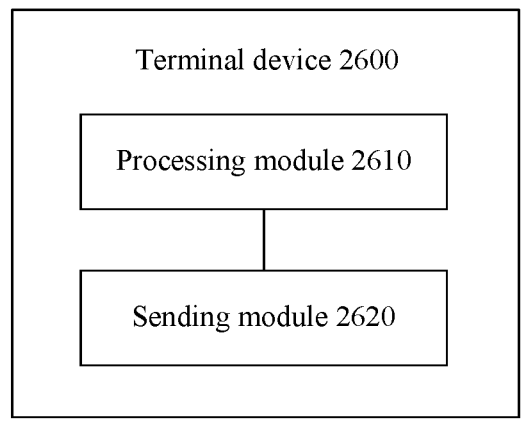
FIG. 26 is a schematic block diagram of a terminal device according to an embodiment of this application.

FIG. 26 is a schematic block diagram of a terminal device 2600 according to an embodiment of this application. As shown in FIG. 26, the terminal device 2600 is applied to a system that supports at least one block error rate BLER set, each of the at least one BLER set includes a first BLER subset and a second BLER subset, the first BLER subset includes at least one BLER, the second BLER subset includes at least one BLER, and the terminal device 2600 includes: a processing module 2610, configured to determine a channel quality parameter corresponding to each BLER in the first BLER subset, where the channel quality parameter is used to indicate channel quality between the terminal device and a network device; and a sending module 2620, configured to send the channel quality parameter corresponding to each BLER in the first BLER subset to the network device, so that the network device determines, based on at least one channel quality parameter difference and a channel quality parameter corresponding to the at least one BLER in the first BLER subset, a channel quality parameter corresponding to the at least one BLER in the second BLER subset, where the at least one channel quality parameter difference includes a difference between the channel quality parameter corresponding to the at least one BLER in the second BLER subset and the channel quality parameter corresponding to the at least one BLER in the first BLER subset.

Optionally, the terminal device 2600 further includes a receiving module, configured to receive a channel quality parameter request sent by the network device, where the channel quality parameter request is used to request at least one channel quality parameter difference between a channel quality parameter corresponding to at least one BLER in a second BLER subset in a first BLER set and a channel quality parameter corresponding to at least one BLER in a first BLER subset in the first BLER set. The processing module 2610 is further configured to send the at least one channel quality parameter difference between the channel quality parameter corresponding to the at least one BLER in the second BLER subset in the first BLER set and the channel quality parameter corresponding to the at least one BLER in the first BLER subset in the first BLER set to the network device according to the channel quality parameter request.

Optionally, the terminal device 2600 further includes a receiving module, configured to receive a channel quality parameter request sent by the network device, where the channel quality parameter request is used to request the channel quality parameter difference between the channel quality parameter corresponding to the at least one BLER in the second BLER subset in each of the at least one BLER set and the channel quality parameter corresponding to the at least one BLER in the first BLER subset. The processing module 2610 is further configured to send the channel quality parameter difference between the channel quality parameter corresponding to the at least one BLER in the second BLER subset in each of the at least one BLER set and the channel quality parameter corresponding to the at least one BLER in the first BLER subset to the network device according to the channel quality parameter request.

Optionally, if the method is applied to a system that supports at least two BLER sets, any two of the at least two BLER sets correspond to different CQI levels.

Optionally, if the method is applied to a system that supports at least two BLER sets, any two of the at least two BLER sets correspond to different transmission modes.

Optionally, the transmission modes include an antenna port configuration and/or a multiple-input multiple-output MIMO preprocessing mode.

Therefore, in this embodiment of this application, the terminal device sends a channel quality parameter corresponding to each BLER in the first BLER subset in the first BLER set, and determines, based on channel quality parameters corresponding to some BLERs in the first BLER subset and the channel quality parameter difference between the channel quality parameter corresponding to each BLER in the second BLER subset and the channel quality parameter corresponding to the at least one BLER in the first BLR subset, channel quality parameters corresponding to all BLERs in the second BLER subset. In other words, the network device can determine channel quality parameters corresponding to all BLERs in the first BLER set, and therefore the terminal device does not need to send the channel quality parameters corresponding to all the BLERs in the first BLER set, thereby reducing signaling overheads.

It should be understood that the terminal device 2600 in this embodiment of this application may correspond to the terminal device in the data transmission method 2000 in the embodiments of this application, and the foregoing and other management operations and/or functions of the modules in the terminal device 2600 are separately used to implement corresponding steps of the foregoing methods. For brevity, details are not described herein again.

Figure 27:
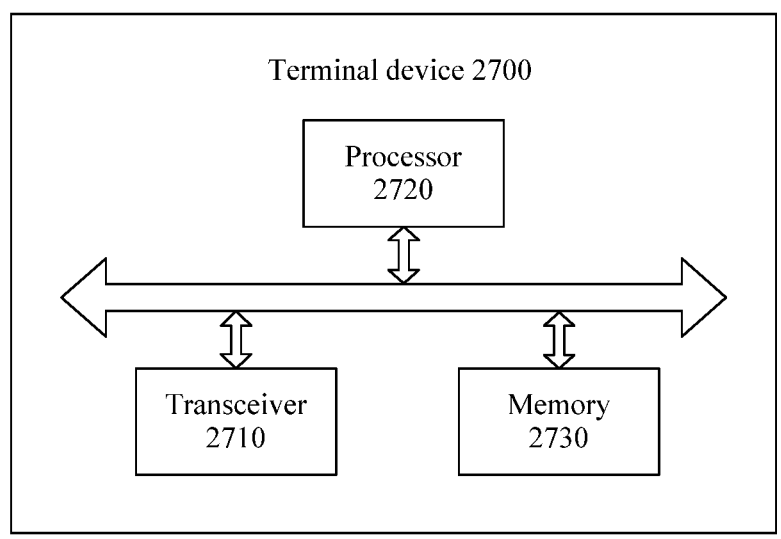
FIG. 27 is a schematic structural diagram of a terminal device according to an embodiment of this application.

In this embodiment of this application, the sending module 2620 may be implemented by a transceiver, and the processing module 2610 may be implemented by a processor. As shown in FIG. 27, a terminal device 2700 may include a transceiver 2710, a processor 2720, and a memory 2730. The memory 2730 may be configured to store indication information, and may be further configured to store code, an instruction, and the like executed by the processor 2720.

It should be understood that the processor 2520 or the processor 2720 may be an integrated circuit chip and has a signal processing capability. In an implementation process, steps of the foregoing method embodiments may be completed by using a hardware integrated logic circuit in the processor, or by using an instruction in a form of software. The processor may be a general purpose processor, a digital signal processor (Digital Signal Processor, DSP), an application-specific integrated circuit (Application Specific Integrated Circuit, ASIC), a field programmable gate array (Field Programmable Gate Array, FPGA) or another programmable logic device, a discrete gate or transistor logic device, or a discrete hardware component. The processor may implement or perform the methods, the steps, and the logical block diagrams that are disclosed in the embodiments of the present invention. The general purpose processor may be a microprocessor, or the processor may be any conventional processor or the like. The steps of the methods disclosed with reference to the embodiments of the present invention may be directly performed and completed by a hardware decoding processor, or may be performed and completed by using a combination of hardware in the decoding processor and a software module. The software module may be located in a mature storage medium in the art, such as a random access memory, a flash memory, a read-only memory, a programmable read-only memory, an electrically erasable programmable memory, or a register. The storage medium is located in the memory, and the processor reads information in the memory and completes the steps of the foregoing methods in combination with hardware in the processor.

It may be understood that the memory 2530 or the memory 2730 in the embodiments of the present invention may be a volatile memory or a nonvolatile memory, or may include both a volatile memory and a nonvolatile memory. The nonvolatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM) and is used as an external cache. By way of example rather than limitation, many forms of RAMs may be used, and are, for example, a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchronous link dynamic random access memory (SLDRAM), and a direct rambus random access memory (DR RAM).

It should be noted that the memory in the systems and the methods described in this specification includes but is not limited to these memories and a memory of any other appropriate type.

An embodiment of this application further provides a system chip, where the system chip includes an input/output interface, at least one processor, at least one memory, and a bus. The at least one memory is configured to store an instruction, and the at least one processor is configured to invoke the instruction of the at least one memory to perform operations in the methods in the foregoing embodiments.

Figure 28:
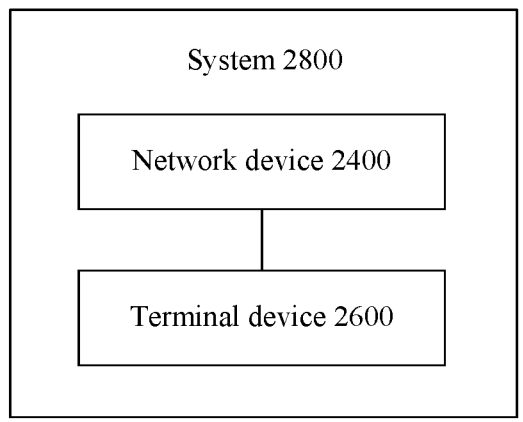
FIG. 28 is a schematic block diagram of a system according to an embodiment of this application.

FIG. 28 shows a resource allocation system 2800 according to an embodiment of this application. The system 2800 includes: the network device 2400 in the embodiment shown in FIG. 24 and the terminal device 2600 in the embodiment shown in FIG. 26.

An embodiment of this application further provides a computer storage medium, where the computer storage medium may store a program instruction for performing any of the foregoing methods.

Optionally, the storage medium may be specifically the memory 2530 or the memory 2730.

Figure 29:
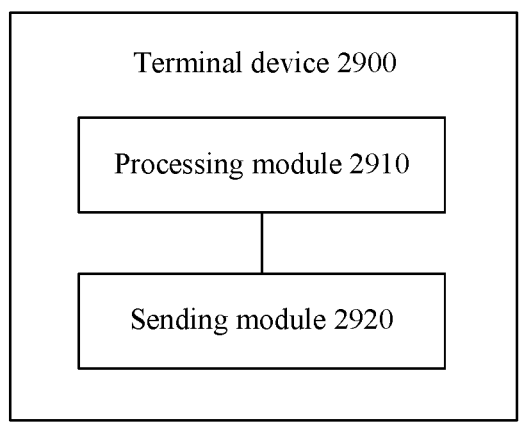
FIG. 29 is a schematic structural diagram of a terminal device according to an embodiment of this application.

FIG. 29 is a schematic block diagram of a terminal device 2900 according to an embodiment of this application. As shown in FIG. 29, the terminal device 2900 includes: a processing module 2910, configured to determine indication information based on a correspondence table, where the indication information is used to indicate at least one channel quality indicator CQI index, the correspondence table includes N CQI indexes, M modulation schemes, and K code rate parameters, at least one of the N CQI indexes corresponds to one type of modulation scheme, K of the N CQI indexes are in a one-to-one correspondence with the K code rate parameters, and a product of a code rate corresponding to a first CQI index of the N CQI indexes and a modulation order of a modulation scheme corresponding to the first CQI index is a value greater than 0 and less than 0.0781, where Code Rate Parameter=Code Rate×1024, N>M, N≥K, and N, K, and M are all positive integers; and a sending module 2920, configured to send the indication information to a network device.

Optionally, the K code rate parameters include a value greater than 0 and less than 40.

Optionally, the N CQI indexes in the correspondence table are arranged in ascending order, products of modulation orders of modulation schemes corresponding to all of the first P CQI indexes of the N CQI indexes and code rates corresponding to all of the first P CQI indexes are arranged in ascending order, and a product of a modulation order of a modulation scheme corresponding to a $(P+h)^{th}$ CQI index and a code rate corresponding to the $(P+h)^{th}$ CQI index is less than a product of a modulation order of a modulation scheme corresponding to a $P^{th}$ CQI index and a code rate corresponding to the $P^{th}$ CQI index, where N>P+h, h is a value ranging from 1 to N−X, and X>P.

Therefore, in this embodiment of this application, the terminal device determines the indication information based on the correspondence table, where the indication information is used to indicate the at least one channel quality indicator CQI index, the correspondence table includes the N CQI indexes, the M modulation schemes, and the K code rate parameters, the at least one of the N CQI indexes corresponds to one type of modulation scheme, the K of the N CQI indexes are in a one-to-one correspondence with the K code rate parameters, and the product of the code rate corresponding to the first CQI index of the N CQI indexes and the modulation order of the modulation scheme corresponding to the first CQI index is a value greater than 0 and less than 0.0781, where Code Rate Parameter=Code Rate× 1024, N>M, N≥K, and N, K, and M are all positive integers; and the terminal device sends the indication information, so that the network device determines, according to the indication information, the modulation scheme corresponding to the at least one CQI index. In other words, this application can be applied to a system that requires spectrum efficiency lower than 0.0781, that is, an area in a bad channel condition is covered, to ensure that a user can perform communication on a deep fading channel.

It should be understood that the terminal device 2900 in this embodiment of this application may correspond to the terminal device in the communication method in the embodiments of this application, and the foregoing and other management operations and/or functions of the modules in the terminal device 2900 are separately used to implement corresponding steps of the foregoing methods. For brevity, details are not described herein again.

Figure 30:
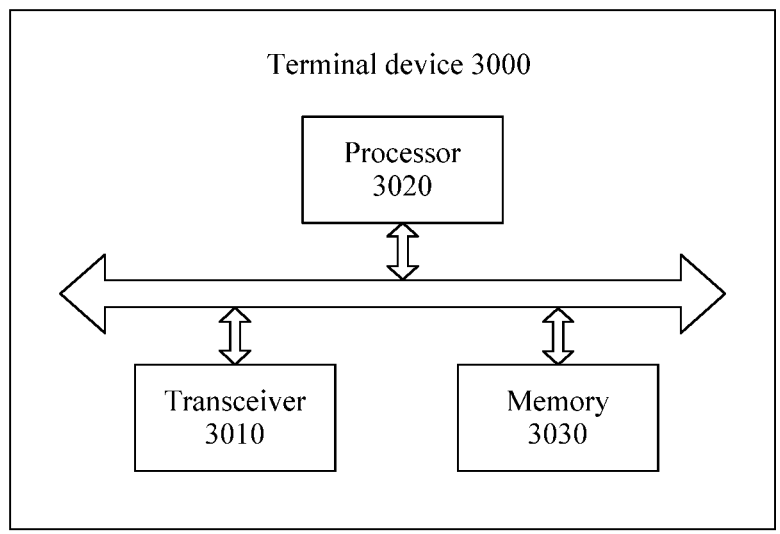
FIG. 30 is a schematic structural diagram of a terminal device according to an embodiment of this application.

In this embodiment of this application, the sending module 2920 may be implemented by a transceiver, and the processing module 2910 may be implemented by a processor. As shown in FIG. 30, a terminal device 3000 may include a transceiver 3010, a processor 3020, and a memory 3030. The memory 3030 may be configured to store indication information, and may be further configured to store code, an instruction, and the like executed by the processor 3020.

Figure 31:
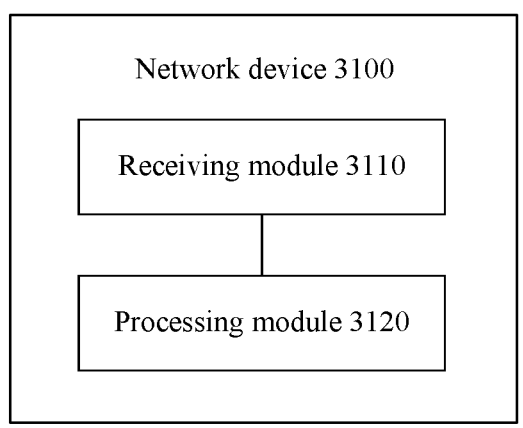
FIG. 31 is a schematic block diagram of a network device according to an embodiment of this application.

FIG. 31 is a schematic block diagram of a network device 3100 according to an embodiment of this application. As shown in FIG. 31, the network device 3100 includes: a receiving module 3110, configured to receive indication information, where the indication information is used to indicate at least one channel quality indicator CQI index; and a processing module 3120, configured to determine, based on a correspondence table, a modulation and coding scheme corresponding to the at least one CQI index, where the correspondence table includes N CQI indexes, M modulation schemes, and K code rate parameters, at least one of the N CQI indexes corresponds to one type of modulation scheme, K of the N CQI indexes are in a one-to-one correspondence with the K code rate parameters, and a product of a code rate parameter corresponding to a first CQI index of the N CQI indexes and a modulation order of a modulation scheme corresponding to the first CQI index is a value greater than 0 and less than 0.0781, where Code Rate Parameter=Code Rate×1024, N>M, N≥K, and N, K, and M are all positive integers.

Optionally, the K code rate parameters include a value greater than 0 and less than 40.

Optionally, the N CQI indexes in the correspondence table are arranged in ascending order, products of modulation orders of modulation schemes corresponding to all of the first P CQI indexes of the N CQI indexes and code rate parameters corresponding to all of the first P CQI indexes are arranged in ascending order, and a product of a modulation order of a modulation scheme corresponding to a $(P+h)^{th}$ CQI index and a code rate parameter corresponding to the $(P+h)^{th}$ CQI index is less than a product of a modulation order of a modulation scheme corresponding to a $P^{th}$ CQI index and a code rate parameter corresponding to the $P^{th}$ CQI index, where N>P+h, h is a value ranging from 1 to N−X, and X>P.

Therefore, in this embodiment of this application, the network device receives the indication information, and determines, based on the correspondence table, the modulation scheme corresponding to the at least one CQI index, where the correspondence table includes the N CQI indexes, the M modulation schemes, and the K code rate parameters, the at least one of the N CQI indexes corresponds to one type of modulation scheme, the K of the N CQI indexes are in a one-to-one correspondence with the K code rate parameters, and the product of the code rate corresponding to the first CQI index of the N CQI indexes and the modulation order of the modulation scheme corresponding to the first CQI index is a value greater than 0 and less than 0.0781, where Code Rate Parameter=Code Rate×1024, N>M, N≥K, and N, K, and M are all positive integers; and the network device sends the indication information, so that the network device determines, according to the indication information, the modulation scheme corresponding to the at least one CQI index. In other words, this application can be applied to a system that requires spectrum efficiency lower than 0.0781, that is, an area in a bad channel condition is covered, to ensure that a user can perform communication on a deep fading channel.

It should be understood that the network device 3100 in this embodiment of this application may correspond to the network device in the communication method in the embodiments of this application, and the foregoing and other management operations and/or functions of the modules in the network device 3100 are separately used to implement corresponding steps of the foregoing methods. For brevity, details are not described herein again.

Figure 32:
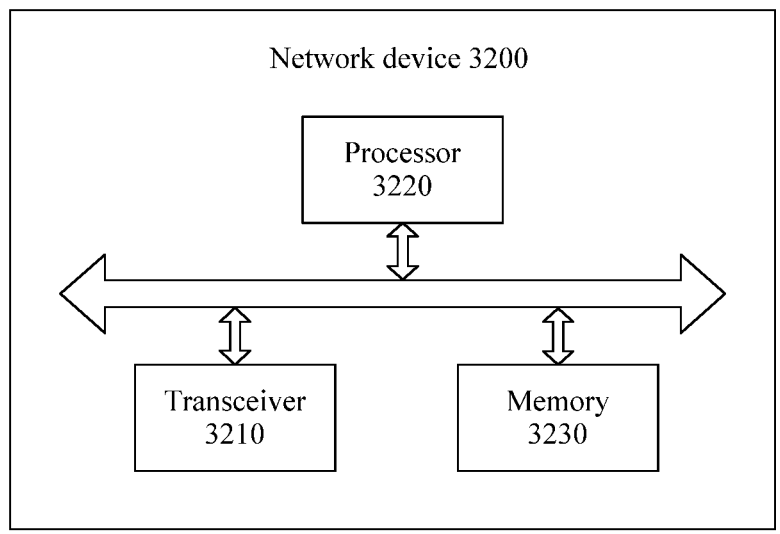
FIG. 32 is a schematic structural diagram of a network device according to an embodiment of this application.

In this embodiment of this application, the receiving module 3110 may be implemented by a transceiver, and the processing module 3120 may be implemented by a processor. As shown in FIG. 32, a network device 3200 may include a transceiver 3210, a processor 3220, and a memory 3230. The memory 3230 may be configured to store indication information, and may be further configured to store code, an instruction, and the like executed by the processor 3220.

It should be understood that the processor 3020 or the processor 3220 may be an integrated circuit chip and has a signal processing capability. In an implementation process, steps of the foregoing method embodiments may be completed by using a hardware integrated logic circuit in the processor, or by using an instruction in a form of software. The processor may be a general purpose processor, a digital signal processor (Digital Signal Processor, DSP), an application-specific integrated circuit (Application Specific Integrated Circuit, ASIC), a field programmable gate array (Field Programmable Gate Array, FPGA) or another programmable logic device, a discrete gate or transistor logic device, or a discrete hardware component. The processor may implement or perform the methods, the steps, and the logical block diagrams that are disclosed in the embodiments of the present invention. The general purpose processor may be a microprocessor, or the processor may be any conventional processor or the like. The steps of the methods disclosed with reference to the embodiments of the present invention may be directly performed and completed by a hardware decoding processor, or may be performed and completed by using a combination of hardware in the decoding processor and a software module. The software module may be located in a mature storage medium in the art, such as a random access memory, a flash memory, a read-only memory, a programmable read-only memory, an electrically erasable programmable memory, or a register. The storage medium is located in the memory, and the processor reads information in the memory and completes the steps of the foregoing methods in combination with hardware in the processor.

It may be understood that the memory 3030 or the memory 3230 in the embodiments of the present invention may be a volatile memory or a nonvolatile memory, or may include both a volatile memory and a nonvolatile memory. The nonvolatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM) and is used as an external cache. By way of example rather than limitation, many forms of RAMs may be used, and are, for example, a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchronous link dynamic random access memory (SLDRAM), and a direct rambus random access memory (DR RAM).

It should be noted that the memory in the systems and the methods described in this specification includes but is not limited to these memories and a memory of any other appropriate type.

An embodiment of this application further provides a system chip, where the system chip includes an input/output interface, at least one processor, at least one memory, and a bus. The at least one memory is configured to store an instruction, and the at least one processor is configured to invoke the instruction of the at least one memory to perform operations in the methods in the foregoing embodiments.

Figure 33:
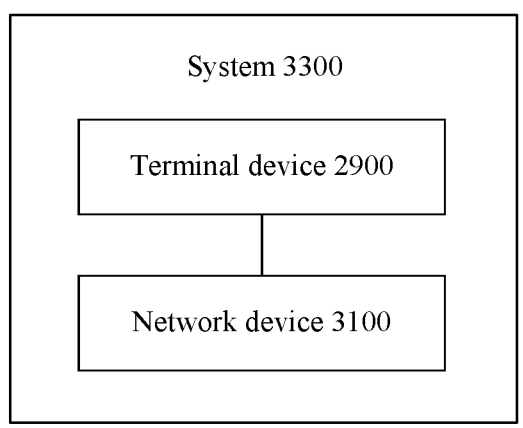
FIG. 33 is a schematic block diagram of a system according to an embodiment of this application.

FIG. 33 shows a resource allocation system 3300 according to an embodiment of this application. The system 3300 includes: the network device 2900 in the embodiment shown in FIG. 29 and the terminal device 3100 in the embodiment shown in FIG. 31.

An embodiment of this application further provides a computer storage medium, where the computer storage medium may store a program instruction for performing any of the foregoing methods.

Optionally, the storage medium may be specifically the memory 3030 or the memory 3230.

A person of ordinary skill in the art may be aware that, in combination with the examples described in the embodiments disclosed in this specification, units and algorithm steps can be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiment. Details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may be or may not be physically separate, and parts displayed as units may be or may not be physical units, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit.

When the functions are implemented in a form of a software functional unit and sold or used as an independent product, the functions may be stored in a computer readable storage medium. Based on such an understanding, the technical solutions in this application essentially, or the part contributing to the current system, or some of the technical solutions may be implemented in a form of a software product. The computer software product is stored in a storage medium, and includes several instructions for instructing a computer device (which may be a personal computer, a server, a network device, or the like) to perform all or some of the steps of the methods described in the embodiments of this application. The foregoing storage medium includes: any medium that can store program code, such as a USB flash drive, a removable hard disk, a read-only memory (ROM), a random access memory (RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A method, comprising:
   determining, by a device, indication information according to a correspondence table, wherein the indication information indicates at least one modulation and coding scheme (MCS) index, the correspondence table comprises:
   N MCS indexes, at least one of the N MCS indexes corresponds to a first type of modulation scheme;
   M modulation schemes; and
   K code rate parameters, K of the N MCS indexes are in a one-to-one correspondence with the K code rate parameters, and a product of a code rate corresponding to a first MCS index of the N MCS indexes and a modulation order of a modulation scheme corresponding to the first MCS index is a value greater than 0 and less than 0.0781, wherein a code rate parameter is a product of a code rate and 1024, N>M, N≥K, and N, K, and M are all positive integers; and
   sending, by the device, the indication information.

2. The method according to claim 1, wherein the K code rate parameters comprise a value greater than 0 and less than 40.

3. A method, comprising:
   receiving, by a device, indication information, wherein the indication information indicates at least one modulation and coding scheme (MCS) index; and
   determining, according to a correspondence table, a modulation and coding scheme corresponding to the at least one MCS index, wherein the correspondence table comprises:
   N MCS indexes, at least one of the N MCS indexes corresponds to one type of modulation scheme;
   M modulation schemes; and
   K code rate parameters, K of the N MCS indexes are in a one-to-one correspondence with the K code rate parameters, and a product of a code rate parameter corresponding to a first MCS index of the N MCS indexes and a modulation order of a modulation scheme corresponding to the first MCS index is a value greater than 0 and less than 0.0781, wherein a code rate parameter is a product of a code rate and 1024, N>M, N≥K, and N, K, and M are all positive integers.

4. The method according to claim 3, wherein the K code rate parameters comprise a value greater than 0 and less than 40.

5. An apparatus, comprising:
   a transceiver;
   at least one processor; and
   a non-transitory computer-readable storage medium coupled to the at least one processor and storing programming instructions for execution by the at least one processor, wherein the programming instructions instruct:
   the at least one processor to determine indication information according to a correspondence table, wherein the indication information indicates at least one modulation and coding scheme (MCS) index, and the correspondence table comprises:
   N MCS indexes, at least one of the N MCS indexes corresponds to one type of modulation scheme;
   M modulation schemes; and
   K code rate parameters, K of the N MCS indexes are in a one-to-one correspondence with the K code rate parameters, and a product of a code rate corresponding to a first MCS index of the N MCS indexes and a modulation order of a modulation scheme corresponding to the first MCS index is a value greater than 0 and less than 0.0781, wherein a code rate parameter is a product of a code rate and 1024, N>M, N≥K, and N, K, and M are all positive integers; and
   the transceiver to send the indication information.

6. The apparatus according to claim 5, wherein the K code rate parameters comprise a value greater than 0 and less than 40.

7. A communications apparatus, comprising:
   a transceiver;
   at least one processor; and
   a non-transitory computer-readable storage medium coupled to the at least one processor and storing programming instructions for execution by the at least one processor, wherein the programming instructions instruct:
   the transceiver to receive indication information, wherein the indication information indicates at least one modulation and coding scheme (MCS) index; and
   the at least one processor to determine, according to a correspondence table, a modulation and coding scheme corresponding to the at least one MCS index, wherein the correspondence table comprises:
   N MCS indexes, at least one of the N MCS indexes corresponds to one type of modulation scheme;
   M modulation schemes; and
   K code rate parameters K of the N MCS indexes are in a one-to-one correspondence with the K code rate parameters, and a product of a code rate parameter corresponding to a first MCS index of the N MCS indexes and a modulation order of a modulation scheme corresponding to the first MCS index is a value greater than 0 and less than 0.0781, wherein a code rate parameter is a product of a code rate and 1024, N>M, N≥K, and N, K, and M are all positive integers.

8. The communications apparatus according to claim 7, wherein the K code rate parameters comprise a value greater than 0 and less than 40.

9. A non-transitory computer-readable storage medium storing programming instructions for:
   determining indication information according to a correspondence table, wherein the indication information indicates at least one modulation and coding scheme (MCS) index, the correspondence table comprises:
   N MCS indexes, at least one of the N MCS indexes corresponds to one type of modulation scheme;
   M modulation schemes; and
   K code rate parameters, K of the N MCS indexes are in a one-to-one correspondence with the K code rate parameters, and a product of a code rate corresponding to a first MCS index of the N MCS indexes and a modulation order of a modulation scheme corresponding to the first MCS index is a value greater than 0 and less than 0.0781, wherein a code rate parameter is a product of a code rate and 1024, N>M, N≥K, and N, K, and M are all positive integers; and sending the indication information.

10. The non-transitory computer-readable storage medium according to claim 9, wherein the K code rate parameters comprise a value greater than 0 and less than 40.

* * * * *